United States Patent
Yamamoto et al.

(10) Patent No.: US 9,552,072 B2
(45) Date of Patent: Jan. 24, 2017

(54) IMAGE PROJECTION DEVICE

(71) Applicant: HITACHI MAXELL, LTD., Osaka (JP)

(72) Inventors: Shoji Yamamoto, Tokyo (JP); Yoshiho Seo, Tokyo (JP); Hiroyuki Urata, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 47 days.

(21) Appl. No.: 14/552,020

(22) Filed: Nov. 24, 2014

(65) Prior Publication Data
US 2015/0185859 A1 Jul. 2, 2015

(30) Foreign Application Priority Data
Dec. 27, 2013 (JP) .................. 2013-270922

(51) Int. Cl.
*G06F 3/01* (2006.01)
*G06F 3/03* (2006.01)

(52) U.S. Cl.
CPC ............... *G06F 3/017* (2013.01); *G06F 3/011* (2013.01); *G06F 3/0304* (2013.01)

(58) Field of Classification Search
CPC .... G06F 3/04883; G06F 3/0485; G06F 3/017; G06F 3/04845
See application file for complete search history.

(56) References Cited

U.S. PATENT DOCUMENTS

| 2006/0028624 | A1 | 2/2006 | Kaise et al. | |
|---|---|---|---|---|
| 2011/0302532 | A1* | 12/2011 | Missig | G06F 3/0416 715/823 |
| 2012/0146903 | A1* | 6/2012 | Arihara | G06F 3/011 345/158 |

FOREIGN PATENT DOCUMENTS

JP  2011-043834 A  3/2011

* cited by examiner

*Primary Examiner* — Gerald Johnson
(74) *Attorney, Agent, or Firm* — Mattingly & Malur, PC

(57) ABSTRACT

In an image projection device in which a projected image can be controlled or operated by gesture, the responsiveness (operability) and/or the usability are improved. The image projection device includes a sensor element to detect a gesture and a control section to generated an operation signal to control (for example, to scroll images or to feed image frames) a projected image projected according to a gesture detected by the sensor element, wherein the control section generates the operation signal when the sensor element detects a gesture in a first direction parallel to the projection surface of the projected image, and when the sensor element detects a gesture in a second direction perpendicular to the projection surface, the control section suspends generation of the operation signal.

20 Claims, 36 Drawing Sheets

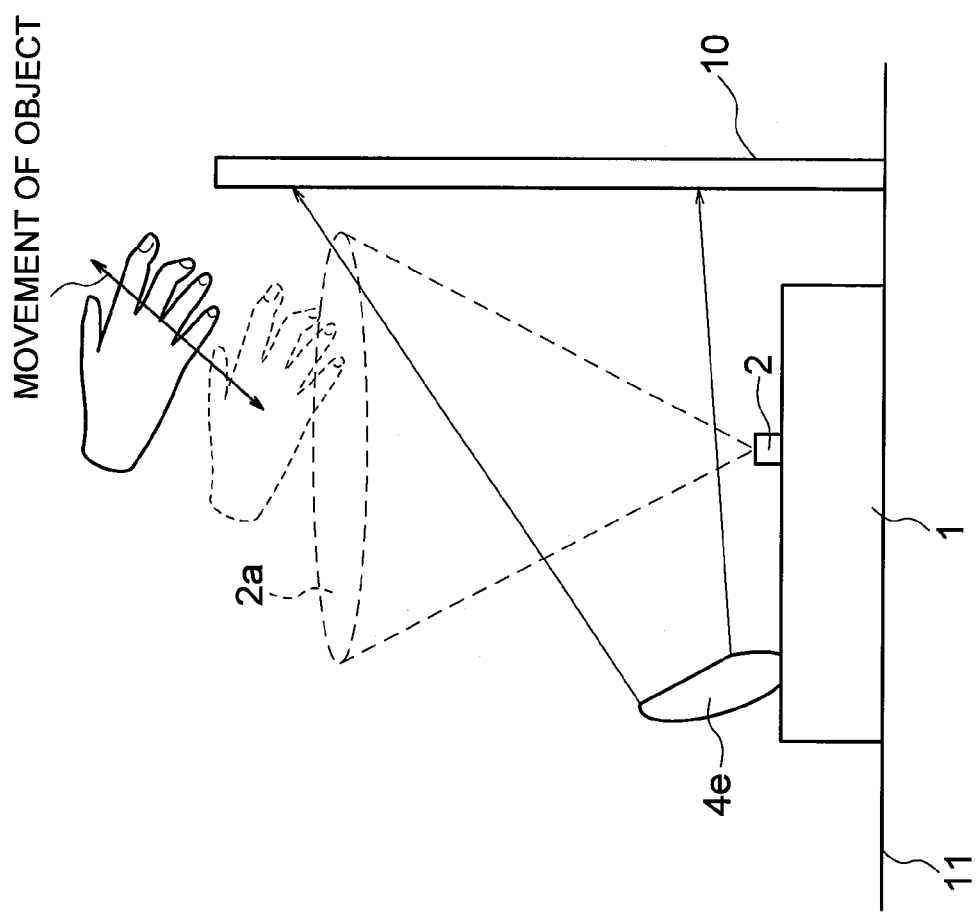

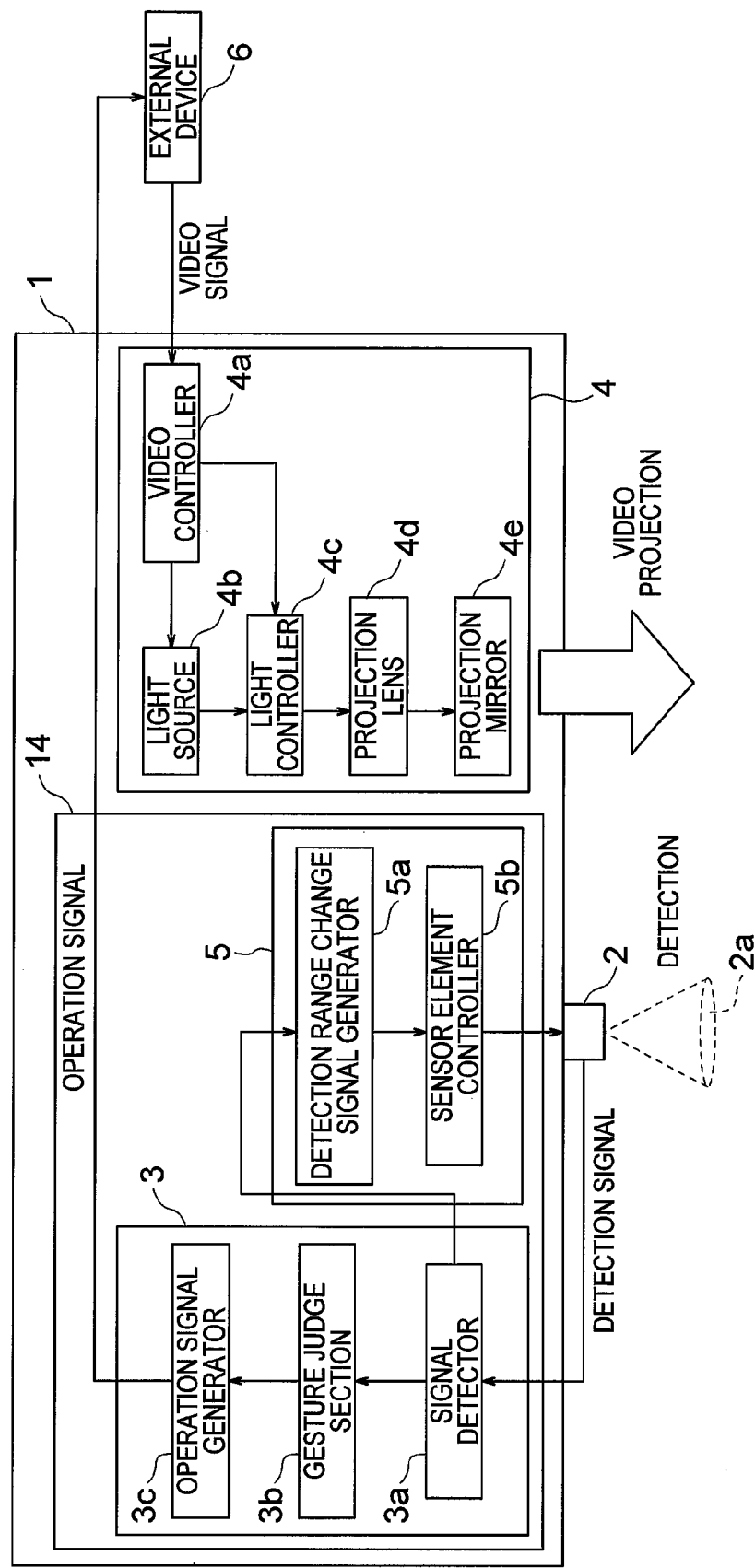

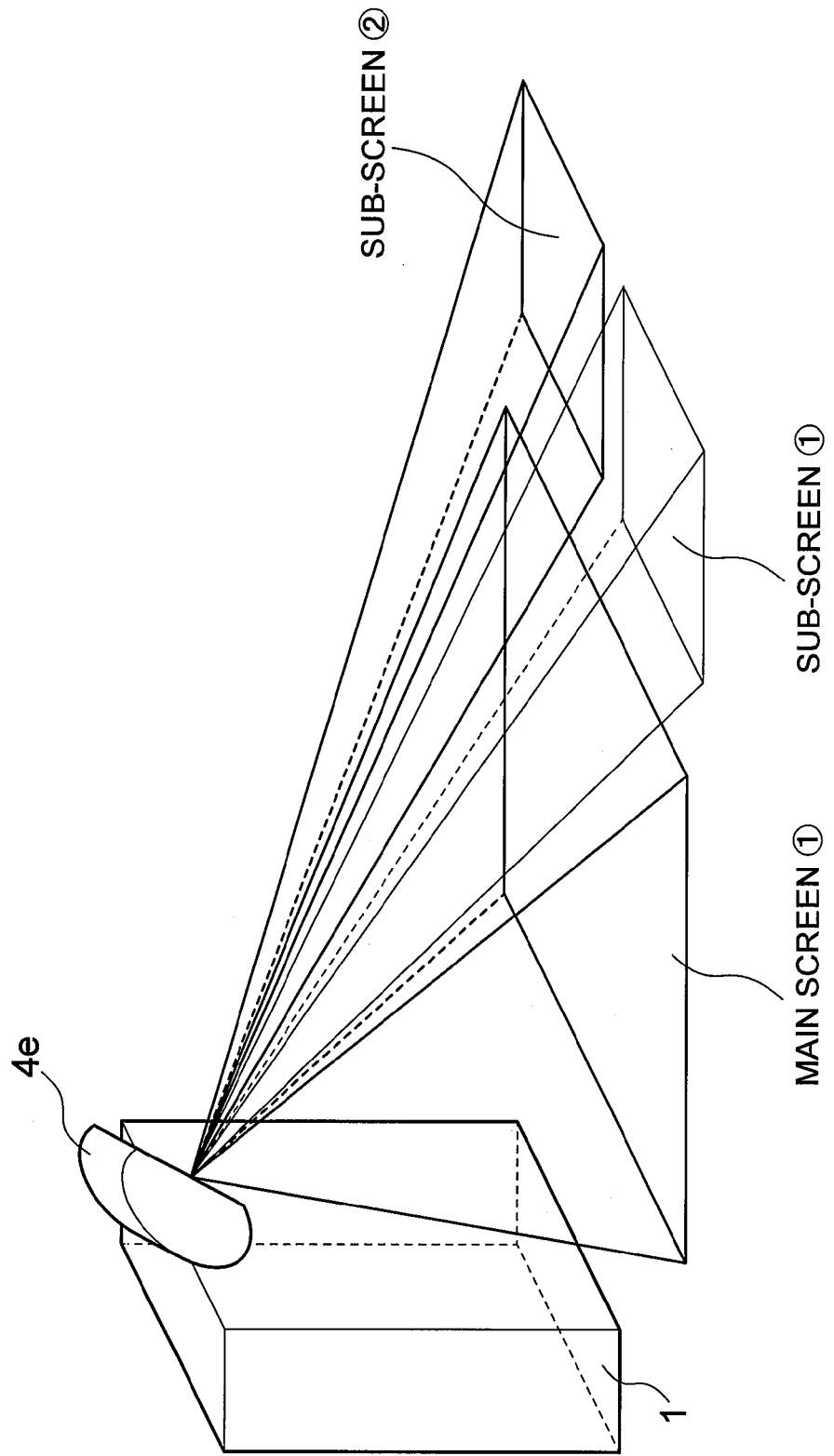

SEQUENTIAL MOVEMENTS

Gesture ON/OFF

EXAMPLE: POINTING ACTION DOWNWARD
TO SCREEN FROM ABOVE

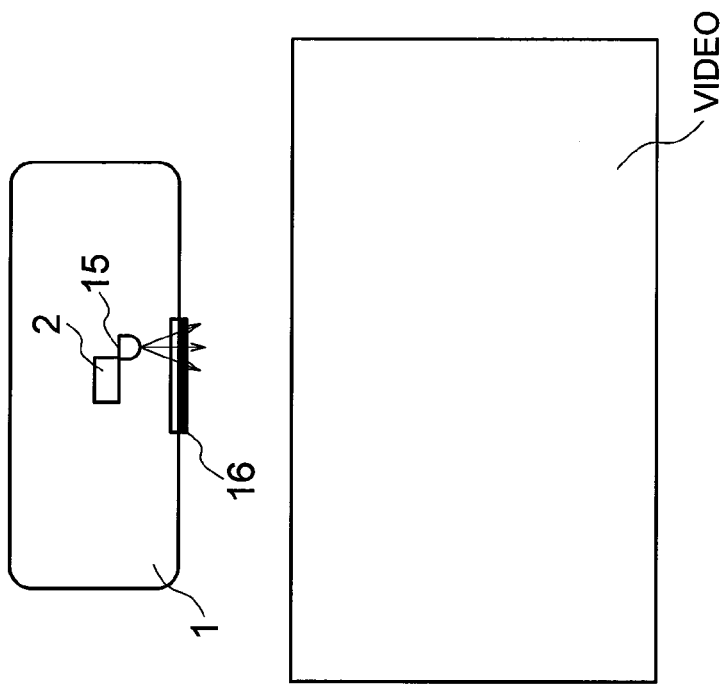
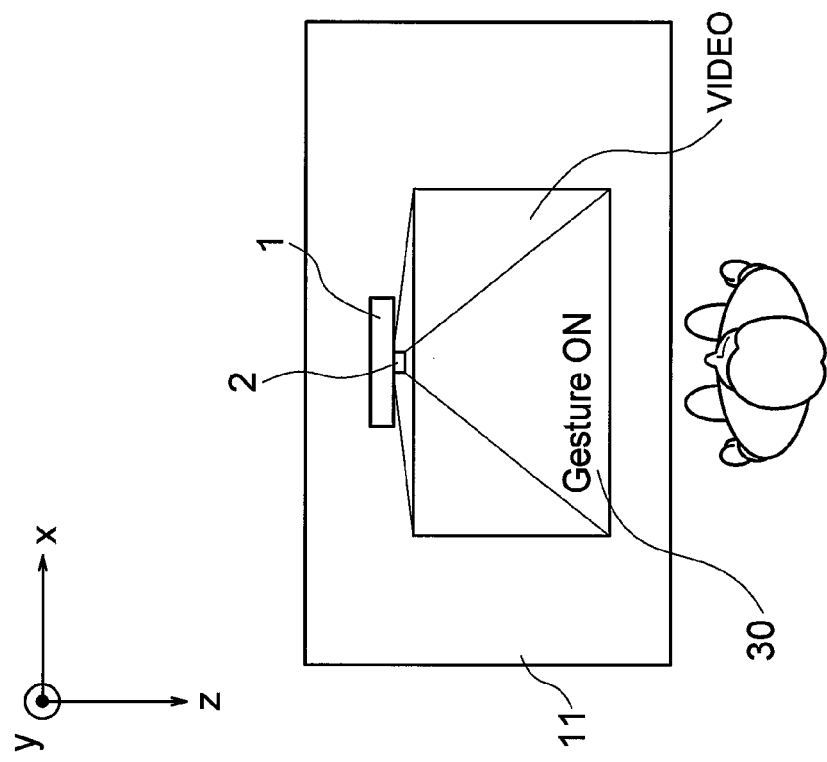

Vobj = α(Tobj−Ts) + Vref   α:AMP GAIN

Vobj = Vback

OUTPUT Vback FOR BACKGROUND TEMPERATURE

Vobj = Vhand

OUTPUT Vhand FOR HAND TEMPERATURE

ΔV DETECTION ⇒ GESTURE DETECTION
※Vhand = Vback DETECTION
NOT POSSIBLE(Thand = Tback)

Vhand = Vref
Vback = $\alpha$(Tback − Tsensor) + Vref ($\alpha = \alpha 1$)

Vhand = Vcc
Vback = $\alpha$(Tback − Tsensor) + Vcc ($\alpha = \alpha 2 > \alpha 1$)

IMAGE PROJECTION DEVICE

INCORPORATION BY REFERENCE

The present application claims priority from Japanese application JP 2013-270922 filed on Dec. 27, 2013, the content of which is hereby incorporated by reference into this application.

BACKGROUND OF THE INVENTION

The present invention relates to an image projection device, and in particular, to an image projection device in which it is possible to control or to operate an image by a gesture of an operator.

JP-A-2011-43834 describes a technique which is the background art of the present technical field. According to the abstract of the publication of the invention, an object is "to provide a projection-type video display apparatus capable of preventing a person who exists within a projected video area and a person who is watching a video from feeling uncomfortable"; and according to the solution to the problem, the projection-type video display apparatus includes "a drive mechanism to adjust the detection range of the person detection means by driving the person detection means movably in a particular direction, and a control means to change the state of the projected video when the person detection means detects existence of a person,".

SUMMARY OF THE INVENTION

According to JP-A-2011-43834, even when the projection range of the projector is changed, the person detection means is controlled to equalize the projection range to the detection range of the sensor to detect a person such that the person is detected by sensing a large action of the person as its target. However, since the detection range is wide and the sensitivity is low, it is difficult to detect a motion or a gesture (to be referred to as a gesture hereinbelow) of the person. For example, for an image projection device (to be simply referred to as a projection device in some cases hereinbelow), a function to detect a gesture of an operator of the projection device to control the projection device itself or a displayed image according to the gesture is under development today. For example, when a certain gesture is detected, a control operation is carried out to turn off power of the projection device, to scroll displayed images, or to feed image frames.

When a configuration in which the image projected by the projection device is controlled or operated by gesture is employed, high responsiveness (operability) and/or high usability are/is required.

It is therefore an object of the present invention to provide a technique for use with an image projection device in which it is possible to control or operate, for example, by a gesture of an operator, to suitably improve the responsiveness (operability) and/or the usability.

To solve the object above, the present invention includes features as claimed in the present specification. The present specification includes a plurality of constituent elements to solve the object. According to a first configuration of the present invention, there is provided an image projection device in which it is possible to control or operate a projected image by gesture, wherein when a gesture in a first direction is detected, an operation signal to control a projected image (for example, to scroll images or to feed image frames) is generated, and when a gesture in a second direction other than the first direction is detected, generation of the operation signal to operate the projected image is suspended. The first direction is, for example, a direction parallel to the projection surface onto which the projection device projects an image and the second direction is, for example, a direction perpendicular to the projection surface.

According to the first configuration, when there is detected a gesture in a second direction (for example, the perpendicular direction with respect to the projection plane) different from the direction of a gesture to control the projected image (for example, to scroll images, or to feed image frames), the control of images based on the gesture is suspended. Hence, for example, when an operator or a viewer desires to give explanation of a projected image or to ask a question about the projected image while pointing the projected image by a finger, it is possible to prevent an event in which the projected image is changed in response to the pointing operation by a finger when the operator or the viewer makes the gesture in the second direction.

According a second configuration of the present invention, there is provided an image projection device in which it is possible to control or operate a projected image by gesture, the image projection device including a temperature sensor to detect a moving direction of a human hand as a gesture, wherein background temperature is detected by the temperature sensor, and the detection sensitivity of the temperature sensor is controlled based on the background temperature.

According to the second configuration, in a situation in which for example, an operator is at a position to directly face the temperature sensor to detect a gesture and makes a gesture to operate the projection device at the position, the movement of the hand of the person, namely, the gesture can be appropriately detected, even if the body of the operator becomes part of the background when making the gesture. It is hence possible to suppress an event in which the gesture is not easily detected in the situation described above.

According to the present invention, in the image projection device in which a projected image can be controlled and/or operated by gesture, it is advantageously possible to improve the responsiveness (operability) and/or the usability.

Other objects, features and advantages of the invention will become apparent from the following description of the embodiments of the invention taken in conjunction with the accompanying drawings.

BRIEF DESCRIPTION OF THE DRAWINGS

FIG. 1 is a conceptual diagram showing a projection device 1 according to a first embodiment of the present invention;

FIG. 3 is a block diagram showing an internal configuration of the projection device 1 according to the first embodiment;

FIG. 8 is a schematic diagram showing a situation in which the image of the projection device is a multi-screen image;

FIG. 25A is a diagram showing a display example of a message indicating that the system is in the gesture invalid mode;

FIG. 25B is a diagram showing a display example of a message indicating that the system is in the gesture invalid mode;

DESCRIPTION OF THE EMBODIMENTS

Figures 2A, 2B:
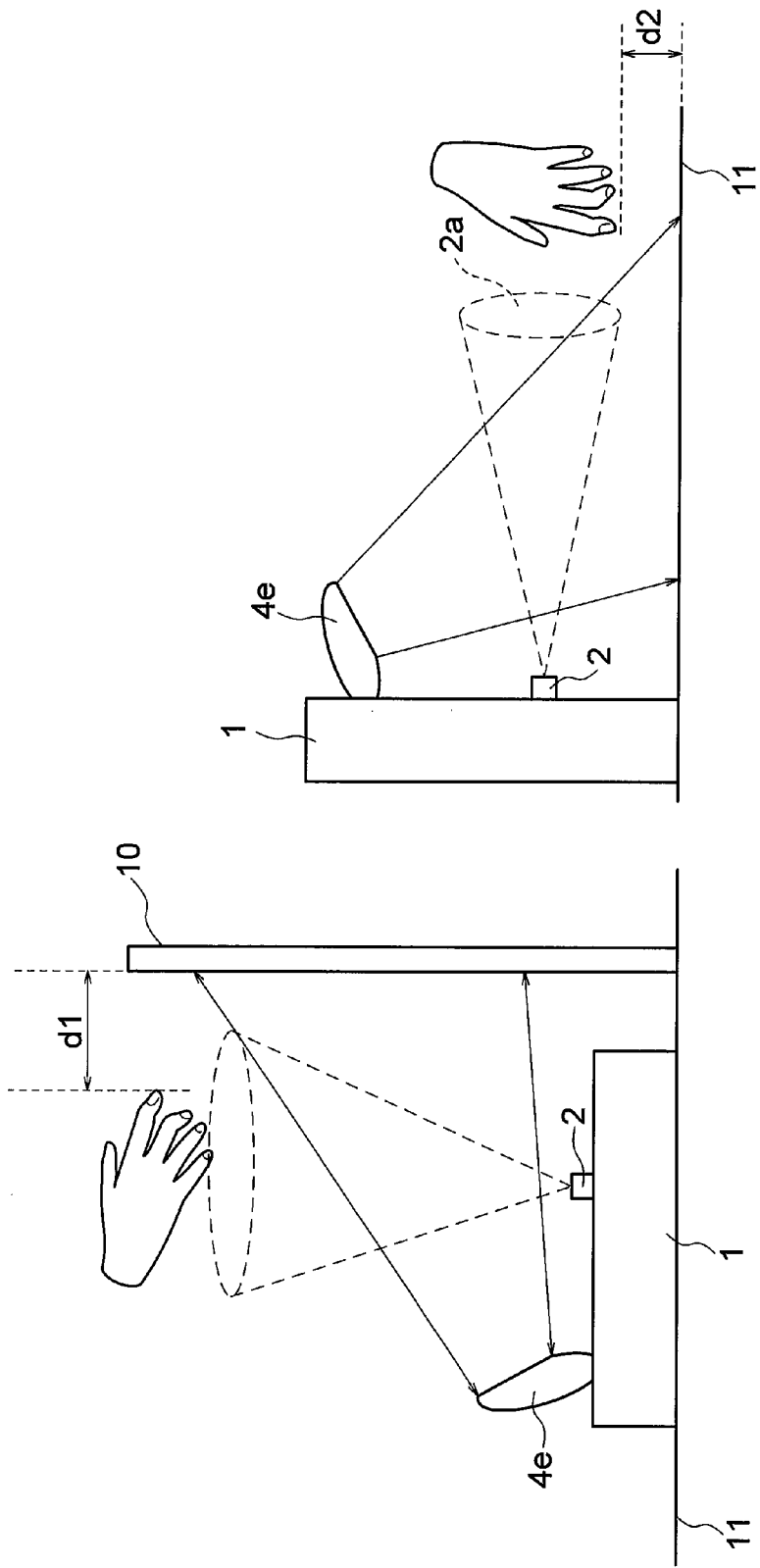
FIG. 2A is a conceptual diagram showing an example of image projection in the projection device 1 at wall-surface projection according to the first embodiment.
FIG. 2B is a conceptual diagram showing an example of image projection in the projection device 1 at desk-top projection according to the first embodiment.

Referring now to the drawings, description will be given of embodiments according to the present invention.

[First Embodiment]

In conjunction with the first embodiment, description will be given of configurations of an image projection device and a detector section to detect a person, an optimal detection range which varies depending on the projection direction, and a detection range controller to perform control for an optimal detection range.

First, description will be given of the configurations of the image projection device and the detector section. FIG. 1 shows an outline of the projection device according to the first embodiment. The configuration of FIG. 1 includes a projection device 1, a sensor element 2, a screen 10, and a projection device stage 11. In the projection device 1 arranged on the projection device stage 11, light of an image from an internal section thereof is reflected by a projection mirror 4e to be projected, to form a projected image onto the screen 10. Incidentally, a reflection mirror 19 is foldably configured and is closed, when not used, in a state in which a reflection surface thereof faces the projection device 1. The sensor element 2 detects an action of a hand of the operator or the direction of the action thereof, as a gesture made within a detection range 2a. The sensor element 2 may include a light source to detect the gesture or may be a passive sensor not including the light source. As the sensor element 2, there may be employed a temperature sensor (for example, a pyroelectric sensor which is a passive sensor) to detect temperature of a mobile object (i.e., a human hand).

Next, description will be given of optimization of the detection range according to the projection direction. FIGS. 2A and 2B are first and second perspective views showing the projection states of the projection device 1. FIG. 2A shows the projection state when an image is projected onto, for example, a screen 10 which is a perpendicular surface (this operation will be referred to as wall-surface projection hereinbelow). FIG. 2B shows the projection state when an image is projected onto, for example, the projection device stage 11 which is a horizontal surface (this operation will be referred to as desk-top projection hereinbelow).

First, description will be given of a situation shown FIG. 2A. In FIG. 2A, an operator who makes a gesture (to be simply referred to as an operator hereinbelow) is in the vicinity of the screen 10 and a viewer who watches the image projected on the screen 10 is apart from the screen. In order that the operator does not obstruct the projected image, the operator generally stands at a position apart the projected image produced by the projection device 1. It is hence likely that the operator is far from the sensor element 2. The screen 10 varies depending on the operation environment of the user and it is considerable that for example, a wall or a sheet-shaped object is adopted as the screen 10. Hence, it is psychologically easy for the operator to be apart from the screen 10. That is, it is assumed that the operator makes a gesture at a position apart from the sensor element 2.

Next, description will be given of a situation of FIG. 2B. In FIG. 2B, the desk-top projection is carried out; hence, the operator rarely obstructs the projected image and it is considerable that the operator makes a gesture in the vicinity of the screen.

Comparing the wall-surface projection of FIG. 2A with the desk-top projection of FIG. 2B, distance d1 from the image projection plane or surface (the screen 10 in this situation) in the wall-surface projection of FIG. 2A to the tip end of a finger of the operator who makes a gesture is more than distance d2 from the image projection surface (the surface of the projection device stage 11 in this situation) in the desk-top projection of FIG. 2B to the tip end of a finger of the operator who makes a gesture. That is, the operation range of the gesture is wider in the wall-surface projection than in the desk-top projection.

Since the required operation range varies between the wall-surface projection and the desk-top projection, it is essential that the detection range of the sensor element 2 is determined in consideration of the operation ranges in the wall-surface projection and the desk-top projection. However, when the detection range is determined to include both of the operation ranges and is hence expanded, sensitivity is lowered as much. Also, since the gesture detection is conducted by including part of the range for one projection state which is not required for the other projection state, it is likely to conduct erroneous detection in which a gesture of other than the operator is detected. As a result, to make the sensitivity compatible with the detection in the required operation range, it is essential to change the detection range according to the projection state.

The projection states are only the wall-surface projection and the desk-top projection in the description. However, the projection direction, the installation place, and the distance between the projection device 1 and the screen 10 are variously selectable. For example, the image may be projected onto the ceiling in addition to the desk top and the wall surface. Also, the installation place may be a wall surface and the ceiling. Hence, it is required to optimally set the detection range 2a depending the arrangement and the projection state.

Next, description will be given of the detection range controller to control the optimal detection range. FIG. 3 shows an internal configuration of the projection device 1 according to the present embodiment in a block diagram. The projection device 1 includes a gesture detector 14 and a projector 4.

Description will now be given of the gesture detector 14. The gesture detector 14 includes a detection signal processing section 3 and a detection range change section 5. The detection signal processing section 3 includes a signal detector 3a, a gesture judge section 3b, and an operation signal generator 3c. In the detection signal processing section 3, the signal detector 3a detects a signal which is supplied from the sensor element 2 and which includes information of a gesture of the operator, to output the signal to the gesture judge section 3b. Next, based on the signal from the signal detector 3a, the gesture judge section 3b executes signal processing to discriminate movements of various gestures, to produce an output signal. Based on the output signal, the operation signal generator 3c generates an operation signal to control or to operate an image, and then outputs the operation signal to an external device 6, for example, a Personal Computer (PC), a smart phone, or the like. Based on the operation signal from the operation signal generator 3c, the external device 6 controls the image signal to be supplied to the projection device 1.

As a result, according to the operation signal created based on the gesture of the operator, the image to be projected from the projection device 1 onto the screen 10 is controlled. For example, according to the direction in which the operator moves a hand, control is performed to scroll displayed images, to feed image frames, or to turn over the slide. As the external device 6, any device which supplies an image signal to the projection device 1 is applicable. For example, there may be used a storage medium in the shape of a card which can be inserted into a card interface disposed in the projection device 1.

Next, description will be given of the projector 4. The projector 4 includes an image controller 4a, a light source section 4b, a light controller 4c, a projection lens 4d, and a projection mirror 4e. Based on an image signal from the external device 6, the image controller 4a outputs control signals to the light source section 4b, and the light controller 4c. The light source section 4b includes a light source to emit light, for example, a halogen lamp, a Light Emitting Diode (LED), or a laser and adjusts the quantity of light according to the output signal from the image controller 4a. When the light source section 4b includes three colors of light, i.e., Red (R), Green (G), and Blue (B), the quantity of light may be independently controlled for each color according to the image signal. The light controller 4c includes constituent components of an optical system such as a mirror, a lens, a prism, and an imager (a display device such as a liquid-crystal panel and a micromirror device). By use of light emitted from the light source section 4b, the light controller 4c performs control to create an optimal image based on the image signal from the external device 6. The projection lens 4d magnifies the optical image outputted from the light controller 4c. The projection mirror 4e reflects light emitted from the projection lens 4d to project the image onto, for example, the screen 10. The projection mirror 4e includes an aspherical mirror. Hence, when projecting images having the same size, the projection distance can be reduced in the present image projection device as compared with general projection devices. In the present embodiment, the projector 4 includes the projection mirror 4e as an example. However, in addition to this configuration, any configuration may be employed if it is capable of conducting image projection. Incidentally, the projection lens 4d and the projection mirror 4e will be collectively referred to as a projection optical section depending on cases hereinbelow.

Next, description will be given of the detection range change section 5. In the following paragraphs, description will be given of a configuration of the detection range change section 5. In particular, description will be given of a detection range change section and the setting of detection sensitivity.

First, description will be given of a configuration of the detection range change section 5. The detection range change section 5 includes a detection range change signal generator 5a and a sensor element controller 5b. The detection range change signal generator 5a detects an installation state of the projection device 1 to output a signal according to the installation state. The detection range change signal generator 5a includes a sensor to detect a projection state (desk-top projection, wall-surface projection, etc.) including the projection distance to the screen 10. As the sensor, there may be employed a mechanical switch to be used by the operator, a gyrosensor to detect inclination of the projection device 1, and a pressure sensor to detect contact with the projection device stage 11. An illuminance sensor may also be utilized. In such situation, by arranging the illuminance sensor in desk-top projection or the wall-surface projection such that the detection surface thereof faces the projection device stage 11, the state can be detected using illuminance of light thus detected by the illuminance sensor. It is also possible that the operator electrically sends a signal to the detection range change signal generator 5a by a remote controller or the like such that the operator manually inputs the installation state of the projection device 1.

The projection state can be detected not only in the desk-top projection and the wall-surface projection. By using the sensor described above, the projection state can also be detected even when the projection device 1 is arranged in an inclined state. When the sensor element 2 includes a laser light source as the light source to detect a gesture, it is possible, by projecting light therefrom onto the screen 10, to measure the projection distance to the screen 10 based on the difference in time between the projection light and the reflection light thereof. A signal associated with information of the distance detected by the sensor element 2 is outputted from the signal detector 3a to the detection range change signal generator 5a.

The sensor element 2 includes a sensing element to sense light, for example, a photodiode to sense laser light or a pyroelectric sensor to sense infrared light emitted from a human body. Depending on electromagnetic waves used for the sensing operation, the sensor to be adopted is determined; further, whether or not the sensor element 2 includes a light source is also determined.

The sensor element controller 5b controls the detection range 2a of the sensor element 2 based on a signal supplied from the detection range change signal generator 5a.

Figure 4:
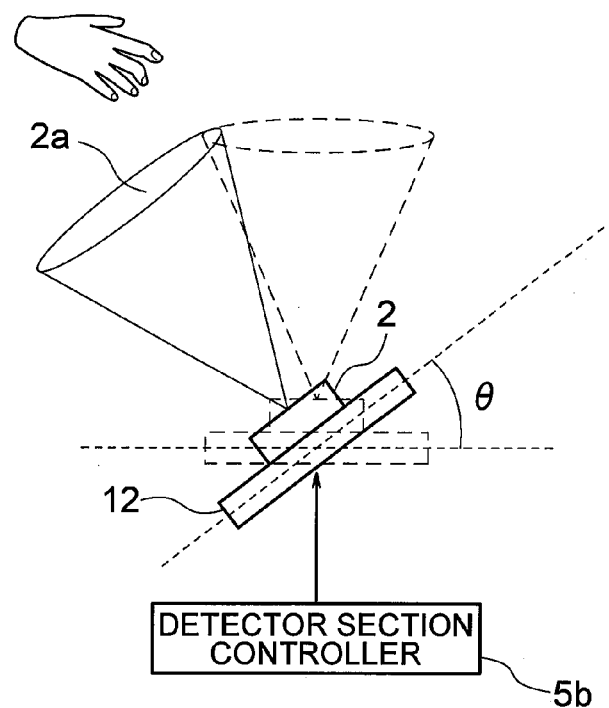
FIG. 4 is a diagram showing a mechanism to adjust inclination of a sensor element 2.

Description will next be given of the detection range change section 5. FIG. 4 shows a mechanism to adjust inclination of the sensor element 2. The sensor element 2 is arranged on a rotary stage 12 of the projection device 1. The rotary stage 12 controls the setting angle of the sensor element 2 according to a signal from the sensor element controller 5b. In this fashion, the position or direction of the detection range 2a can be changed.

To make the detection range 2a larger or smaller, a movable lens may be disposed over the sensor element 2. Depending on the projection direction of the projection device 1, the movable lens changes the distance to the sensor element 2 to adjust the detection range 2a. When the sensor element 2 is a pyroelectric sensor to detect a change in intensity of electromagnetic waves, for example, infrared light, it is possible to make the detection range 2a larger or smaller by moving positions of a hole and a Fresnel lens in the upper section of the pyroelectric sensor.

Figure 5:
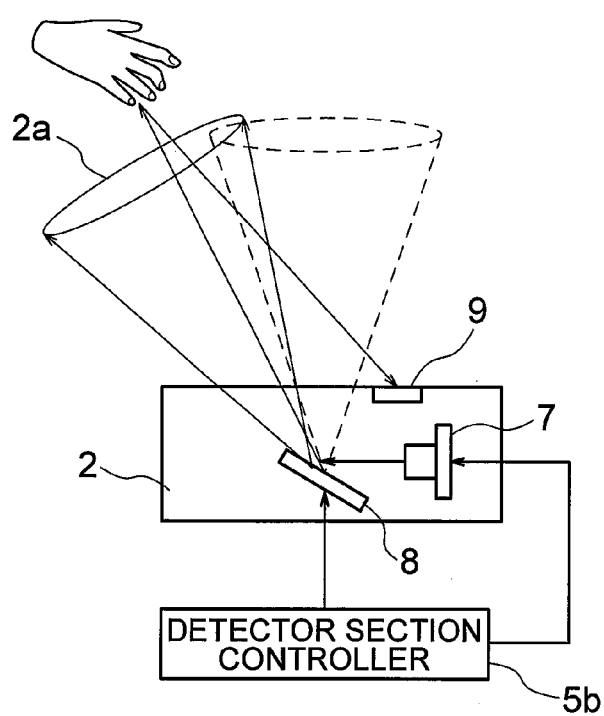
FIG. 5 is a diagram to explain a method of adjusting the detection range using laser scanning.

FIG. 5 is a diagram to explain a method of adjusting the detection range using laser scanning. The sensor element 2 includes a laser light source 7, a variable-angle mirror 8, and a light-receiving element 9. The sensor element controller 5b outputs control signals to the laser light source 7 and the variable-angle mirror 8. When the variable-angle mirror 8 receives the signal from the sensor element controller 5b, the angle of the variable-angle mirror 8 is adjusted to the setting angle associated with the signal. By disposing the laser light source 7 on a rotary stage 12 shown in FIG. 4, the detection range 2a can be naturally controlled.

Figure 6:
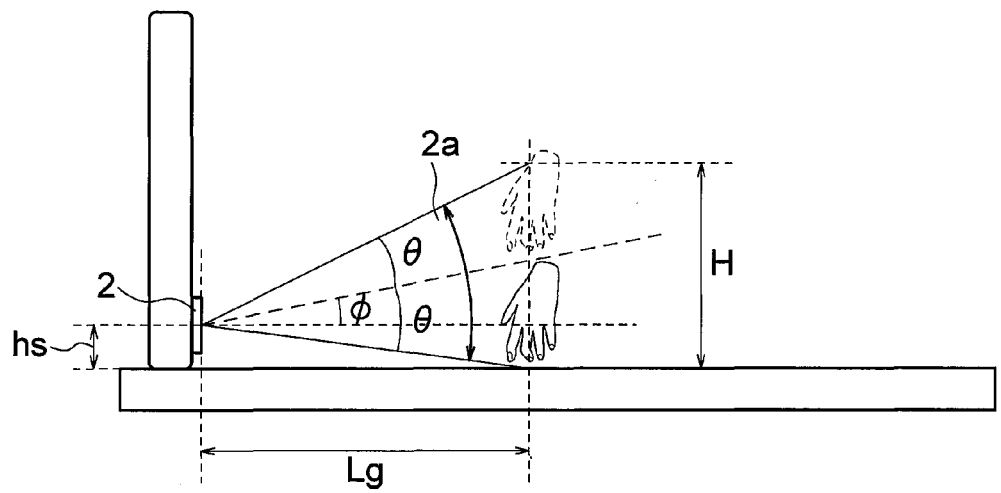
FIG. 6 is a diagram showing an example of the detection range setting when an image is projected onto a desk.

Description will now be given of the setting of the detection range when a gesture is made. FIG. 6 shows an example of the detection range setting when an image is projected onto a desk. Specifically, there is shown a relationship among a detection range (angle) 2θ of the sensor element 2, angle φ between the direction of the normal of the projection device 1 and the detection central line of the sensor element 2 (to be referred to as a detection central angle hereinbellow), a distance Lg from the sensor element 2 to the gesture position (distance between the detection surface of the sensor element 2 and the center of the middle finger; to be referred to as a gesture position hereinbelow), a distance hs in the perpendicular direction between the projection device stage 11 and the center of the sensor element 2, and operation range H. Relationships among detection range (angle) 2θ, detection central angle φ, and respective parameters are represented as below.

$$2\theta = \arctan((H-hs)/Lg) + \arctan(hs/Lg) \quad (1)$$

$$\phi = (\tfrac{1}{2})(\arctan((H-hs)/Lg) - \arctan(hs/Lg)) \quad (2)$$

As can be seen from Expressions (1) and (2), the detection range 2θ and the detection central angle φ are determined by the gesture position Lg, the height hs of sensor element 2, and operation range H. The operation range H varies depending on the projection state of the projection device 1. As described in conjunction with FIG. 2, the operation range H is large in the wall-surface projection and is small in the desk-top projection. In consideration of the actual operation environments, the operation range H ranges from several centimeters to about ten centimeters in the desk-top projection and ranges from several centimeters to several tens of centimeters in the wall-surface projection. The gesture position Lg may be, for example, the distance to the edge of the screen size most apart from the projection device 1. When a laser light source is adopted in the sensor element 2, the operation range H may be set to an area in which laser light does not enter human eyes for safety. In the desk-top projection, when the person takes a position in front of the projection device 1, the detection range 2θ and the detection central angle φ may be determined such that laser light does not enter human eyes.

Next, description will be given of the setting of the detection sensitivity. When a passive sensor, for example, a pyroelectric sensor not including a light source to detect a gesture is adopted as the sensor element 2, it is advantageous to set, in order to detect a gesture with high precision, so as to prevent the detection ranges from overlapping with the desk top or the wall surface.

Figures 7A, 7B:
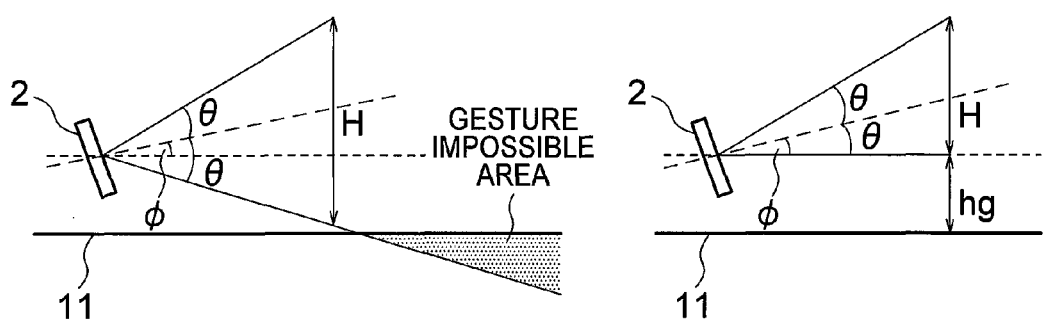
FIG. 7A is a diagram to explain a detection method when a passive sensor is employed.
FIG. 7B is a diagram to explain a detection method when a passive sensor is employed.

FIGS. 7A and 7B show the detection method when a passive sensor is employed. For example, when a pyroelectric sensor is employed as the passive sensor, the quantity of detection of the pyroelectric sensor is determined by the ratio of the heat source occupying the detection range and the quantity of heat. That is, the detection quantity increases when the ratio of the gesture (the width or range of the action of the person) to the detection range becomes larger. On the other hand, when the detection range overlaps with the projection device stage 11 as shown in FIG. 7A, there exists an area in which the gesture cannot be made. Hence, a large quantity of detection cannot be easily obtained in this situation. To increase the detection quantity, there is disposed, for example, insensitive zone hg below the detection range as shown in FIG. 7B to exclude the area in which the gesture is impossible, which makes the detection range narrower, to thereby optimize the detection range. It is resultantly possible to obtain a large detection quantity.

In addition to the adjustment of the installation state of the projection device 1 as above, it is also possible to adjust sensitivity according to the operator and the environments of the operator or the projection device 1. For example, for the detection quantity of the pyroelectric sensor, even when a gesture is made under the same condition, since the temperature of the hands varies between the operators, the detection quantity varies between the operators. Further, for the same operator, the detection quantity changes depending on the environmental temperature. Also, when the detection is conducted using a laser, the detection quantity varies depending on reflectance of the hand of the operator. Hence, the detection area may be adjusted according to the operator and the environment to increase the sensitivity. For example, if the human hand has a low temperature when a pyroelectric sensor is employed, the sensitivity of the pyroelectric sensor may be increased. Also, for example, if the human hand is low in reflectance when a sensor including a laser light source is employed, it is possible to increase the intensity of laser or to limit the scanning range of the laser light, to thereby partly increase the sensitivity.

FIG. 8 schematically shows a situation in which the projection device 1 projects a multi-screen image. In FIG. 8, there are displayed three screens including a main screen and two sub-screens. In a situation in which while viewing the main screen, the operator conducts an operation by making a gesture, for example, for an icon displayed in a sub-screen, it is not required to set the main screen in the detection range. Hence, the detection range is limited to the two sub-screens. When the detection range is narrowed, the detection quantity of the sensor element 2 becomes larger and the detection sensitivity becomes higher. Further, the laser intensity may be set to mutually different values respectively for the sub-screens, and mutually different detection ranges may be set respectively for the sub-screens.

The sensitivity of the sensor may be set or adjusted by the operator. It is also possible to arrange a test mode in the projection device 1, such that detection tests are conducted in the test mode under a predetermined condition, to keep results of the tests. By referring to the test results, the sensitivity may be automatically adjusted. Further, for example, when the sensor element 2 includes a light source, the quantity of reflection light varies depending on the reflectance of the hand of the operator, and the detection sensitivity changes as a result. To cope with this event, it is also possible that the light source emits light having predetermined luminance and then reflection light from the hand of the operator is detected, to thereby determine luminance of the light source of the sensor suitable for the operator according to the quantity of reflection light.

As above, according to the present embodiment, the detection range change signal generator 5a detects the installation state (the wall-surface or desk-top projection) of the projection device 1. Based on the installation state, the sensor element controller 5b controls the detection range in which the sensor element 2 can detect a gesture. Hence, an appropriate detection range can be determined according to the installation state of the projection device 1. For example, for the wall-surface projection, the detection range of the sensor element 2 is enlarged; for the desk-top projection, the detection range is narrowed. Hence, according to the present embodiment, it is possible to improve operability to control or to operate a projected image of the projection device according to a gesture.

[Second Embodiment]

In conjunction with the second embodiment, description will be given of a method of detecting a gesture by a line scanning operation using a laser light source in the sensor element 2. First, description will be given of the principle of a TOF method employed to detect a gesture by laser line scanning and the configuration for the line scanning operation using a laser light source, and then description will be given of control of the detection area.

Figure 9:
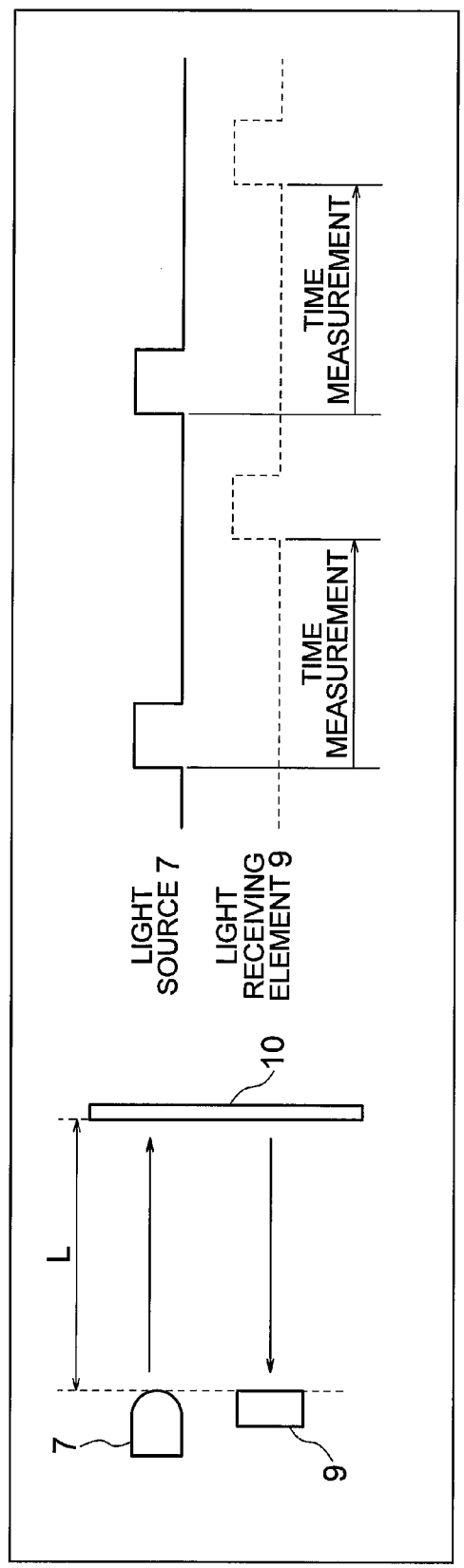
FIG. 9 is a diagram graphically showing the principle of the Time-Of-Flight (TOF) method used to detect a gesture by line scanning by use of a laser light source according to a second embodiment of the present invention.

Description will now be given of the principle of the TOF method. FIG. 9 graphically shows the principle of the TOF method. The TOF method is a distance measuring method using the difference between the light emission time of a laser light source 7 and the time when light-receiving element 9*a* receives the reflection light from the screen 10. Assuming the difference of time as t [s] and the light speed is $3.0 \times 10^8$ [m/s], distance L [m] is represented as below.

$$L \text{ [m]} = 3.0 \times 10^8 \times t/2 \qquad (3)$$

Next, description will be given of the configuration for the line scanning operation using a laser.

Figure 10:
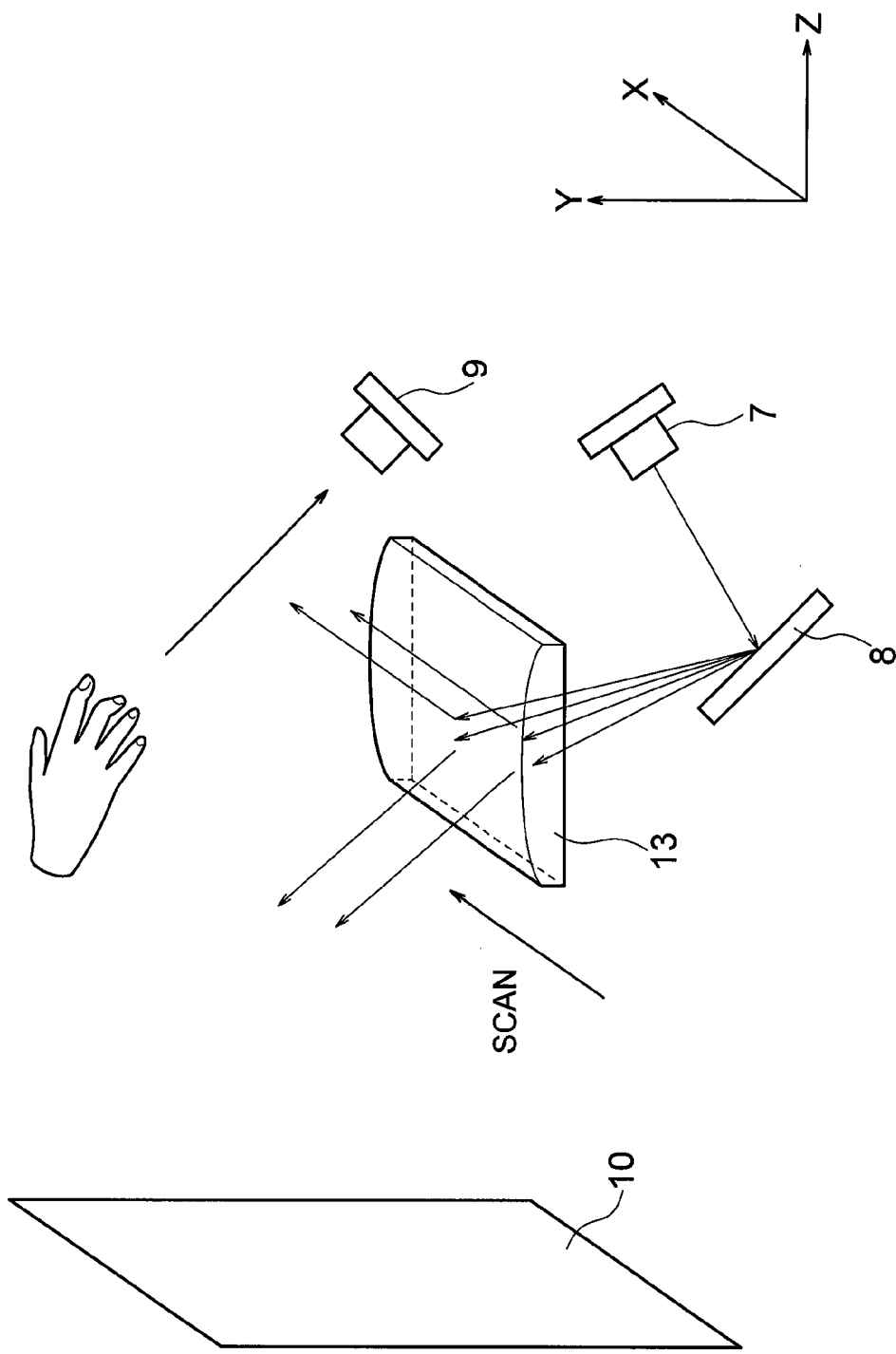
FIG. 10 is a conceptual diagram showing a configuration to implement the line scanning using a laser light source according to the second embodiment.

FIG. 10 conceptually shows a configuration to implement the line scanning operation by use of a laser light source. The line scanning is carried out by using a laser light source 7, a variable angle mirror 8, a light receiving element 9, and a cylindrical lens 13.

Light emitted from the laser light source 7 is reflected to a direction of a particular angle by the variable angle mirror 8 which reciprocally moves in a predetermined direction (the x direction parallel to the x axis). The light reflected from the variable angle mirror 8 enters the cylindrical lens 13 to be a line light source having a width in the z direction parallel to the z axis. By scanning the line light source in the x direction, it is possible to implement the line scanning which extends in the z direction and which makes it possible to detect a movement in the x direction. When the laser light thus line-scanned is radiated onto a hand of a person, the laser light is reflected from the hand to be received by the light receiving element 9. By calculating the distance by use of the light receiving timing and the TOF method, it is possible to detect a gesture.

The variable angle mirror 8 includes a mirror to conduct scanning only in the x direction shown in FIG. 10. The sensor element 2 using a laser of the first embodiment includes a mirror to conduct two-dimensional scanning and is hence expensive, but is capable of detecting information in the directions of three axes. On the other hand, the mirror of this embodiment conducts one-dimensional scanning and detects information only in the directions of two axes, but is less expensive. The present embodiment demonstrates a method in which by using the mirror 8 for one-dimensional scanning and the cylindrical lens 13, the system is less expensive, but is capable of obtaining almost the same function as for the situation in which a mirror for two-dimensional scanning is employed.

Figure 11B:
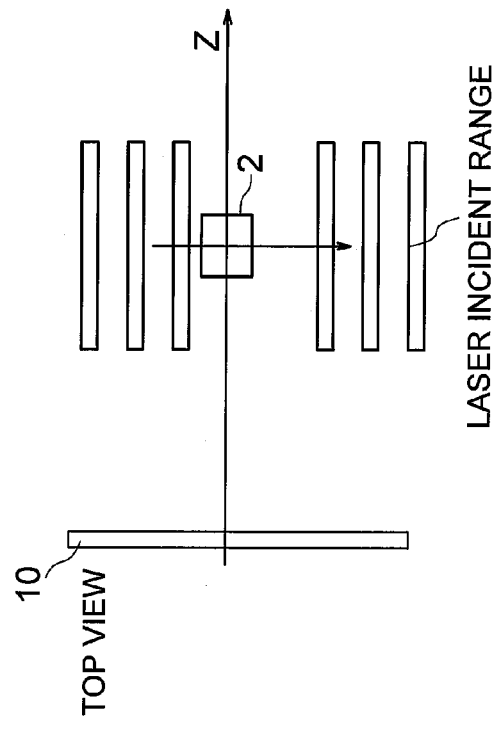
FIG. 11B is a diagram showing an example of the laser incident range of a sensor element 2 according to the second embodiment.
Figure 11A:
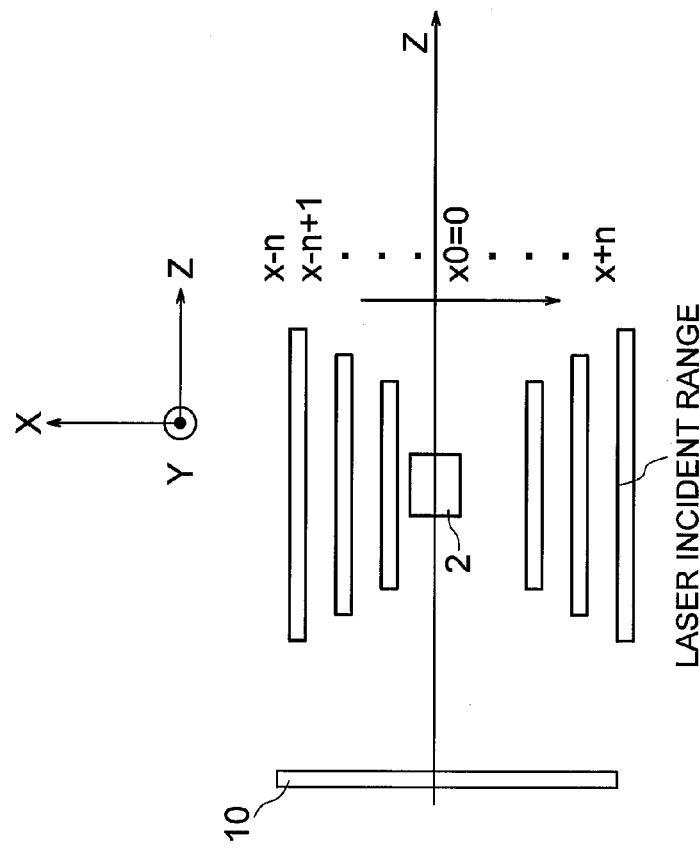
FIG. 11A is a diagram showing an example of the laser incident range of a sensor element 2 according to the second embodiment.

Next, referring to FIGS. 11A and 11B, description will be given of control of the detection area 2. FIGS. 11A and 11B show laser incident ranges of the sensor element 2 viewed from the +y axis direction. The x, y, and z axes are indicated in FIG. 10. FIG. 11A shows a state of the laser incident range viewed from a point over an x-z plane. The position just above the sensor element 2 and both edges of the line scanning range are represented as x0 (x=0) and x+n and x−n in the x coordinate. That is, the area from x+n to x−n is the line scanning range. In the rectangle elongated in the horizontal direction (z direction) in the drawings, the length of the long side represents the laser incident range and that of the short side represents intensity of light. At x0, since the distance from the sensor element 2 to the x-z plane is short, the laser incident range is narrow. On the other hand, at x+n and x−n, since the distance from the sensor element 2 to the x-z plane is long, the laser incident range is wide. Hence, the intensity of laser light varies between the point just above the sensor element 2 and the edges of the line scanning range, and the detection sensitivity is lower as the distance between the point just above the sensor element 2 and each edge of the line scanning range becomes larger. That is, when a gesture is made at the edge of the screen 10, it is likely that the detection sensitivity cannot be appropriately obtained in some cases. Hence, to obtain equal detection sensitivity for a gesture made at any position of the screen, it is required that the intensity of laser light is kept unchanged at any place in the line scanning range.

FIG. 11B shows an example in which to keep intensity of light at a predetermined value at any position in the line scanning range, the laser incident range is controlled to be a predetermined range at each position in the line scanning range. In the present embodiment, to keep the laser incident range unchanged at each position in the line scanning range, the curvature of the lens surface of the cylindrical lens 13 is changed for the position just above the sensor element 2 (reference is to be made to FIG. 10) and both edges thereof. For example, the curvature of the lens surface of the cylindrical lens 13 is reduced at the position corresponding to the position just above the cylindrical lens 13. The curvature of the lens surface gradually increases in the direction from the position just above the cylindrical lens 13 to each edge thereof. To uniformalize the intensity of light, it is efficient that the laser incident range is smaller in the edges of the line scanning range than at the position just above the sensor element 2. In an x-z plane, laser light from the sensor element 2 is radiated from an inclined direction onto the edges thereof in the x direction. Even when the intensity of laser light is kept unchanged, the view angle viewed from the light receiving element 9 is smaller than that just above the sensor element 2. Hence, at the edges of the line scanning range, the intensity of received light is relatively low and sensitivity is reduced. In contrast, by minimizing the laser incident range at the edges of the line scanning range, almost equal sensitivity can be obtained even when a gesture is made at any position of the screen 10.

Description has been given of a configuration in which the intensity of the laser light is adjusted in the laser incident range. However, the intensity of light emitted from the laser light source 7 may be adjusted depending on whether the light is emitted onto the position just above the sensor element 2 or onto the edges of the line scanning range. Any method capable of similarly implementing the function described above is applicable.

To prevent the light emitted from the projection device 1 from affecting the gesture detection, it is favorable that the laser light source 7 and the light receiving element 9 operate using infrared wavelengths. Due to the infrared wavelengths, the gesture detection can be carried out with high sensitivity also under outdoor daylight.

[Third Embodiment]

The third embodiment is associated with an idea to prevent occurrence of erroneous detection during the gesture detection in the desk-top projection. First, description will be given of the overall system of the present embodiment.

Figure 12:
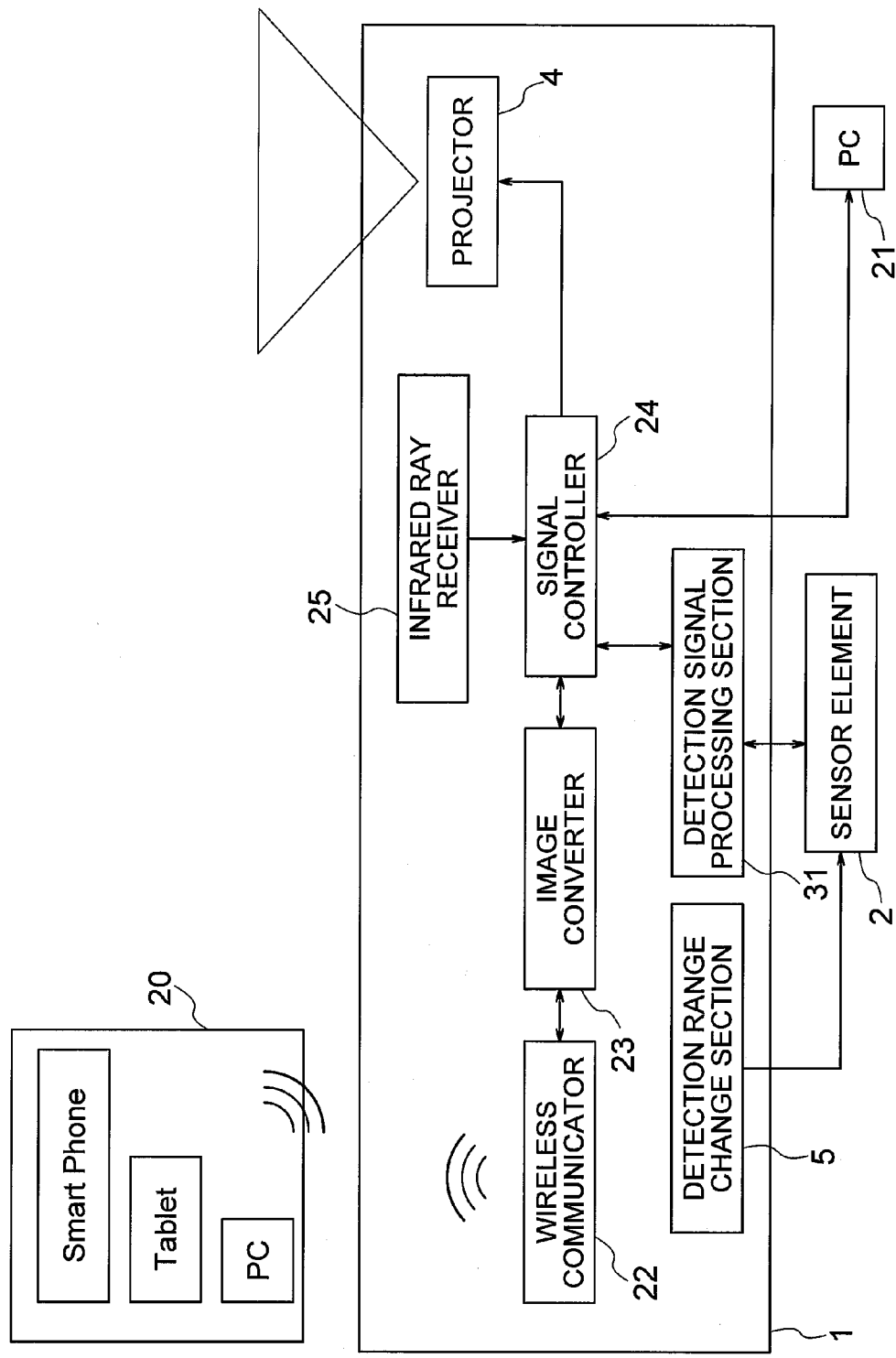
FIG. 12 is a block diagram showing an internal configuration of a projection device 1 in a third embodiment of the present invention and an overall system configuration including the projection device 1.

FIG. 12 shows a configuration of the overall system including the projection device 1. The system includes a projection device 1, a wireless device 20, and a personal computer 21. The projection device 1 includes a sensor element, a detection signal processing section 31, a projecting section 4, a detection range change section 5, a wireless communication section 22, an image conversion section 23, and a signal controller 24. The wireless device 20 includes, for example, a smart phone, a tablet device, and/or a personal computer capable of conducting wireless communications via, for example, a wireless Local Area Network (LAN). An image to be projected from the projection device 1 is supplied from the personal computer 21 connected through wire to the projection device 1 or from the wireless device 20 through wireless transmission to the projection device 1.

The image signal from the personal computer 21 is inputted through wire to the signal controller 24, which then outputs a control signal according to the image signal to the projecting section 4. Also, the signal controller 24 generates an operation signal according to a detected gesture to send the signal to the personal computer 21. The operation signal is used to control the image signal supplied from the personal computer 21 to the projection device 1 and/or the image signal to be displayed on a monitor of the personal computer 21.

The wireless device 20 modulates and encodes the image signal and wirelessly transmits the resultant signal to the wireless communication section 22 of the projection device 1 by using WiFi (registered trademark), BlueTooth (registered trademark), or the like. Having received the image signal, the wireless communication section 22 outputs the image signal to the image conversion section 23. The image conversion section 23 receives the image signal and then, for example, demodulates and decodes the image signal to convert the image signal into a signal available for the image output, and sends the obtained signal to the signal controller 24. The signal controller 24 receives the image signal and controls, based on the image signal, the projection image to be created by the projection section 4. Further, the signal controller 24 generates an operation signal according to the detected gesture to send the operation signal via the wireless communication section 22 to the wireless device 20. In this situation, the modulation and encoding required to wirelessly transmit the operation signal may be conducted by the image conversion section 23 or the wireless communication section 22. The operation signal from the wireless communication section 22 is inputted to the wireless device 20, to thereby control the image signal to be wirelessly transmitted from the wireless device 20 and/or the image signal to be displayed on the monitor section of the wireless device 20.

Description will be given of a problem when the detection range is set on a display image at desk-top projection, an example of a configuration to solve the problem, and how to use the configuration.

Figure 13B:
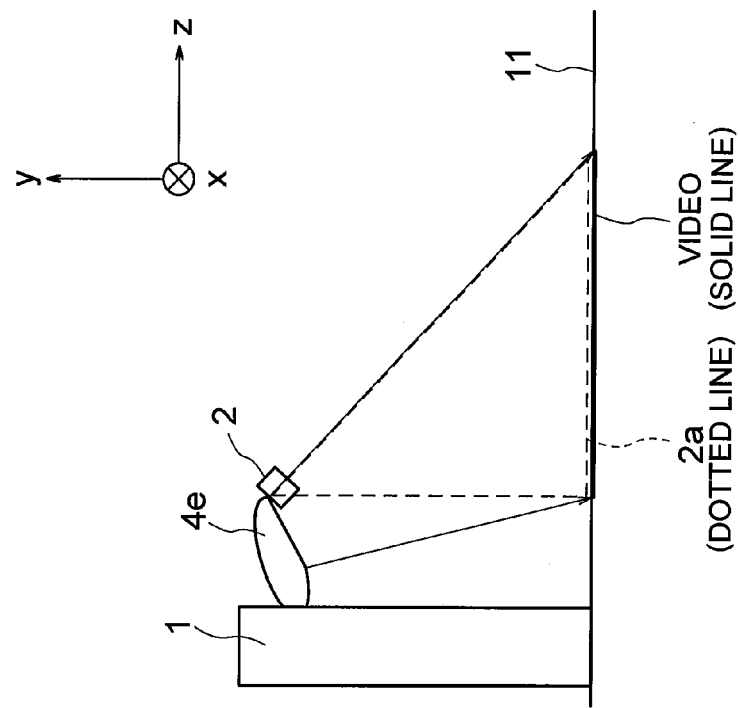
FIG. 13B is a diagram showing an example in which the detection range 2a is equal in size to the display image.
Figure 13A:
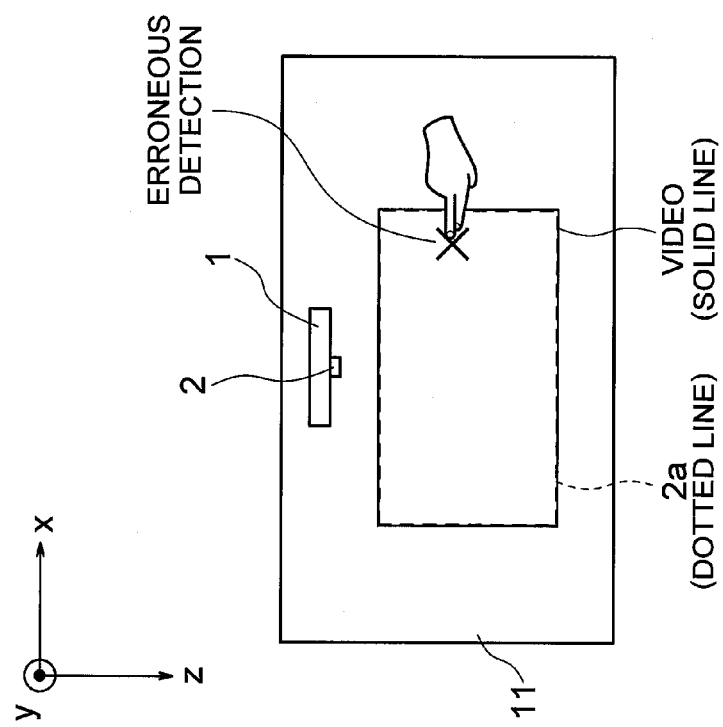
FIG. 13A is a diagram showing an example in which a detection range 2a is equal in size to the display image.

First, description will be given of a problem when the detection range is set on a display image. FIG. 13A shows a situation in which the projection device 1 is arranged to conduct desk-top projection and the detection range 2a is set to be substantially equal in size to the display image projected from the projection device 1, the situation being viewed from above (+y direction). FIG. 13B shows a view of the situation of FIG. 13A viewed from the −x direction to the +x direction. In the drawing, the vertical direction of the display image projected onto the projection surface or plane (the plane of the projection device stage 11 in FIGS. 13A and 13B) is represented by the z axis, the horizontal direction of the display image is represented by the x axis, and the direction (perpendicular direction) vertical to the display image (the projection plane) is represented by the y axis. The projection device 1 of FIGS. 13A and 13B is configured, like the first embodiment, such that light of an image from the inside thereof is reflected by the projection mirror 4e to be projected onto the projection device stage 11. The sensor element 2 is disposed over the projection device 1, to thereby detect a gesture within the display image. FIGS. 13A and 13B show an example in which the sensor element 2 is disposed on the reflection mirror 19. In this example, although the detection range 2a for the sensor element 2 to detect a gesture is advantageously wide, there is a problem that it is likely to erroneously detect an action of a person other than the operator.

Figure 14B:
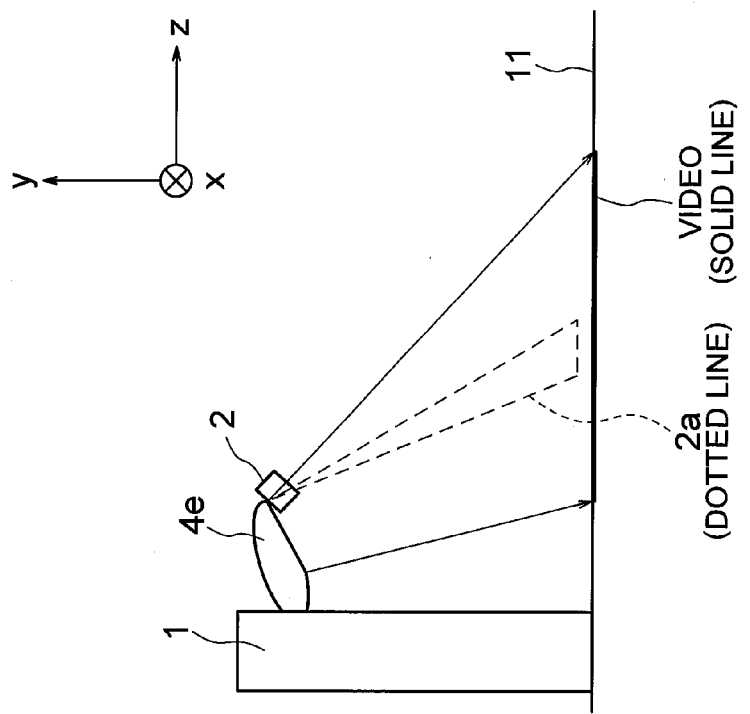
FIG. 14B is a diagram showing an example in which the detection range 2a is set only to a central area of the display image.
Figure 14A:
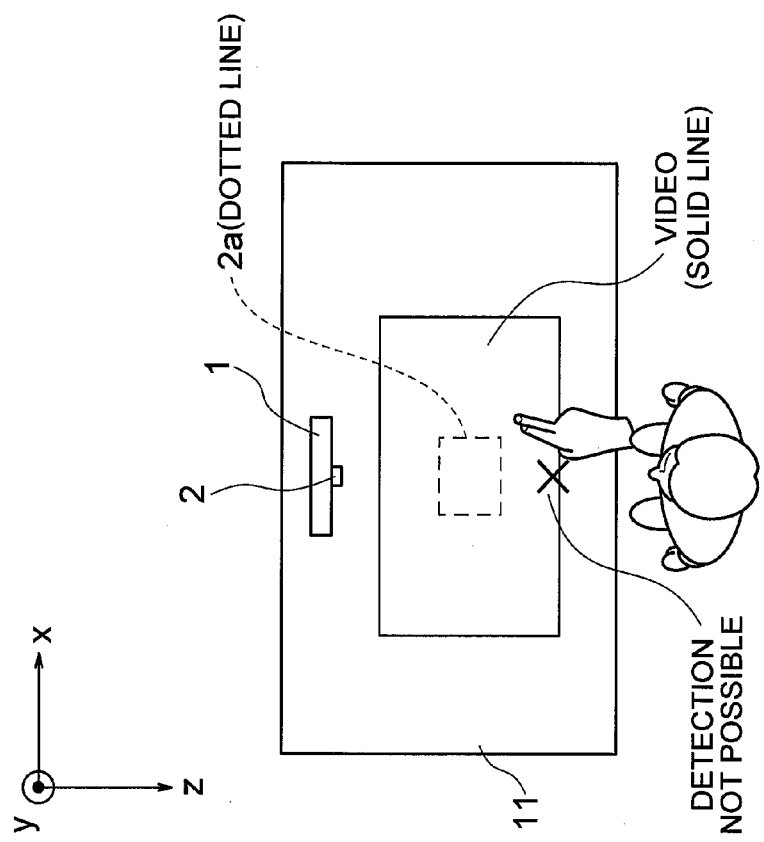
FIG. 14A is a diagram showing an example in which the detection range 2a is set only to a central area of the display image.

FIG. 14A is a diagram showing a situation in which the projection device 1 is arranged for the desk-top projection and the detection range 2a is set only to the center of the display image, the situation being viewed from above (+y direction). FIG. 14B shows the situation of FIG. 14A viewed from the −x direction to the +x direction. In the example of FIGS. 14A and 14B, although it is advantageous that the erroneous detection of a person other than the operator takes place less frequently, there is a problem that since the operation range 2a of the operator is limited, it is likely that the gesture of the operator is not easily detected. In consideration of an event that the operator is just in front of the display screen and faces the screen to conduct operation in many cases, it is desirable that the center of the display image in the vertical direction (z direction) is secured as the detection range. However, when the center of the display image in the vertical direction is set as the detection range, it is required that the detection range is in the elongated contour. For this purpose, it is required that a lens and a reflection member are additionally disposed in the sensor element 2 and the sensor element 2 is designed again according to the installation position of the projection device 1. Hence, there is required a configuration in which the erroneous detection of a gesture on the display image takes places less frequently and the detection range required for the operation is secured without increasing the members and the designing period of time.

Figure 15B:
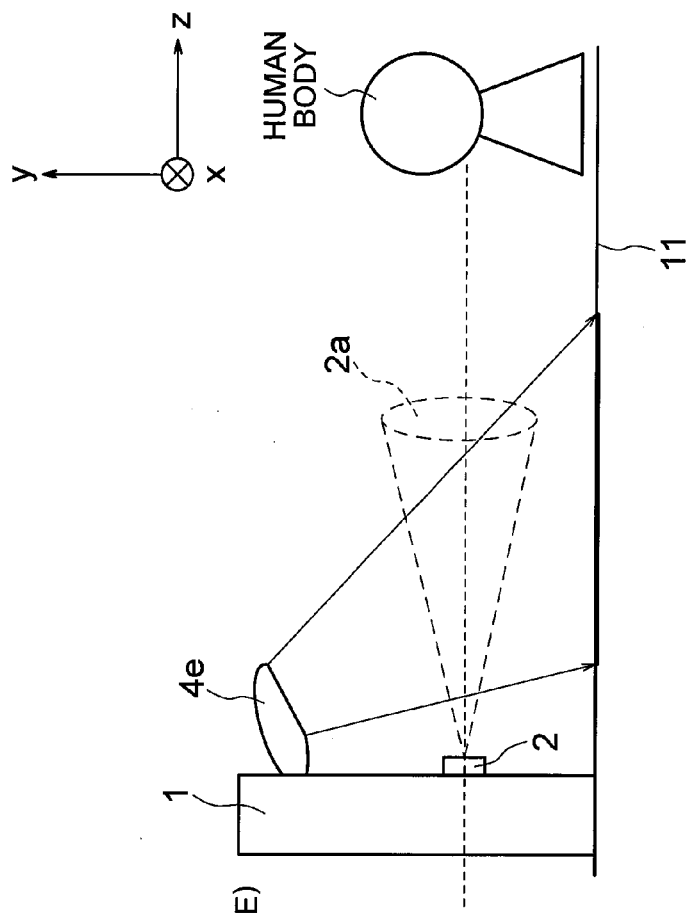
FIG. 15B is a diagram showing a configuration in which the central axis of the sensor element 2 is directed to the human body side.
Figure 15A:
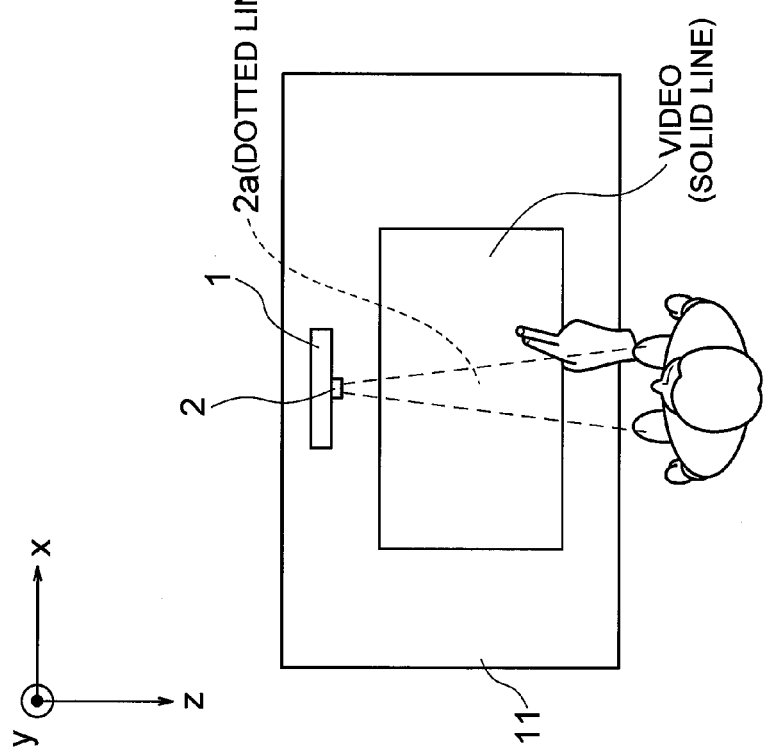
FIG. 15A is a diagram showing a configuration in which the central axis of the sensor element 2 is directed to the human body side.

Next, description will be given of a situation in which the detection range includes other than the display image. FIG. 15A shows a configuration in which the central axis of the sensor element 2 is directed to the human body side (operator side). FIG. 15B is the configuration of FIG. 15A viewed from the −x direction to the +x direction. In the example shown in FIGS. 15A and 15B, the detection range is disposed just in front of the operator. Hence, it is possible to further reduce occurrence of the erroneous detection due to other than the operator on the display screen. Further, since the gesture can be detected in the center of the display image in the vertical direction, it is possible to secure the detection range required to detect the gesture.

As above, comparing the examples of the detection range shown in FIGS. 13A and 13B, FIGS. 14A and 14B, and FIGS. 15A and 15B with each other, the example shown in FIGS. 15A and 15B is advantageous in the gesture detection precision including possibility of occurrence of the erroneous detection. However, the sensor element in the example shown in FIGS. 15A and 15B is disposed at a position at which not only the hand and an action of the hand of the operator making a gesture, but also the body and an action of the operator are detected. Hence, it is likely that the erroneous detection occurs due to the action of the operator's body. When a thermopile to detect heat of a human body is adopted as the sensor element 2, there takes place a problem that the detection signal is saturated due to the difference in temperature between the body of the operator and the sensor element 2. The present embodiment solves these problems and provides a high-precision gesture system in which the erroneous detection is less frequently takes place.

Description will now be given of a configuration to remove the problems of the erroneous detection for an action of a person and the detection signal saturation due to the difference in temperature between the body of the operator and the sensor element 2. In the present embodiment, a temperature sensor of passive type, for example, a pyroelectric sensor is employed as the sensor of the sensor element 2.

[Measures to Erroneous Detection of Action of Operator]

Next, for the measures to overcome the erroneous detection of an action of the operator, description will be given a basic action of a gesture and details of the erroneous detection and a method of removing the erroneous detection.

Figure 16A:
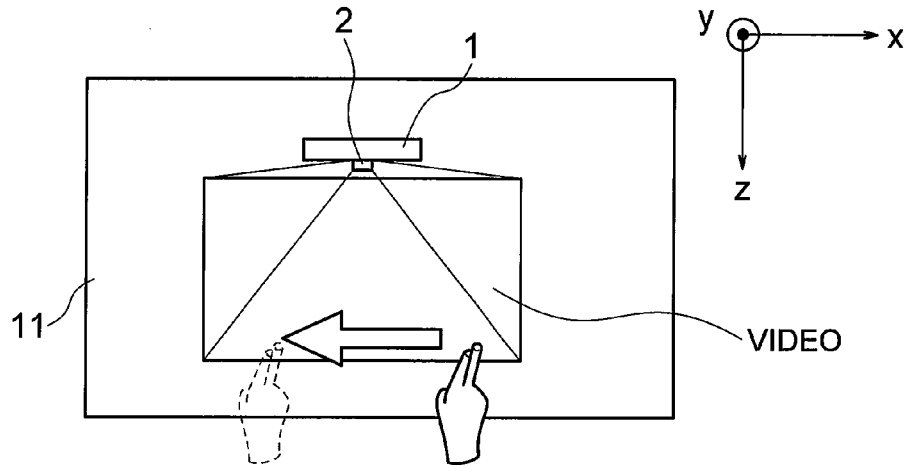
FIG. 16A is a diagram showing a basic movement conducted by the operator.
Figure 16B:
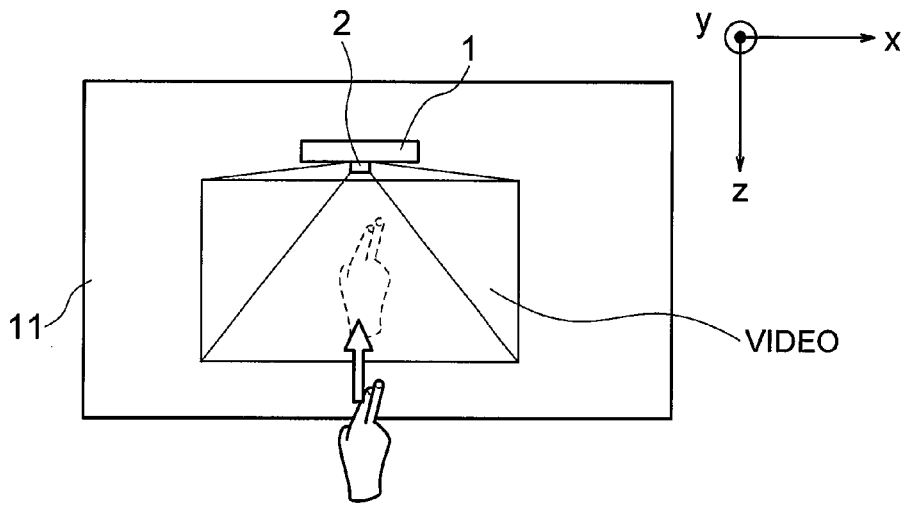
FIG. 16B is a diagram showing a basic movement conducted by the operator.
Figure 16C:
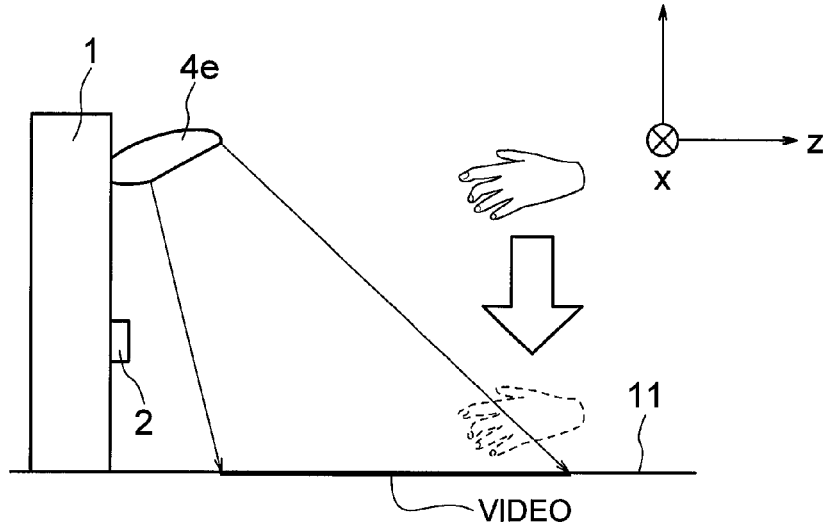
FIG. 16C is a diagram showing a basic movement conducted by the operator.

First, description will be given of a basic action of a gesture. FIG. 16A to FIG. 16C show a basic action of a gesture made by the operator. When the operator makes a gesture in the x-axis direction (FIG. 16A), in the z-axis direction (FIG. 16B), and in the y-axis direction (FIG. 16C), there is obtained an operation of a projected image according to the gesture. To prevent detection of a gesture other than the gesture which the operator intends to make (to be referred to as erroneous detection hereinbelow), it is required to take the movement of the person and the operation environment into consideration.

In the present embodiment, causes of the erroneous detection to which some measures are to be taken are "sequential movements of a gesture made by the operator", "movements of the body of the operator", and "movements of the hand in the y-axis direction". Description will now be given of these causes and solutions of the problems. It is assumed in the present embodiment that at desk-top projection, based on a gesture in the direction (particularly, in the x direction) parallel to the projection plane on which an image is displayed (the plane on the projection device stage 11 in this example), the displayed image is controlled or operated, for example, to scroll displayed images, to feed image frames, or to turn over the slide.

Figure 17:
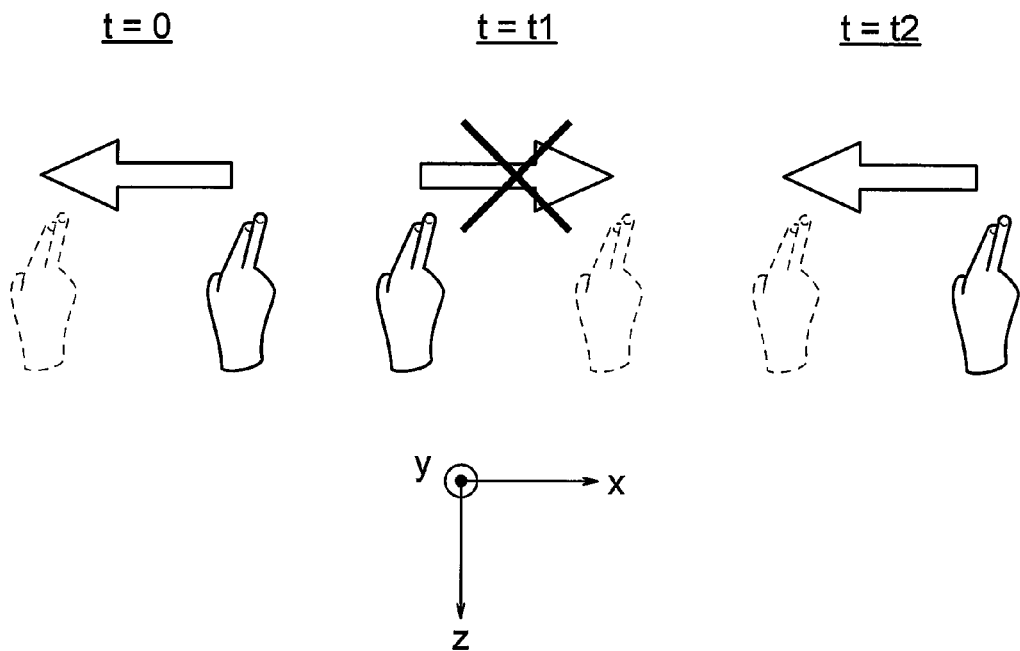
FIG. 17 is a diagram showing sequential actions conducted by the operator, for example, to turn over slides.

First, description will be given of "sequential movements of a gesture made by the operator". FIG. 17 shows sequential actions of a gesture conducted by the operator. In this example, the operator moves the hand in the −x axis direction at t=0, and in the +x axis direction at t=t1, and then again in the −x axis direction at t=t2. For example, when the operator desires to repeatedly conduct the operation in the −x axis direction (for example, to consecutively turn over slides), the action at t=t1 is not desired by the operator. However, to conduct the operation consecutively in a particular direction, an action in the direction opposite to the particular direction is required. Hence, it is likely that the action in the opposite direction is erroneously detected.

Figure 18:
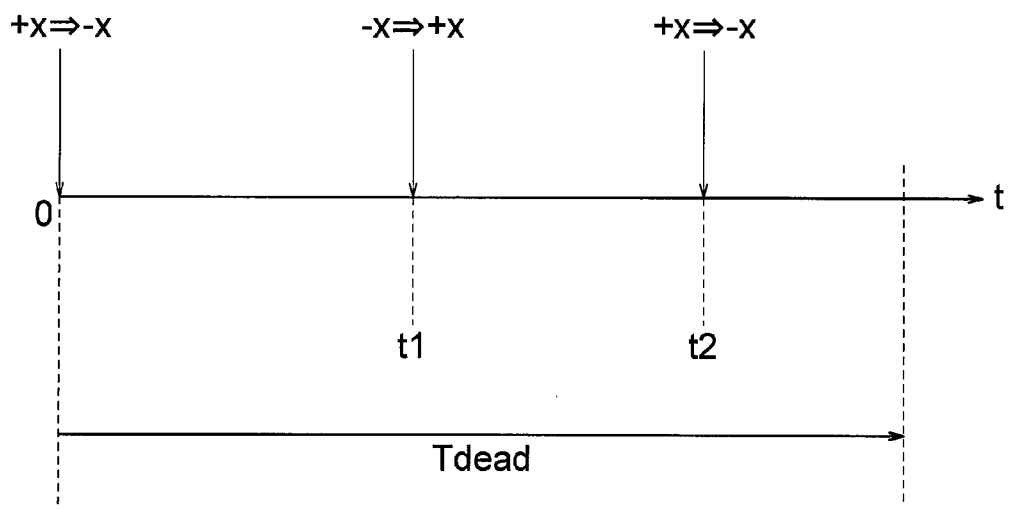
FIG. 18 is a diagram graphically showing a method to detect sequential actions according to a third embodiment.

FIG. 18 graphically shows a configuration example of the present embodiment to prevent or to reduce occurrence of the erroneous detection due to the sequential movements conducted by the operator. In FIG. 18, points of time at which a gesture is detected and is judged are shown in time series. In the present embodiment, during the period of time in which Tdead lapses from when a gesture in a particular direction is detected and is judged at t=0, even when a movement of the hand in a direction opposite to the particular direction is detected, the movement is not regarded as a gesture and the detection is invalidated, or control is performed such that the action in the opposite direction is not detected as a gesture. This processing is executed by the signal controller 24 or the detection signal processing section 31. However, even during the period of Tdead, a movement of the hand judged to be conducted in the same direction, i.e., in the particular direction is detected as a gesture. In the example of FIG. 17, since point of time t1 is within the period of Tdead, a gesture detected at t1 is invalidated. On the other hand, since point of time t2 is after a lapse of the period of Tdead, a gesture detected at t2 is regarded as valid.

As above, in the present embodiment, there is disposed an invalidation period (i.e., Tdead) in order that a gesture sequentially made in the direction opposite to the direction of the particular gesture are invalidated or are not detected as a gesture. Due to this configuration, a gesture to consecutively control images in a particular direction (for example, to turn over many slides) can be appropriately detected. In consideration of the period of time for the human to move the hand, Tdead is favorably set to a value ranging from 600 milliseconds (msec) to 1.4 seconds (sec).

Figure 19:
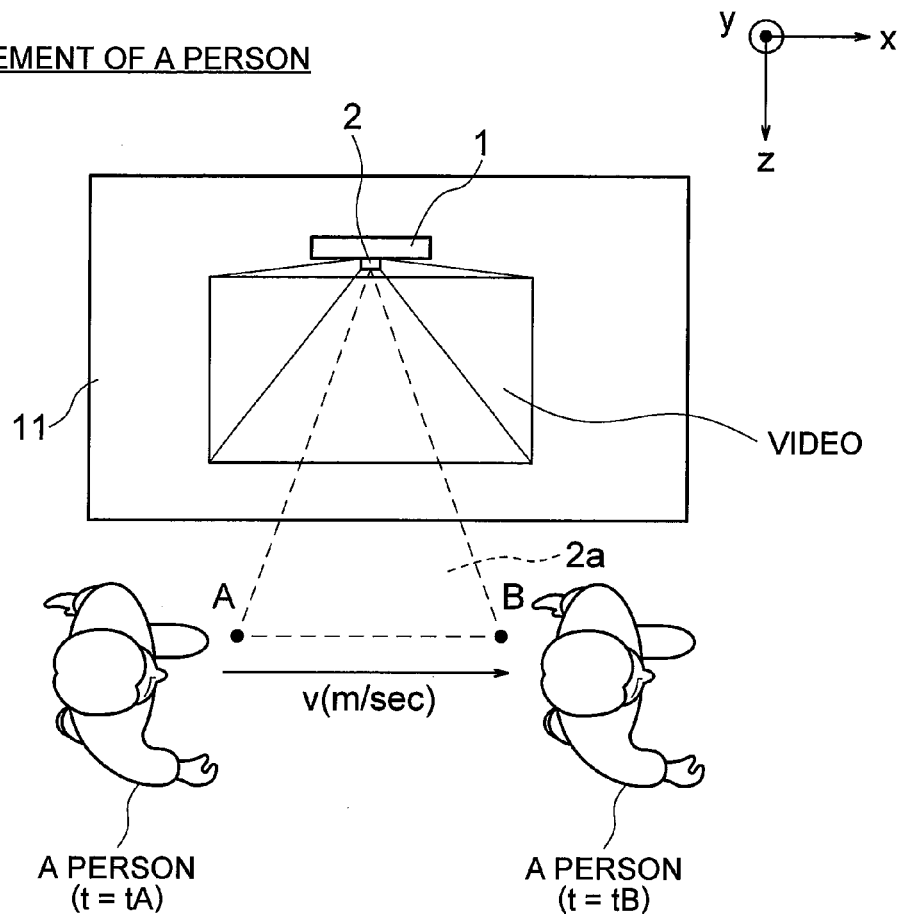
FIG. 19 is a perspective diagram showing an example of actions of a person when the projection device 1 projects an image onto a desk.

Next, description will be given of "movements of the body of the operator". FIG. 19 shows an example of movements of a person who is walking to cross over the detection range 2$a$ from the −x direction to the +x direction. In this example, the movement of the operator is detected as a gesture from the −x direction to the +x direction. However, since the operator does not intend to control or operate the projected image, detection of a gesture due to the movement of the operator is erroneous detection. Similar erroneous detection may occur when a second person moves after the operator as well as when the operator shakes her or his body. To provide higher-precision gesture detection, it is required to take a measure to overcome the erroneous detection due to the movement made by the operator without any intention to control or to operate the image.

Figure 20:
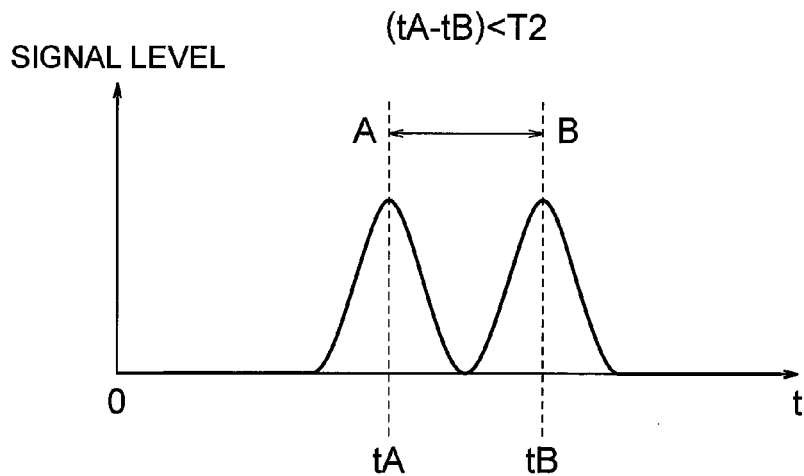
FIG. 20 is a graph showing an output signal level of the sensor element 2 in FIG. 19.

FIG. 20 shows a configuration example of the present embodiment to prevent or to reduce occurrence of the erroneous detection due to a movement of the body (other than the hands) of the operator. Specifically, FIG. 20 shows an output signal level of the sensor element 2 for a movement of a person. In FIG. 20, time tA indicates the time when the person passes position A in the detection range 2$a$ and time tB indicates the time when the person passes position B in the detection range 2$a$. The velocity v (m/sec) at which the person walks from point A to point B is expressed as v=(distance from A to B)/(tB−tA).

In general, the moving (walking) velocity or speed of a person differs from the speed of a hand gesture of the person, and the hand gesture speed is higher than the walking speed. By using the speed difference, the present embodiment judges, according to the speed of a mobile object having moved in the detection range 2$a$, whether or not the mobile object indicates a gesture. Specifically, the distance from A to B is determined according to the detection range 2$a$. Hence, threshold value T2 is beforehand set with respect to time in association with the moving time from A to B. As shown in FIG. 20, in a situation wherein the mobile object moves from A to B, if the difference of time between time tA at which the detection signal produced from the sensor element 2 when the mobile body passes point A in the detection range takes a peak value and time tB at which the detection signal produced from the sensor element 2 when the mobile body passes point B in the detection range takes a peak value is less than T2 described above, that is, if (tB−tA)<T2, it is judged that the mobile object indicates other than a gesture (or the action of the mobile object is not detected as a gesture). On the other hand, if the difference of time is equal to or more than T2, i.e., if (tB−tA)≥T2, the action of the mobile object is judged or detected as a gesture. The judging operation is carried out by the signal controller 24 or the detection signal processing section 31.

By disposing threshold value T2 with respect to time as above, it is possible to reduce occurrence of the erroneous detection of the movement of the operator's body other than the hands. According to experiments conducted by the present inventors, the human walking speed ranges from about 1 m/sec to about 1.5 m/sec and the speed of the hand ranges from about 2 m/sec to about 4 m/sec. Based on these values, threshold T2 will be appropriately determined.

Figure 21:
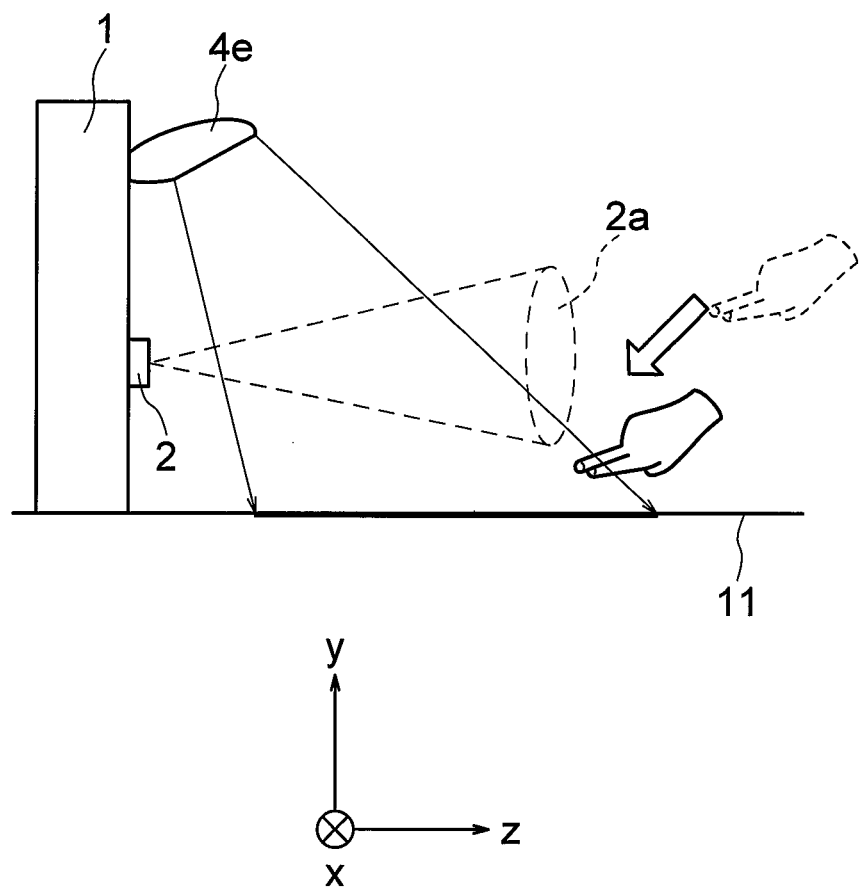
FIG. 21 is a diagram showing an example of a pointing action by a finger when the projection device 1 projects an image onto a desk.

Description will now be given of "movements of the hand in the y-axis direction". FIG. 21 shows a situation in which the operator moves the hand from the −y direction to the +y direction at desk-top projection, for example, a pointing action onto a displayed image. When discussing an idea by viewing a projected image or when explaining the contents of a displayed image for presentation or the like, the pointing operation to point the displayed image, that is, the hand movement from the −y direction to the +y direction will be used frequently. In this situation, the operator has no intention to operate the displayed image, for example, to turn over the slide, so that such pointing operation is erroneously detected as a gesture. However, in a presentation, a conference, or the like, it is favorable to allow the pointing operation to point the displayed image, i.e., the projected image.

In the present embodiment, while allowing the pointing operation to point the displayed image, the pointing operation is not detected as a gesture to control or to operate the display image, for example, to scroll displayed images, to feed image frames, or to turn over a slide.

The projection device 1 of the present embodiment is configured such that at detection of an action of the hand in a direction other than that of a gesture to control or to operate a displayed image, the system suspends control or operation of the displayed image of the projection device 1 by gesture. In more detail, when the sensor element 2 detects a gesture in the first direction which is the x direction in this example (in the direction which is parallel to the projection plane and which is the horizontal direction of the projected image), the signal controller 24 generates an operation signal to control or operate the displayed image. When the sensor element 2 detects a gesture in the second direction which is the y direction in this example (in the direction vertical to the projection plane), the signal controller 24 performs control such that even a gesture in the first direction is detected, the detection is invalidated or the detecting operation is suspended; or, even when detected, the signal controller 24 does not generate the operation signal. The operation signal is not generated in either situation. That is, according to the present embodiment, in response to a hand action in the y-axis direction, the operation to control or to operate the displayed image by a gesture in the x-axis direction is validated or invalidated. In other words, the present embodiment is operable by at least two kinds of gestures. By a gesture in the x-axis direction, the operation of the displayed image is enabled. By a gesture in the y-axis direction, the operation to control or operate the displayed image by a gesture in the x direction is allowed (ON) or inhibited (OFF).

Figure 22A:
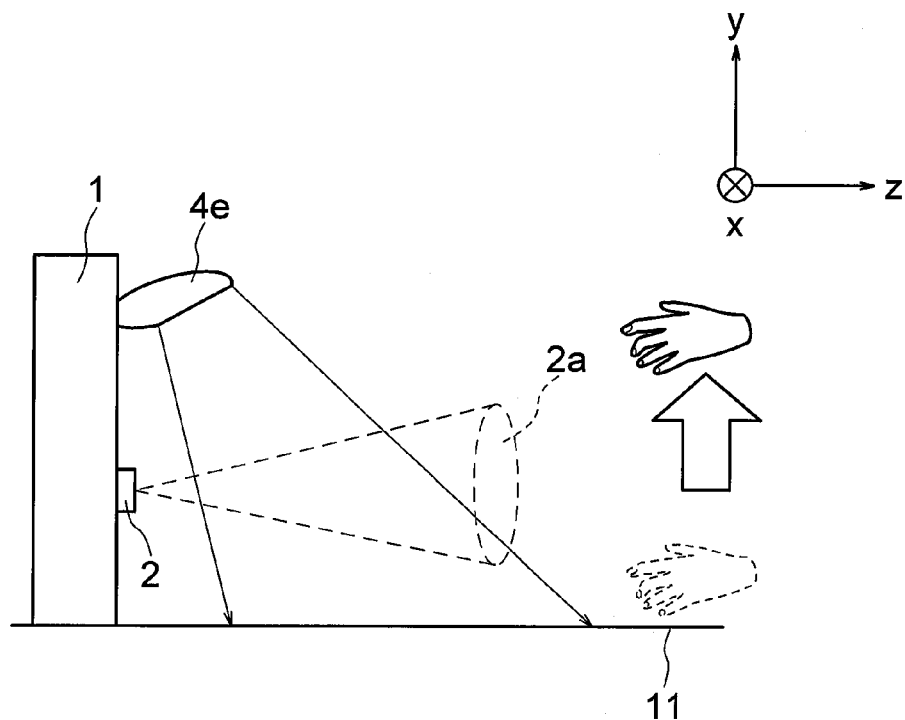
FIG. 22A is a diagram showing an example of a gesture to enter the gesture invalid mode according to the third embodiment.

In the present embodiment, the gesture in the y-axis direction described above is a movement of the hand from the −y direction to the +y direction, for example, as shown in FIG. 22A. That is, when the sensor element 2 detects a movement of the hand from the −y direction to the +y direction, the signal controller 24 performs control to change the operation mode to a mode (to be referred to as a gesture invalid mode thereinbelow) in which the operation of the displayed image by gesture is invalid. After this point, even when the operator makes a gesture along the x-axis direction, the display image is not controlled and is not operated. During the gesture invalid mode, when a movement of the hand from the −y direction to the +y direction is detected, the gesture invalid mode is released and the displayed image can be again operated by gesture in the x-axis direction. In the present embodiment, the action of the hand from the −y direction to the +y direction is assumed as the gesture to change the ordinary mode (in which the gesture is valid) to the gesture invalid mode for the following reasons. This prevents an event in which the gesture invalid mode is suddenly released by the pointing action (from the +y direction to the −y direction in the ordinary situation) during the gesture invalid mode. That is, an action of the hand discriminable from the pointing action is designated as a gesture to change the operation mode to the gesture invalid mode. It is also naturally possible that an action of the hand from the +y direction to the −y direction is designated as a gesture to change the operation mode to the gesture invalid mode.

According to the configuration of the present embodiment, the operation mode can be changed to the gesture invalid mode through a simple operation, and the displayed image is not controlled or operated by the pointing action in the gesture invalid mode. Hence, while allowing the pointing operation to point the displayed image, the pointing operation is not detected as a gesture to control or operate the display image, for example, to scroll displayed images, to feed image frames, or to turn over a slide.

Figure 22B:
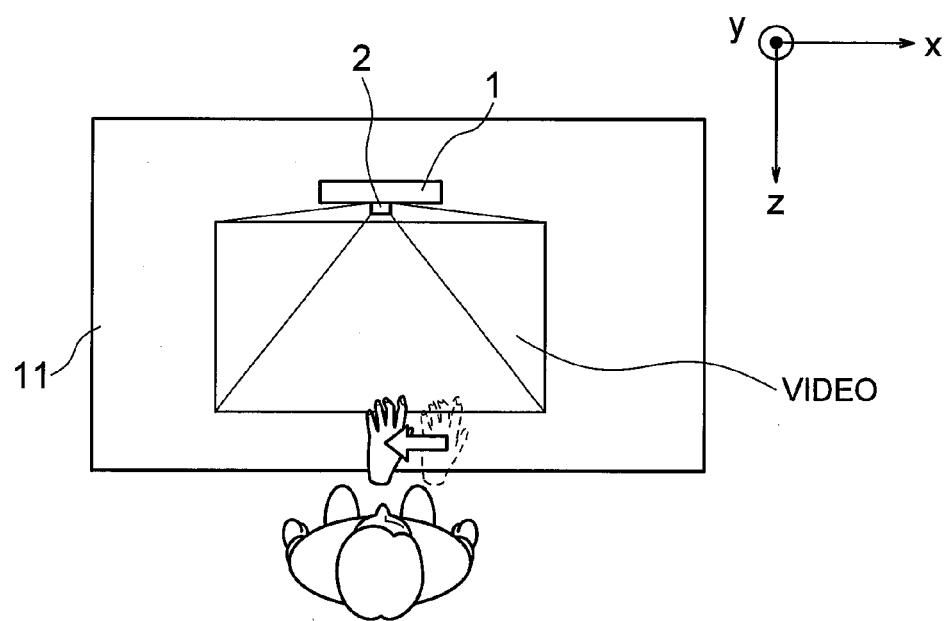
FIG. 22B is a diagram showing an example of a gesture to enter the gesture invalid mode according to the third embodiment.

However, as shown in FIG. 22A, when an action of the hand from the −y direction to the +y direction is set as the gesture to change the operation mode to the gesture invalid mode, there may occur erroneous detection, which will be described below. Referring now to FIG. 22B, description will be given of the erroneous detection.

FIG. 22B shows an example of a movement of the operator before making a gesture to change the operation mode to the gesture invalid mode shown in FIG. 22A. As shown in FIG. 22B, it is required that the operator moves the hand to the center of the screen before making a gesture from the −y direction to the +y direction. Hence, for a gesture with the right hand, the hand will be moved from the +x direction to the −x direction; and for a gesture with the left hand, the hand will be moved from the −x direction to the +x direction. It is likely that such movement of the hand is erroneously detected as a gesture in the x-axis direction. In consideration of the erroneous detection in the operation, even when the movement of the hand as shown in FIG. 22A is detected, that is, even when the movement of the hand from the −y direction to the +y direction or from the +y direction to the −y direction, it is not possible to appropriately change the operation mode to the gesture invalid mode depending on cases.

Figure 23:
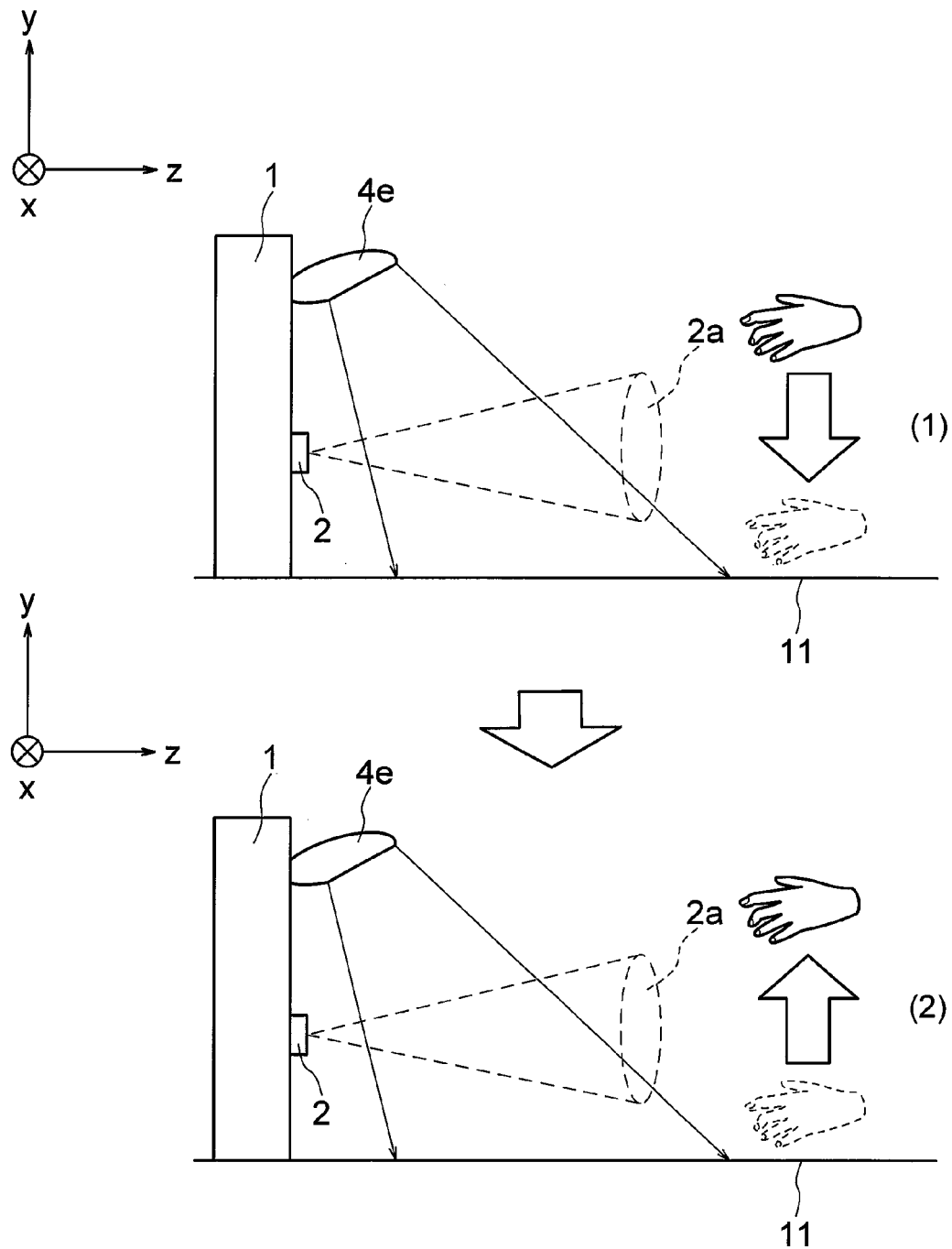
FIG. 23 is a diagram showing an example of a gesture to enter the gesture invalid mode according to the third embodiment.
Figure 24:
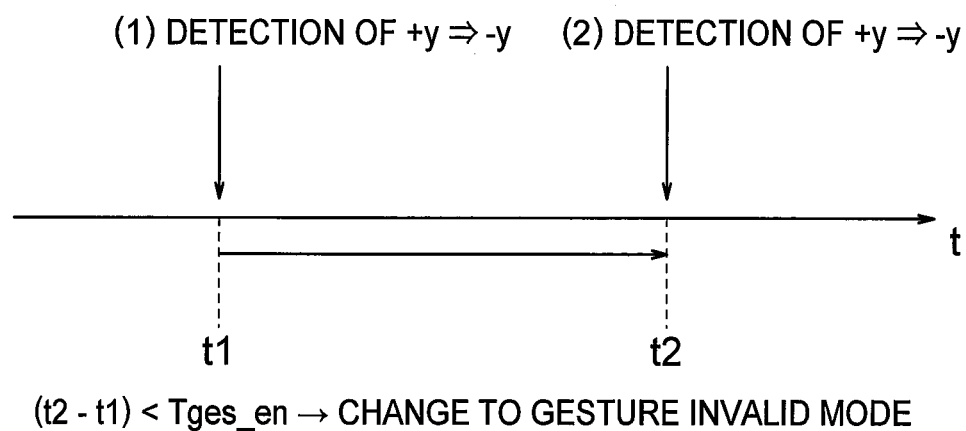
FIG. 24 is a diagram showing an example of a method to detect a gesture to enter the gesture invalid mode according to the third embodiment.

To solve the problem according to the present embodiment, when the sensor element 2 consecutively detects movements of the hand in two directions along the y direction as shown in FIG. 23, the operation mode is changed to the gesture invalid mode. In the present embodiment, to change the operation mode to the gesture invalid mode, the operator first moves the hand from the +y direction to the −y direction (as in (1) of FIG. 23) and then consecutively moves the hand from the −y direction to the +y direction (as in (2) of FIG. 23). When detecting the sequential movements of the hand, the system recognizes the sequential movements as a gesture to change the operation mode to the gesture invalid mode. That is, the movements sequentially conducted in mutually opposing directions (reciprocating hand movements along the y-axis direction) are recognized as a gesture to change the operation mode to the gesture invalid mode. Further, to prevent occurrence of the erroneous detection due to the pointing action, the difference in time is calculated, as shown in FIG. 24, between time T1 when a hand action (1) from the +y direction to the −y direction is detected and time T2 when a hand action (2) from the −y direction to the +y direction is detected. When difference in time T2−T1 is less than a predetermined period of time Tges_en, the operation mode is changed to the gesture invalid mode. On the other hand, when T2−T1 is equal to or more than the predetermined period of time Tges_en, the operation mode is not changed to the gesture invalid mode. That is, the detected gesture is invalidated. As above, by detecting the movements of the hand in two directions along the y direction and the difference in time between the movements of the hand, the transition to the gesture invalid mode can be conducted with high precision. Further, by a simple operation, the pointing action is allowed and it is possible to reduce the occurrence of the erroneous detection. The predetermined period of time Tges_en is desirably set to a value ranging from 600 msec to 1.2 sec in consideration of human movements and actions. Also, the movements of hand in the y-axis direction may be employed to conduct the changeover operation between validity and invalidity of the gesture detection. In this situation, the gesture detection is valid only when it is required by the operator, and occurrence of the erroneous detection can be further reduced.

There may be provided a mechanism to clearly inform the operator whether the gesture to control or operate the displayed image is valid or invalid (whether or not the system is in the gesture invalid mode). For example, as shown in FIG. 25A, when the operation mode is changed to the gesture invalid mode, a message or an icon 30 may be combined with the image, to display the message or the icon 30 together with the image. Further, it is also possible as shown in FIG. 25A that a mode display light source 15, for example, an LED is disposed at a position just opposing the operator of the projection device 1, to turn the mode display light source 15 on when the gesture to operate the display image is valid. In the situation of FIG. 25A, although the message or the icon 30 is favorably displayed at an edge region of the projected image, it is also possible that the operator sets a desired display position of the message or the icon 30.

In FIG. 25B, the mode display light source 15 is disposed in the projection device 1 at a position between the sensor element 2 and a sensor element protection cover 16. The sensor element protection cover 16 is employed to protect the sensor element 2 to be arranged on the detection surface side of the sensor element 2 and is configured using, for example, material having a light transmitting property. The light source 15 is arranged between the sensor element 2 and a sensor element protection cover 16 in this example. However, the light source 15 may be arranged at any position where the user can view the light source 15, for example, at a position outside the projection device 1. The color of the light source 15 may be determined according to the appearance of the projection device 1, or an LED for three colors R, G, and B may be employed as the light source 15 such that the user sets a desired color of light to be emitted when the system is in the gesture invalid mode. For the light source 15, visible-light wavelengths are used so that the light can be recognized by the human. Hence, it is solely required that the wavelengths to be sensed by the sensor element 2 are outside the range of visible-light wavelengths or the sensor element 2 has low sensitivity in the visible-light wavelength range. Further, the sensor element protection cover 16 may serve a function as a wavelength filter corresponding to the wavelengths which can be sensed by the sensor element 2, to thereby mainly transmit through the filter the wavelengths which can be sensed by the sensor element 2.

Also, to prevent erroneous detection due to other than the operator, it is also possible that for a predetermined period of time after the detection of a first gesture, if a second gesture is not detected, the projection device 1 is set to a state in which the system does not detect a gesture or the detected gesture is invalidated. In this situation, it is only required that the operator restores the state to detect a gesture before starting operation. The changeover of the gesture detection state may be carried out by gesture or may be set via a menu screen of the projection device 1. It is also possible to dispose a mode in which detection of any gesture or operation by gesture is completely invalidated via a menu screen, and the changeover itself between the validity and invalidity of the operation by gesture is invalidated.

Figure 26:
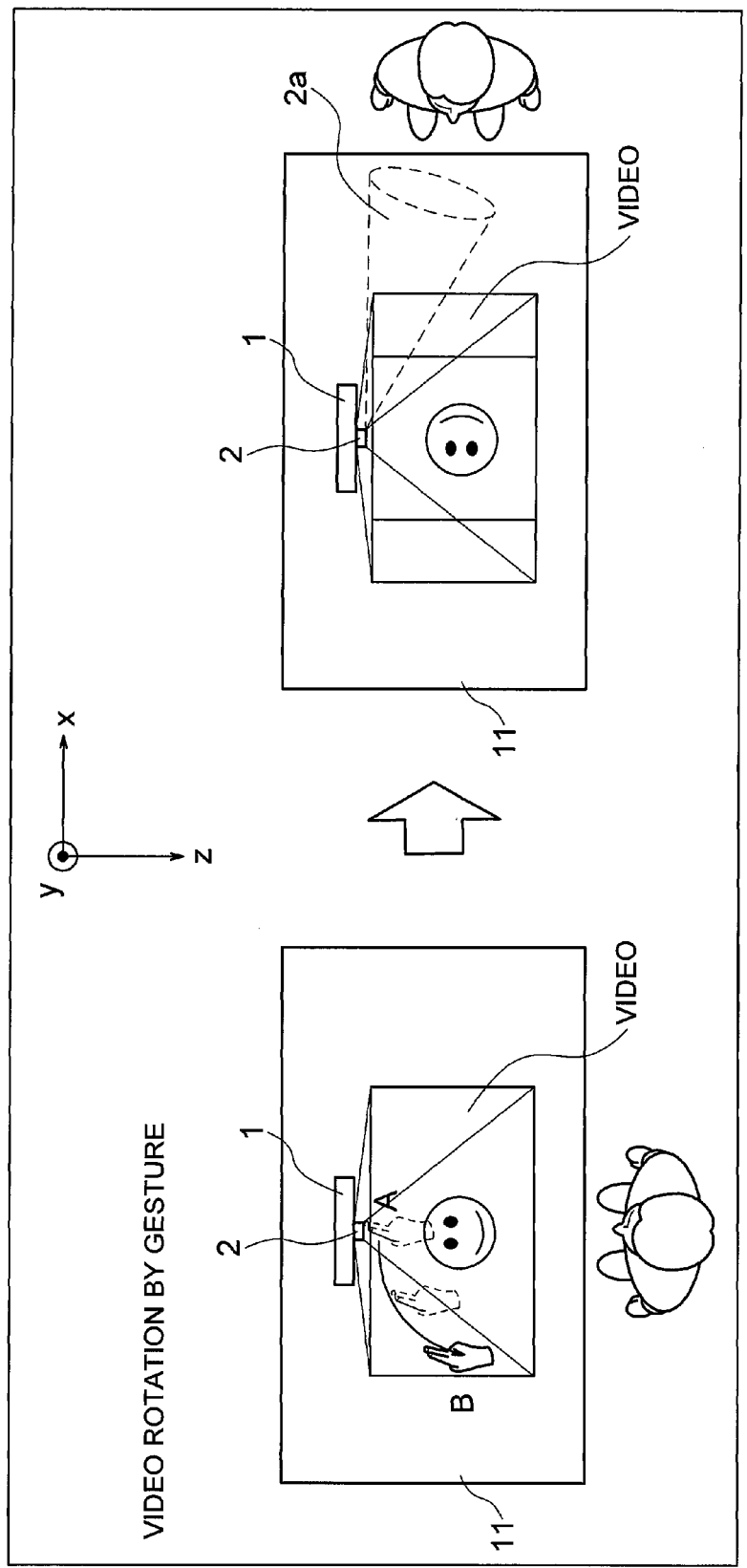
FIG. 26 is a diagram showing an operation example to rotate a display image by gesture.

When it is possible to detect a two-dimensional gesture in the x-axis and z-axis directions for a displayed image, there can be considered combinations of gestures in various directions and the kinds of operation to control or operate the displayed image. FIG. 26 shows an example for desk-top projection in which the displayed image can be rotated by gesture.

When discussing an idea while viewing an image projected in the desk-top projection, there will take place a situation in which discussing persons around the desk view the displayed image from various angles. In this situation, for example, during a conference, the person to whom it is desired to show a displayed image varies frequently, so that the function to rotate the displayed image is useful for many viewers joining in the conference in many cases. Specifically, as shown in FIG. 26A, the rotation angle of the displayed image is set according to the distance of the movement of the hand. For example, as shown in FIG. 26A, when the operator rotates the hand from point A to point B by using the center of the screen as the center of rotation, the display screen rotates counterclockwise 90° as shown in FIG. 26B. As a result, the front side of the displayed image faces the viewers on the right side as shown in FIG. 26B.

The rotation angle may be arbitrarily set by the user. To reduce the erroneous detection by discriminating the movement of rotation from the movement only in the x-axis or y-axis direction, there may be disposed a changeover function to conduct a changeover between the validity and invalidity of the rotating function of a displayed image by gesture. Such changeover may be carried out by an action in which the hand is kept stayed on one point of the displayed image for several seconds or an action of the hand in the y-axis direction. Further, in consideration of usability of the system for the user, the user may freely designate allocations of kinds of hand actions to functions to be associatively executed (the rotating function, the changeover function to conduct a changeover between validity and invalidity of the changeover, and the like). The allocations may be set from a menu screen on the projection device 1.

As shown in FIG. 26B, when the direction of the displayed image is changed, the detection range 2a of the sensor element 2 may be changed according to the direction of the displayed image. Since the person just in front of the display screen is the primary operator in many cases, the detection range 2a may be disposed to face a position corresponding to the operator.

Figure 27:
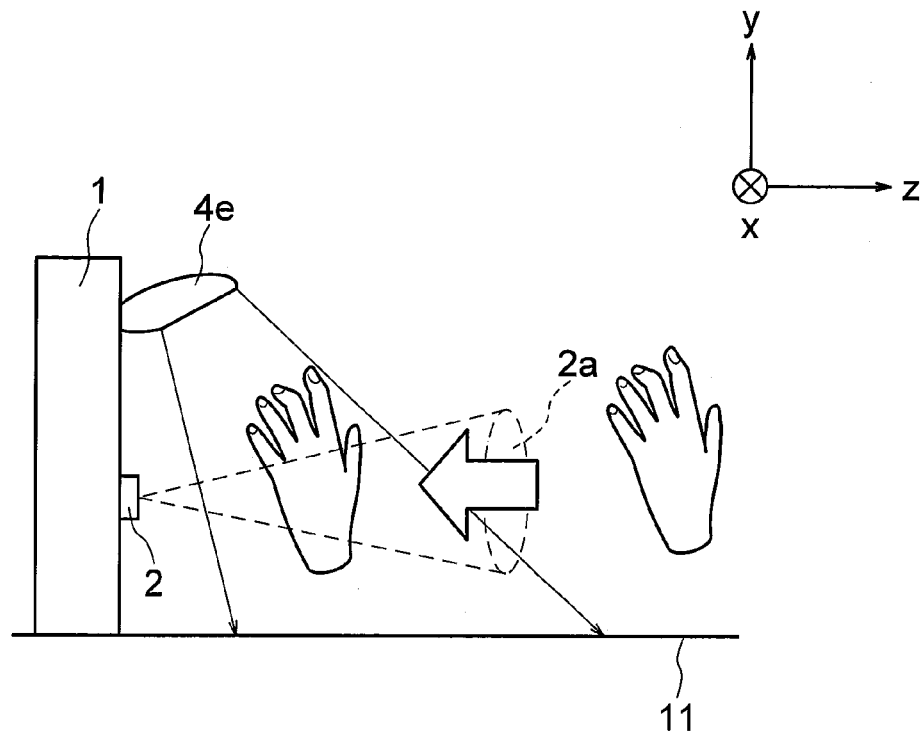
FIG. 27 is a diagram showing an example of operation to turn power on or off in the projection device by an action of a hand in the z-axis direction.

At desk-top projection, the power switch is arranged on the side surface of the projection device 1 in many cases. Hence, when the projection device 1 is not fixedly installed, the operator pushes the power switch by one hand while holding the projection device 1 by the other hand, and this leads to reduction in usability. The usability will be considerably improved if power can be turned on or off by gesture. Hence, the present embodiment provides an operation to turn power on or off by gesture. For example, as shown in FIG. 27, power is turned on or off by a hand movement in the z direction. In more detail, for example, the operator first moves the hand from the +z direction to the −z direction, that is, in the direction which is parallel to the projection plane of the displayed image and in which the hand approaches the projection device 1 and then keeps the hand stayed at a position near the projection device 1 for a predetermined period of time. By detecting the hand movement, the system turns power on or off. According to the configuration, power can be turned on or off without pushing the power button disposed in the projection device 1. This results in an increase in the usability.

Figure 46:
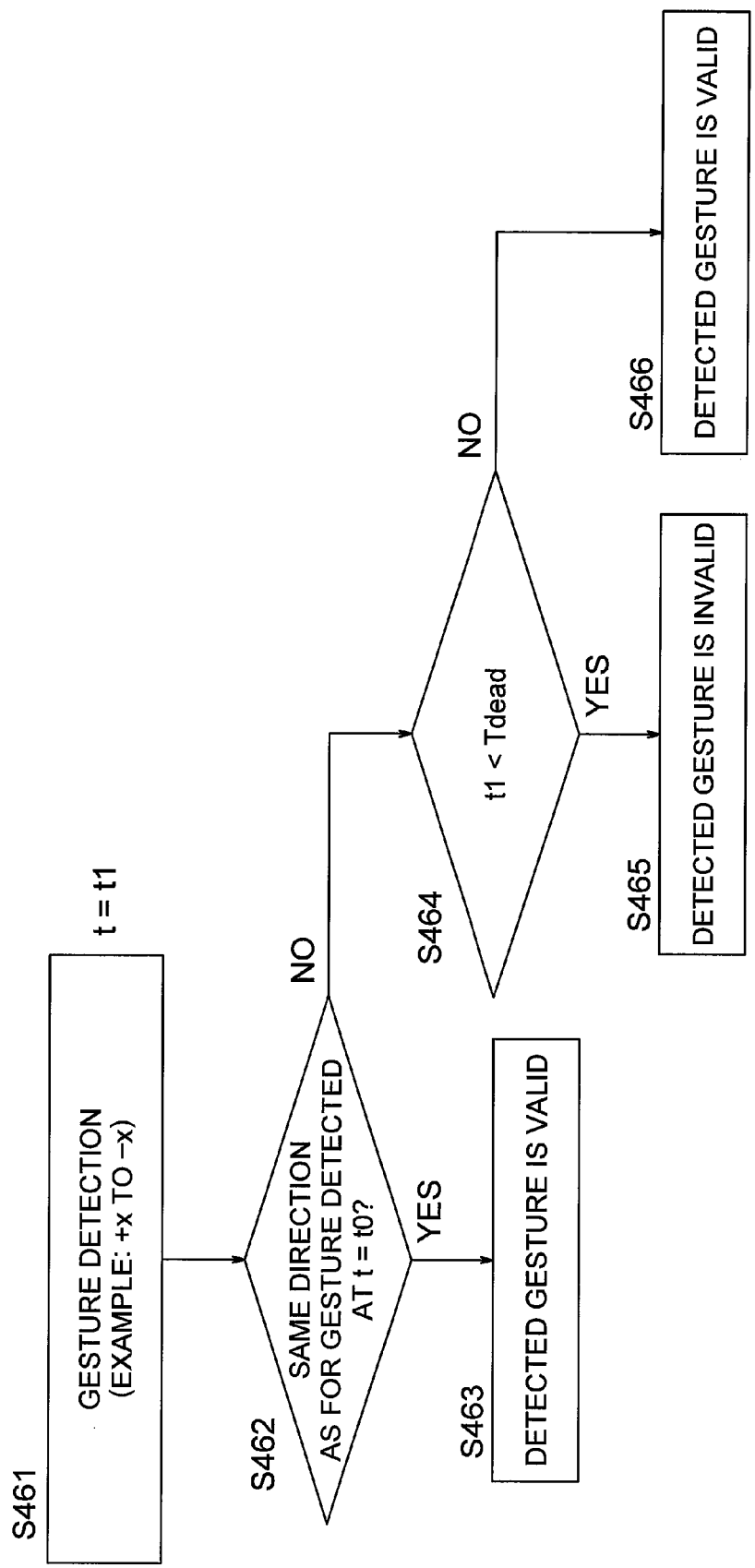
FIG. 46 is a flowchart of processing to prevent erroneous detection by "consecutive actions of gestures of the operator" according to the first embodiment 1.
Figure 47:
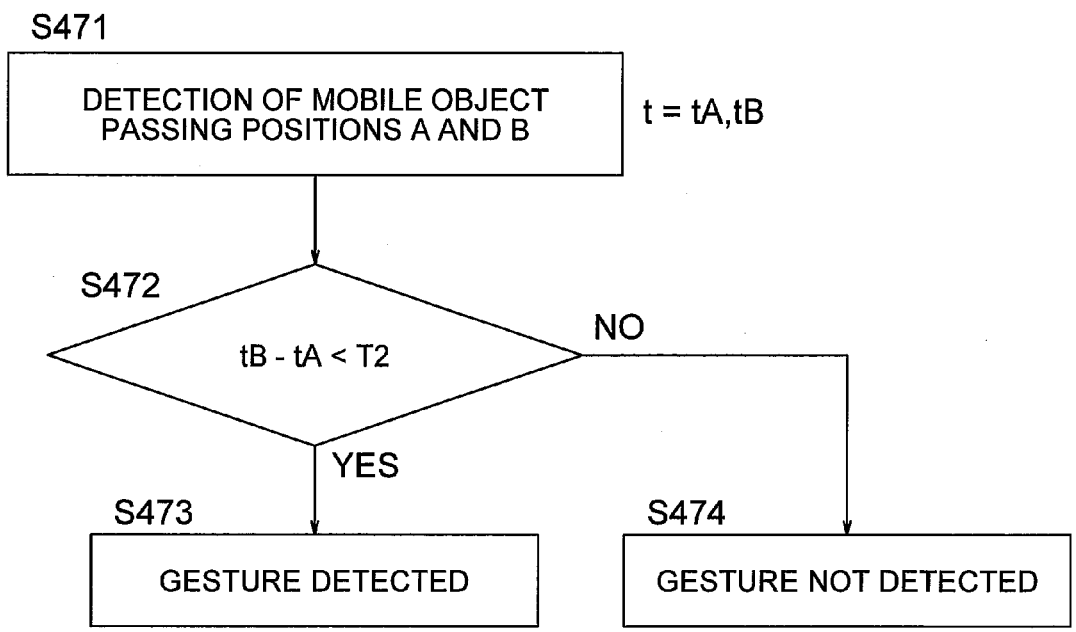
FIG. 47 is a flowchart of processing to prevent erroneous detection by "movement of the body of a person" according to the first embodiment 1.
Figure 48:
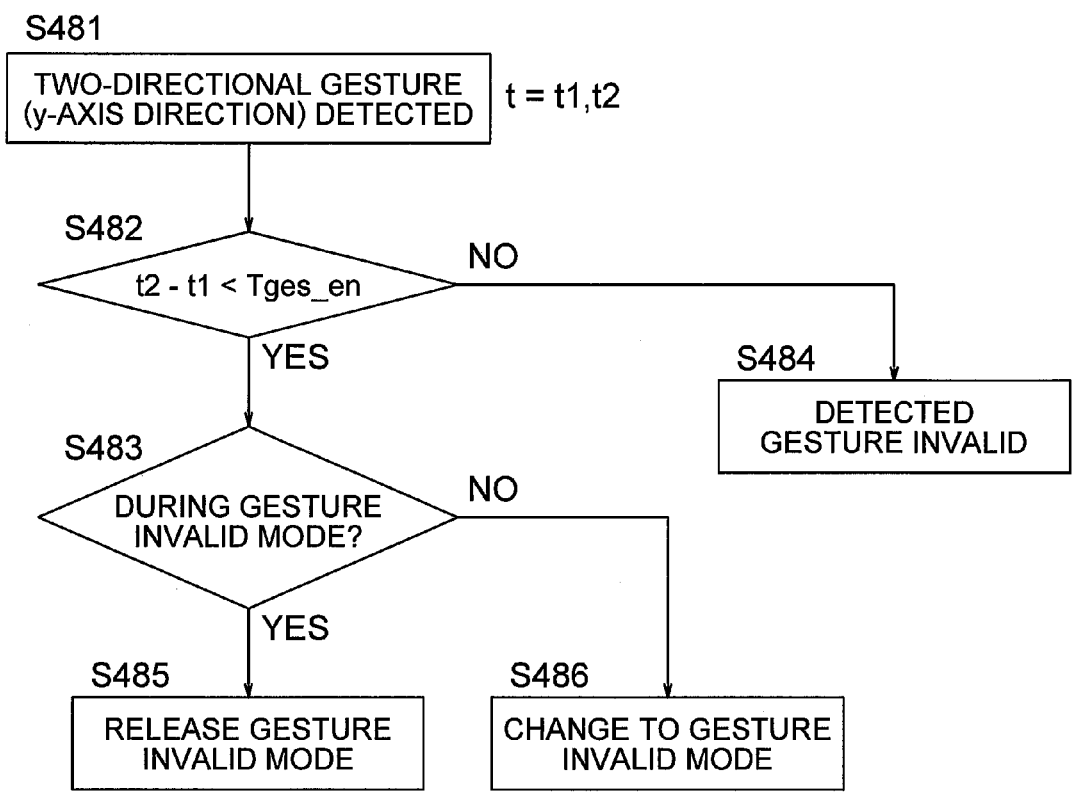
FIG. 48 is a flowchart of processing to prevent erroneous detection by "an action of a hand in the y-axis direction" according to the first embodiment 1.

Referring to FIGS. 46 to 48, description will be given of flowcharts of processing to solve the problems due to "sequential movements of a gesture made by the operator", "movements of the body of the operator", and "movements of the hand in the y-axis direction" according to the present embodiment. This processing is executed by the signal controller 24.

FIG. 46 shows an example of a flowchart of the processing to solve the problem due to "sequential movements of a gesture made by the operator". Assume in the flowchart that a gesture is detected at time t=t1 in S461 and the gesture is made from the +x direction to the −x direction. In S462, it is judged whether or not the direction of the gesture detected in S461 is equal to that of a gesture detected at t0 preceding t1. If it is judged that the directions are equal to each other, the process goes to S463 to validate the gesture detected in S461. Otherwise, the process goes to S464 to judge whether or not period of time t1 relative to t0 is less than Tdead. If t1 is less than Tdead, the process goes to S465 to invalidate the gesture detected in S461. Otherwise, the process goes to S466 to validate the gesture detected in S461.

FIG. 47 shows an example of a flowchart of the processing to solve the problem due to "movements of the body of the operator". In S471 of this flowchart, a mobile object is detected at positions A and B in the detection range. Assume that the detection time at position A is tA and that at position B is tB. In S472, the difference in time between tA and tB is calculated to judge whether or not the difference is less than t2. If the difference is less than t2, the movement of the mobile object detected in S471 is detected as a gesture. Otherwise, the movement of the mobile object detected in S471 is not detected as a gesture or the detection is invalidated.

FIG. 48 shows an example of a flowchart of the processing to solve the problem due to "movements of the hand in the y-axis direction". In S481 in the flowchart, a gesture is detected in mutually different directions along the y-axis direction, that is, in the +y to −y direction and in the −y to +y direction. Assume that the gesture in the +y to −y direction is detected at time t1 and the gesture in the −y to +y direction is detected at time t2. In S482, the difference in time between t1 and t2 is calculated to judge whether or not the difference is less than the predetermined period of time Tges_en. If the difference is equal to or more than the predetermined period of time Tges_en, the process goes to S484 to invalidate the gesture detected in S481. Otherwise, the process goes to S483 to judge whether or not the projection device 1 is currently in the gesture invalid mode. If the projection device 1 is in the gesture invalid mode, the process goes to S485 to release the gesture invalid mode. Otherwise (if the projection device 1 is in the ordinary mode, i.e., in the gesture valid mode), the process goes to S486 to set the operation mode to the gesture invalid mode.

Figure 28:
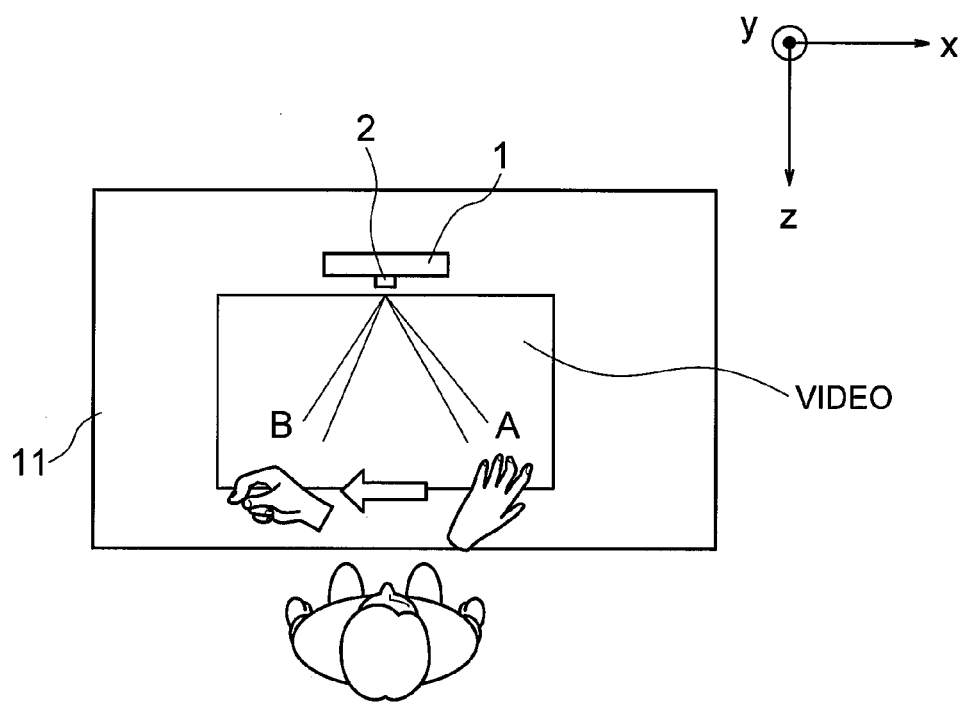
FIG. 28 is a diagram showing an example in which the operator swings the right hand from the +x direction to the −x direction.

Next, referring to FIG. 28, description will be given of sensitivity adjustment through noise reduction using a human gesture. FIG. 28 shows a situation in which the operator swings the right hand from the +x direction to the −x direction. Assume, for example, that the sensor element 2 includes a plurality of sensors and mutually different sensors detect a mobile object respectively at positions A and B in FIG. 28. In the system shown in FIG. 28, the object observed by the sensors is the palm of the hand at position A and the back thereof at position B. The temperature varies between the palm and the back. The color of the palm is different from that of the back, and hence the reflectivity with respect to light varies between the palm and the back. In this situation, the signal level varies between the signal detected at position A and that detected at position B. In general, the signal from each sensor is once amplified by an amplifier for the signal processing. In the amplification, when the amplifier has high gain, the level of noise is increased as much and the response speed becomes lower. In a situation of high-grade amplifiers in which it is considered that the noise level is relatively high, it is desirable to lower the gain of the amplifier. Hence, in the present embodiment, by lowering the gain of the amplifier in one of the sensors corresponding to positions A and B, the noise level is reduced and the response speed is increased. For example, since the palm is higher in temperature than the back of the hand in general, when the right hand is used to make a gesture, the gain of the amplifier in the sensor corresponding to position A to detect the palm is lowered, while when the left hand is used to make a gesture, the gain of the amplifier in the sensor corresponding to position B is lowered. As a result, when the sensor element 2 includes a plurality of sensors, it is possible to detect a gesture with high precision by reducing noise.

The change from the right hand to the left hand and vice versa, that is, the changeover between the right-hand mode and the left-hand mode may be carried out, for example, by use of a switch disposed in the projection device 1 or from a menu of a display image.

[Measures to Detection Signal Saturation]

Description will now be given of a problem associated with detection signal saturation due to the temperature difference between the body of the operator and the sensor element 2 and a configuration of the present embodiment to solve the problem. It is assumed in the configuration that the sensor element includes a thermopile as a sensor.

Figure 29:
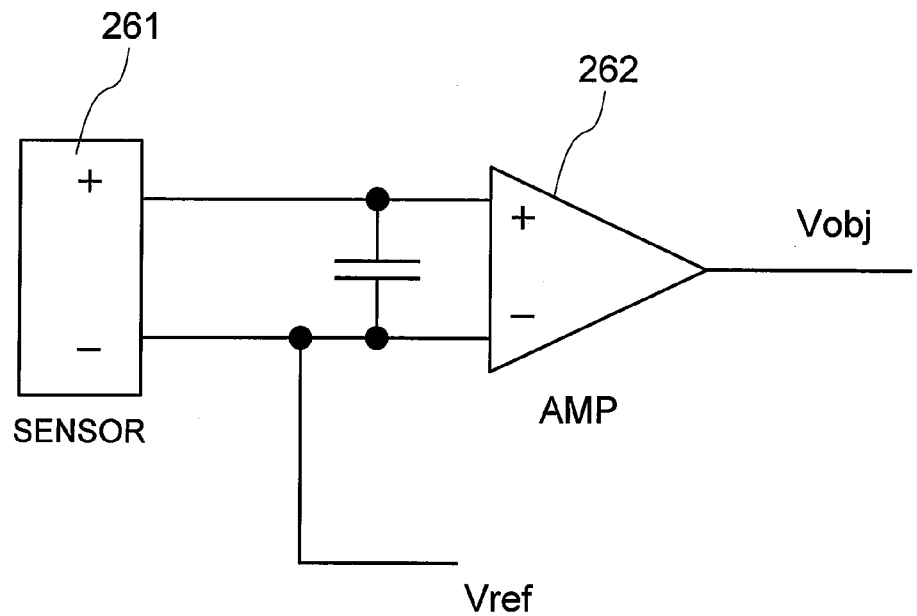
FIG. 29 is a diagram showing an example of a circuit configuration of the sensor element 2 when a thermopile is adopted as a sensor.

Referring to FIG. 29, description will be given of an example of a circuit configuration of the sensor element 2 including a thermopile. In the circuit configuration, a thermopile (sensor) 261 produces a detection signal substantially proportional to the temperature difference between the object (for example, a human hand) and the sensor 261. The detection signal from the sensor 261 is at quite a low level and is hence amplified by an amplifier 262. The amplifier 262 includes a positive-polarity terminal to receive the signal from the sensor 261 and a negative-polarity terminal to receive reference voltage Vref. Based on the value of reference voltage Vref inputted to the negative-polarity terminal, the amplifier 262 amplifies the detection signal inputted to the positive-polarity terminal from the sensor 261 and outputs the amplified detection signal. This signal from the amplifier 262 is employed as a signal to judge a gesture.

Figure 30:
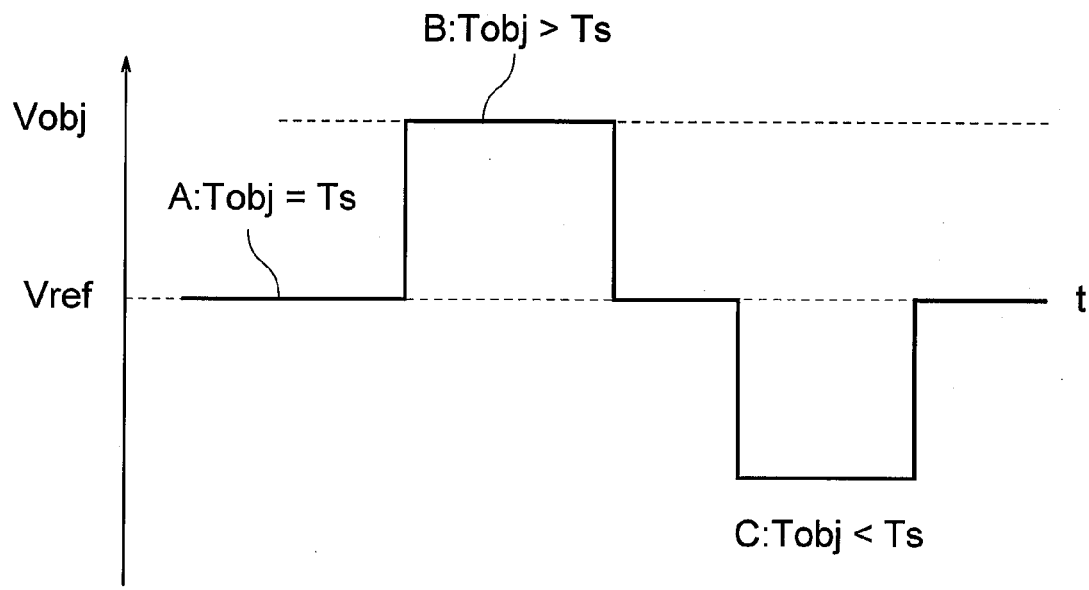
FIG. 30 is a diagram showing an example of an output voltage from an amplifier 262 when an object having heat is detected by a thermopile.

FIG. 30 graphically shows an output voltage from the amplifier 262 when an object having heat is detected by the thermopile (sensor) 261. It is assumed in FIG. 30 that the output voltage from the amplifier 262 is Vobj, the reference voltage is Vref, the temperature of the object is Tobj, and temperature of the thermopile (sensor) 261 is Ts. For Tobj=Vs, Vobj=Vref. For Tobj>Ts, Vobj>Vref. For Tobj<Ts, Vobj<Vs. Output voltage Vobj from the amplifier 262 is determined by the relationship between the object temperature Tobj and the thermopile temperature Ts and is represented as below.

$$Vobj = \alpha(Tobj - Ts) + Vref \quad (4)$$

In Expression (4), α is the sensitivity of the thermopile and/or a coefficient determined by the amplification factor (gain) of the amplifier 262.

Figure 31A:
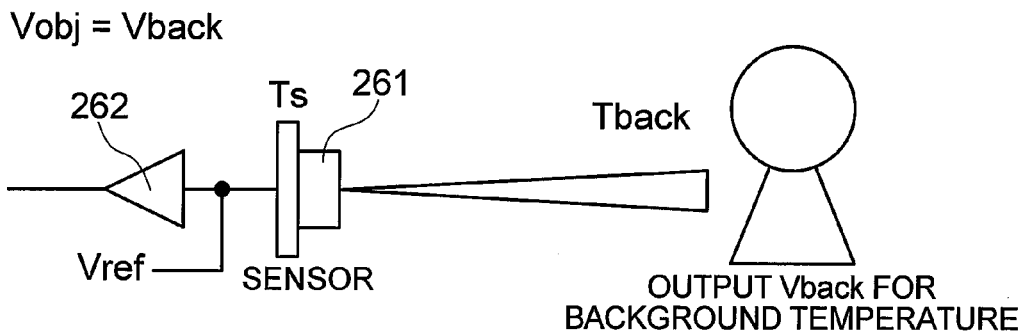
FIG. 31A is a diagram showing an example of operation to detect a body and a hand of a person facing a thermopile right in front thereof.
Figure 31B:
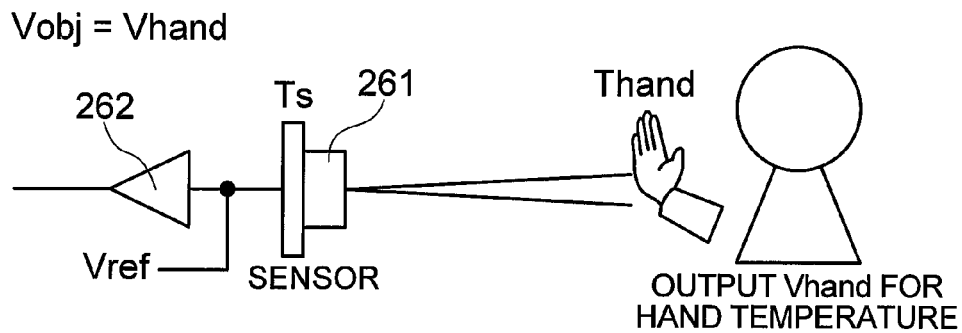
FIG. 31B is a diagram showing an example of operation to detect a body and a hand of a person facing a thermopile right in front thereof.
Figure 32:
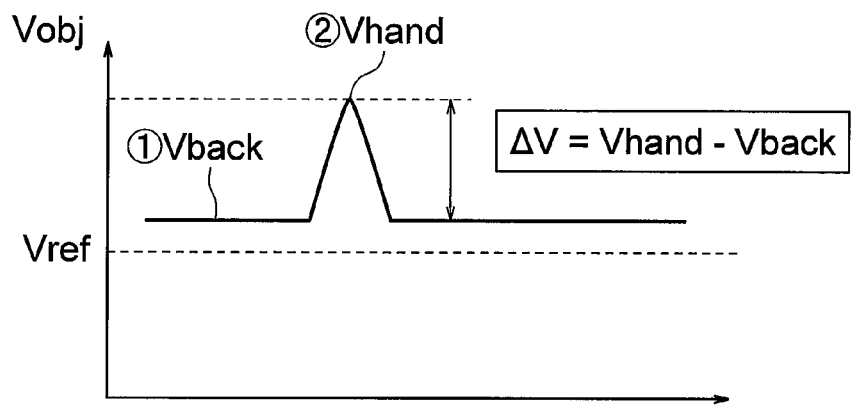
FIG. 32 is a diagram showing an output voltage from the amplifier 262 in the example of FIG. 31.

Description will next be given of gesture detection using a thermopile. FIG. 31A shows an example of operation in which the body of a person facing a thermopile right in front thereof is detected. FIG. 31B shows an example of operation in which a hand of the person facing the thermopile right in front thereof is detected. FIG. 32 shows an output voltage from the amplifier 262 when the temperature of the body and that of the hand are detected. Although not shown, it is assumed that the projection device 1 is in the state for desk-top projection, the body temperature is Tback, the output voltage corresponding to the body temperature is Vback, the hand temperature is Thand, and output voltage Vobj corresponding to the hand temperature is Vhand. When operating or controlling a displayed image of the projection device 1 by gesture, the operator faces the sensor 261 of the projection device 1 and brings the hand in front of the sensor 261 to make a gesture as shown in FIGS. 31A and 31B. The body of the operator can be regarded as a background which is at standstill with respect to the hand. The hand is less apart from the sensor 261 than the body, and the body is covered with clothes. Hence, when viewed from the sensor 261, the hand is higher in temperature than the body. As a result, by calculating the voltage difference, i.e., ΔV (Vhand−Vback) between voltage Vback when the body is detected as a standstill background and Vhand when the hand is detected as a mobile object moving in front of the background as shown in FIG. 32, the gesture of the operator can be detected.

Figure 33:
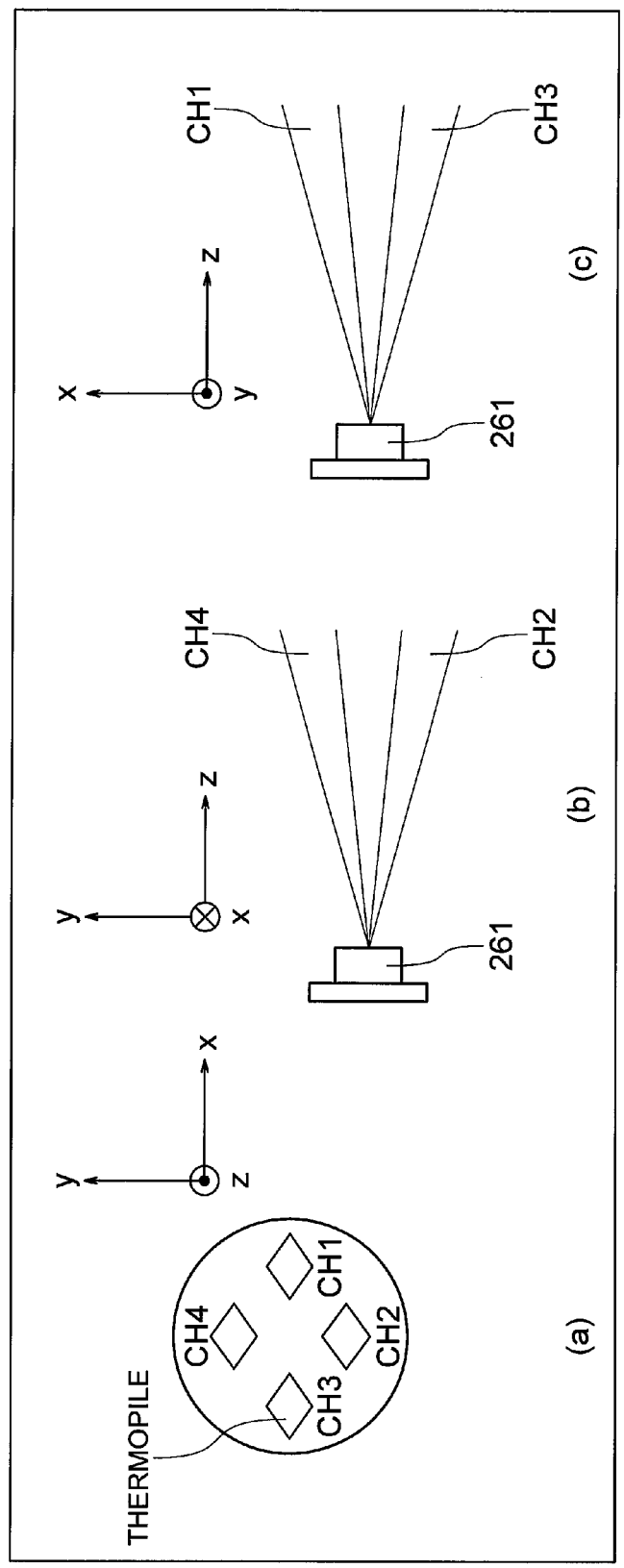
FIG. 33 is a diagram showing a front surface and an example of the detection range of the sensor element 2 including four thermopiles.

FIG. 33 shows an example of the sensor element 2 including a plurality of thermopiles for gesture detection. FIG. 33, (a) shows a detection surface of the sensor element 2 including four thermopiles CH1 to CH4 viewed from the front surface (that is, from the +z direction to the −z direction). FIG. 33, (b) shows detection ranges of the respective thermopiles of the sensor element 2 viewed from the −x direction to the +x direction. FIG. 33, (c) shows detection ranges of the respective 3 thermopiles of the sensor element 2 viewed from the +y direction to the −y direction. As shown in FIG. 33, (a), two thermopiles CH2 and CH4 are arranged along a line which passes the center of the detection surface in the y-axis direction and two thermopiles CH1 and CH3 are arranged along a line which passes the center of the detection surface in the x-axis direction. That is, the four thermopiles are arranged in the contour of a rhombus on the detection surface of the sensor element 2.

The sensor element 2 detects a gesture by using amplitude of a signal detected by each thermopile and timing when the detection signal is outputted. For example, when the operator moves the hand from the +x direction to the −x direction, a signal is first detected by CH1 and then by CH4 and CH2, and finally by CH3. The signal output time differs between CH1 and CH3 from each other. Paying attention to CH1 and CH3, the signal is outputted in a sequence of CH1 and CH3 for the hand action. In other words, when the signal is outputted in the sequence of CH1 and CH3, it can be judged that the hand moves from the +x direction to the −x direction. In the sensor element 2 of this example, by detecting the signal level of each thermopile and the time difference as above, presence or absence of a gesture, that is, a moving object (a human hand) which is higher in temperature than the background and the direction of the movement can be detected. Although four thermopiles are employed in the example, the present invention is not restricted by this example. A desired number of thermopiles may be utilized only if the hand action or movement is detectable.

Figure 34:
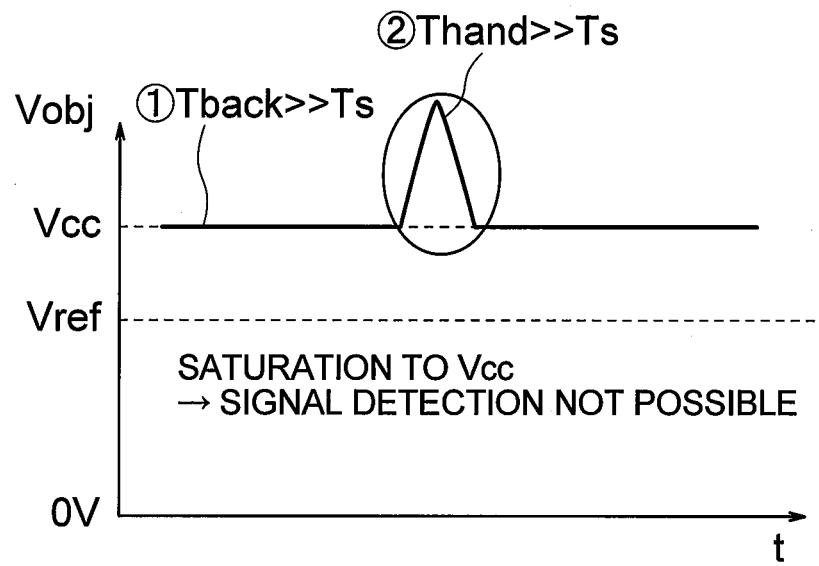
FIG. 34 is a diagram showing an example of the output voltage from the amplifier 262 when the temperature of the person is remarkably higher than the thermopile temperature.
Figure 35:
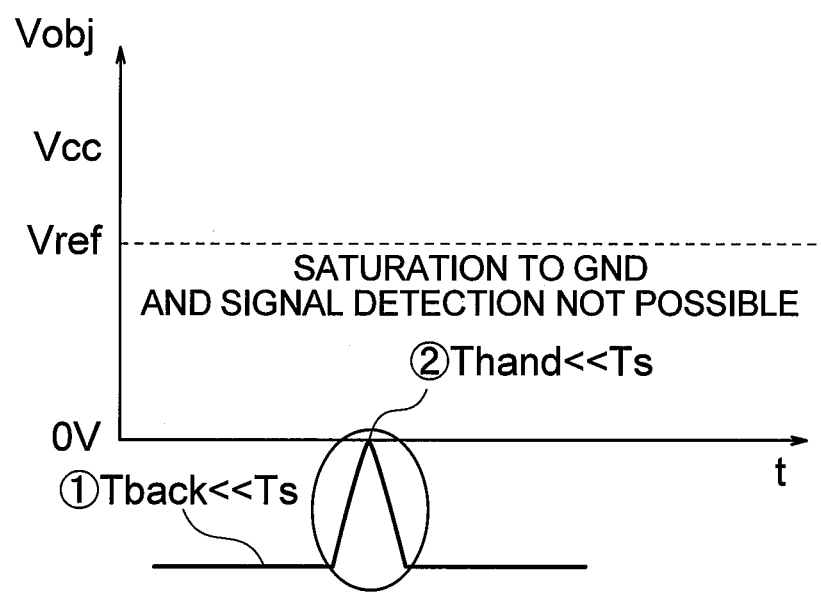
FIG. 35 is a diagram showing an example of the output voltage from the amplifier 262 when the temperature of the person is remarkably lower than the thermopile temperature.

Next, description will be given of the problem of the circuit configuration including the thermopile. FIG. 34 shows a situation in which the temperature of the human body is remarkably higher than the thermopile temperature. When temperature Tback of the human body as the background is quite higher than the thermopile temperature Ts as shown in FIG. 34, the output voltage takes quite a high value and is saturated at the level of power source voltage Vcc of the amplifier 262 (the maximum value of the output voltage from the amplifier 262). In this situation, when the hand temperature Thand is higher than the body temperature Tback, the output voltage from the amplifier 262 does not change regardless of presence or absence of a gesture. In this case, the gesture cannot be detected as a result. FIG. 35 shows a situation in which the temperature of the human body is remarkably lower than the thermopile temperature. As shown in FIG. 35, the output voltage from the amplifier 262 is saturated at the GND level, and the gesture cannot be detected as in the situation of FIG. 34.

Figure 36:
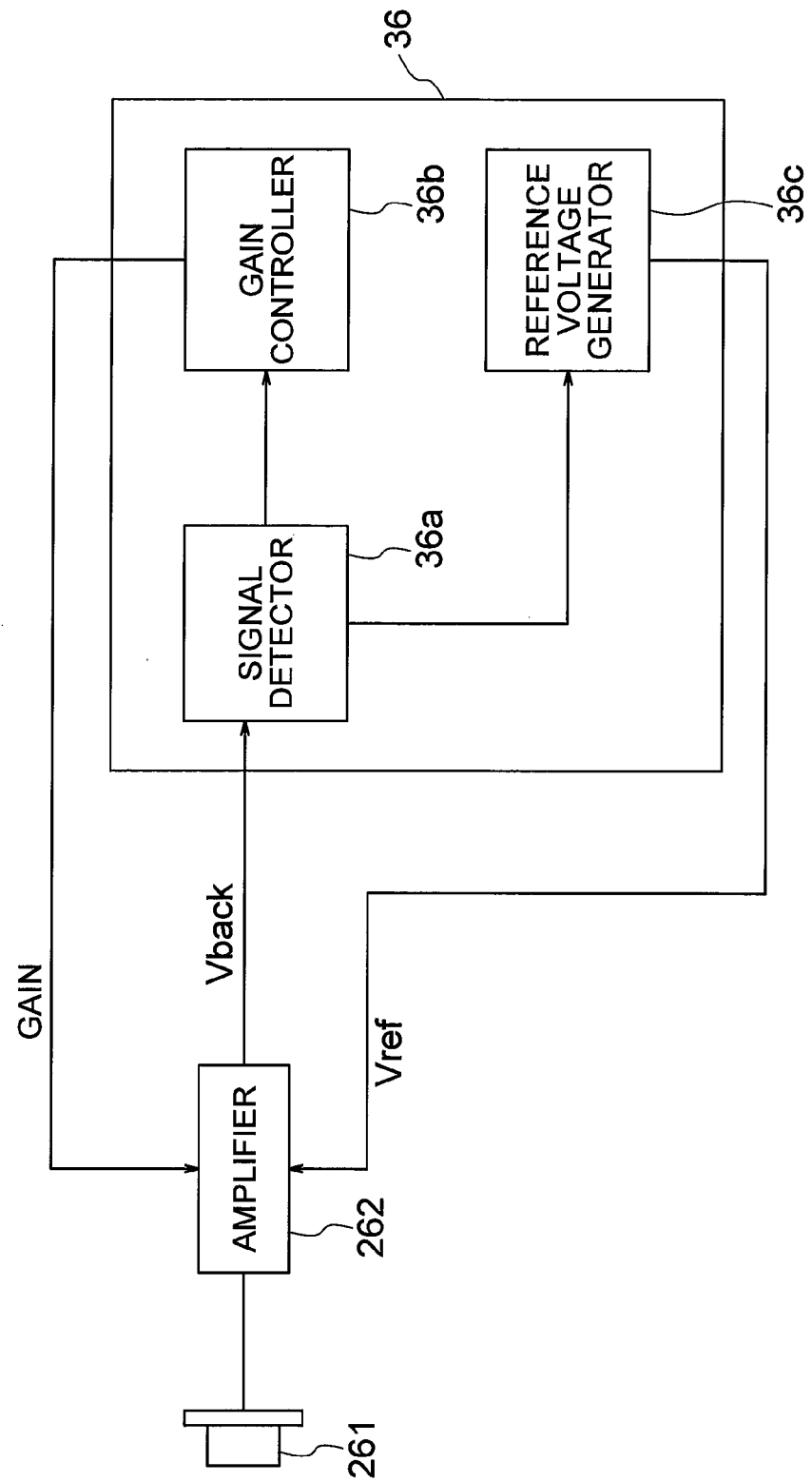
FIG. 36 is a block diagram showing an example of a circuit configuration of the sensor element 2 according to the third embodiment to avoid or suppress saturation of the output voltage from the amplifier 262.

As above, when such large difference exists between the thermopile temperature and the body temperature, the gesture cannot be detected in some cases. To solve this problem according to the present embodiment, the saturated state of the output voltage from the amplifier 262 shown in FIGS. 34 and 35 is avoided or is suppressed to appropriately detect the gesture. Referring now to FIG. 36, description will be given of a configuration of the sensor element 2 employed to avoid or to suppress saturation of the output voltage from the amplifier 262 according to the present embodiment.

As shown in FIG. 36, the sensor element 2 of the present embodiment includes an amplifier controller 36 in addition to the thermopile (sensor) 261 and the amplifier 262. It is assumed in the configuration of the sensor element 2 shown in FIG. 33 that an amplifier 262 and an amplifier controller 36 are disposed for each of the four thermopiles. The amplifier controller 36 includes a signal detector section 36a, a gain controller 36b, and a reference voltage generator 36c. The output signal from the sensor 261 is fed to the amplifier 262 to be amplified and the amplified signal is inputted to the signal detector 36a of the amplifier controller 36. Based on the output signal from the sensor 261, the signal detector 36a generates and outputs therefrom a control signal to control the gain controller 36b and the reference voltage generator 36c, which will be described later. In response to the control signal from the signal detector 36a, the gain controller 36b controls the gain of the amplifier 262. Also, based on the control signal from the signal detector

36a, the reference voltage generator 36c controls the reference signal to be supplied to the amplifier 262.

Figure 37:
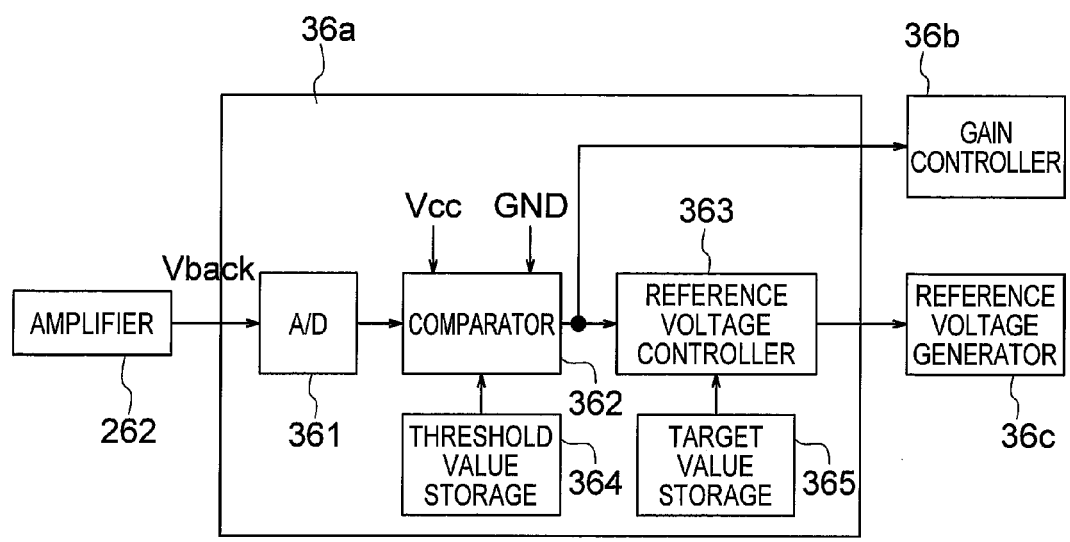
FIG. 37 is a block diagram showing an example of the circuit configuration of the sensor element 2 of the third embodiment, including constituent components of a signal detector section 36a shown in FIG. 36.

Next, referring to FIG. 37, description will be specifically given of control of the amplifier 262 to avoid or suppress the voltage saturation in the circuit configuration shown in FIG. 36.

First, control of the reference voltage of the amplifier 262 will be described. FIG. 37 shows a concrete example of the signal detector 36a of FIG. 36. In FIG. 37, the signal detector 36a includes an Analog/Digital (A/D) converter 361, a comparator 362, a reference voltage controller 363, a threshold value storage 364, and a target value storage 365. Now a situation is assumed in which the body of the operator is detected. An output signal Vback from the amplifier 262 is inputted to the A/D converter 361 to be converted into a digital signal. The digital signal outputted from the A/D converter 361 is compared by the comparator 362 with a predetermined threshold value read from the threshold value storage 364, to judge whether or not control of reference voltage Vref is required. The predetermined threshold value stored in the threshold value storage 364 is set as, for example, the power source voltage Vcc or the ground voltage GND. When the threshold value is Vcc, if the output signal from the A/D converter 361 is equal to or more than Vcc, it is judged that the control of reference voltage Vref is required. When the threshold value is GND, if the output signal from the A/D converter 361 is equal to or less than GND, it is judged that the control of reference voltage Vref is required. That is, the comparator 362 judges the saturated state of the output voltage from the amplifier 262. To discriminate this situation from the detection of a human hand, the comparator 362 judges whether or not the output voltage from the amplifier 262 is equal to or more than the threshold value Vcc or equal to or less than GND continuously for a predetermined period of time, e.g. several seconds.

When it is judged that the control of reference voltage Vref is required, that is, when the output voltage from the A/D converter 361 is equal to or more than threshold value Vcc or equal to or less than GND continuously for a predetermined period of time, the comparator 362 outputs a control start signal to the reference voltage controller 363. In response to the control start signal, the reference voltage controller 363 reads the target value from the target value storage 365 to create a reference voltage control signal based on the target value, to thereby control the reference voltage generator 36c.

When the reference voltage Vref is Vcc/2 and the output signal from the A/D converter 361 is equal to or more than Vcc, the reference voltage controller 363 reads a target value, e.g., Vcc/4, which is less than Vcc/2, from the target value storage 365 and then generates a reference voltage control signal to set the reference voltage Vref to Vcc/4, to thereby control the reference voltage generator 36c. When the reference voltage Vref is Vcc/2 and the output signal from the A/D converter 361 is equal to or less than GND, the reference voltage controller 363 reads a target value, e.g., Vcc×¾ which is more than Vcc/2, from the target value storage 365 and then generates a reference voltage control signal to set reference voltage Vref to Vcc×¾, to thereby control the reference voltage generator 36c.

If the reference voltage generator 36c is configured to the generate reference voltage Vref by use of, for example, the resistance division, it is possible to control reference the voltage Vref by changing the associated resistance value. Also, the reference voltage Vref may be controlled by use of an A/D converter incorporated in the reference voltage generator 36c. When the reference voltage generator 36c is capable of conducting Pulse Width Modulation (PWM) control, the reference voltage Vref may be controlled by adjusting the duty ratio of the PWM signal.

Figure 38:
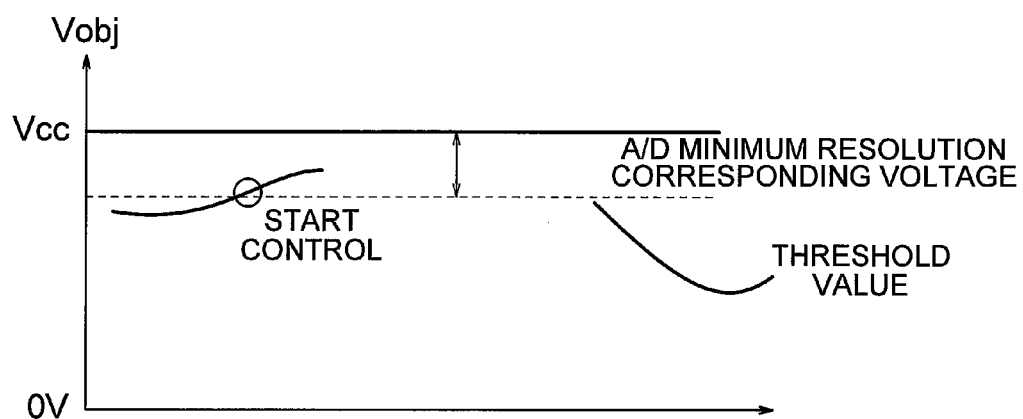
FIG. 38 is a graphic diagram showing an example of setting a threshold value to be stored in a threshold value storage 364.

In order that the control operation is started after the saturated state of the output signal from the amplifier 262 is detected, Vcc or GND is beforehand stored in the threshold value storage 364 as in the example described above. Naturally, threshold values other than the predetermined threshold value Vcc and the predetermined GND level may also be stored or set in the threshold value storage 364. For example, when Vback and Vhand differ from each other, a movement of the human hand, namely, a gesture can be detected. Hence, it is only required that a voltage corresponding to the minimum resolution of the A/D converter 361 can be outputted from the amplifier 262. In this situation, the voltage resultant from "Vcc−(voltage corresponding to minimum resolution of A/D converter 361)" or "GND+(voltage corresponding to minimum resolution of A/D converter 361)" may be stored or set in the threshold value storage 364. FIG. 38 shows only the situation in which the threshold value is set to "Vcc−(voltage corresponding to minimum resolution of A/D converter 361)". As shown in FIG. 38, when the output voltage from the amplifier 262 exceeds the threshold value, the control of reference voltage Vref is started.

The threshold value may be set in consideration of other than the minimum resolution of the A/D converter 361, that is, the level of noise contained in the detection signal from the thermopile. Further, the threshold value stored in the threshold value storage 364 may also be stored as the target value in the target value storage 365.

The target value may be altered according to the range of temperature to be detected. For example, in a situation in which Vref=Vcc/2 and the thermopile temperature Ts is 25° C., when the output signal from the amplifier 262 is saturated to Vcc and GND at Tback values of 35° C. and 15° C., respectively; the range of temperature ΔT in which a gesture can be detected (detection possible temperature range) is equal to 20° C. (35° C.-15° C.). When the thermopile temperature Ts lowers to 20° C., the output signal from the amplifier 262 is saturated to Vcc and GND at Tback values of 30° C. and 10° C., respectively. That is, when the thermopile temperature Ts lowers, it is likely that the output signal from the amplifier 262 is saturated at detection of the human body temperature or the human hand temperature. Hence, when it is considerable that the thermopile temperature Ts becomes lower, it is favorable that the above detection possible temperature range ΔT is retained on the higher temperature side or is expandable. When the reference voltage Vref is set to, for example, Vcc/4, the detection possible temperature range ΔT for Tx=20° C. can range from 35° C. to 15° C. This range ΔT is the same as for the situation in which thermopile temperature Ts is 25° C. as described above. By changing the reference voltage in this way, even when the thermopile temperature Ts varies to be lower, it is possible to detect a gesture in an appropriate detection possible temperature range ΔT. Although the reference voltage is set to Vcc/4 in this example, the reference voltage may be determined in consideration of the temperature ranges of thermopiles employed in the configuration.

Next, description will be given of control of the gain of the amplifier to avoid or to suppress saturation of the output voltage from the amplifier 262. The control operation is performed also by the circuit shown in FIG. 37.

As described above, when the comparator 362 judges that the output voltage from the amplifier 262 (the signal from the A/D converter 361) is equal to or more than the threshold value Vcc or equal to or less than GND continuously for a predetermined period of time, the reference voltage Vref is controlled. In this operation, the gain of the amplifier 262 is not controlled.

Even after the reference voltage Vref is controlled, when the output voltage from the amplifier 262 is kept saturated, the gain of the amplifier 262 is controlled. For example, after the reference voltage Vref is controlled, the comparator 362 judges whether or not the output voltage from the amplifier 262 is kept saturated continuously for a predetermined period of time, for example, several seconds, that is, whether or not the signal from the A/D converter 361 is equal to or more than the threshold value Vcc or equal to or less than GND continuously for a predetermined period of time. If this is the case, the system determines that it is required to control the gain of the amplifier 262. Exceptionally, the control operation is not carried out when only the output voltage from the amplifier 262 connected to part of the plural thermopiles is saturated. This is because only part of the plural thermopiles are in failure or it is likely that a heat source exists near part of the plural thermopiles.

When the comparator 362 determines that it is required to control the gain of the amplifier 262, the comparator 362 outputs a gain control signal to the gain controller 36b to lower the gain of the amplifier 262. The gain control signal may be created based on the threshold value stored in the threshold value storage 365 or may be created in consideration of the resolution and the noise level of the A/D converter 361 as described above.

Ordinarily, the gain of the amplifier is set to quite a high value to easily obtain a low-level detection signal from the thermopile. Hence, the gain of the amplifier is favorably retained at a high value. In the present embodiment, even when the output voltage from the amplifier 262 is saturated, the gain of the amplifier 262 is not immediately lowered, and the reference voltage Vref is first controlled. When the saturated state continues after the reference voltage Vref is controlled, the gain of the amplifier 262 is lowered. Hence, according to the present embodiment, while appropriately retaining the acquisition of the detection signal from the thermopile, it is possible to suppress saturation of the output voltage from the amplifier 262.

Figure 39:
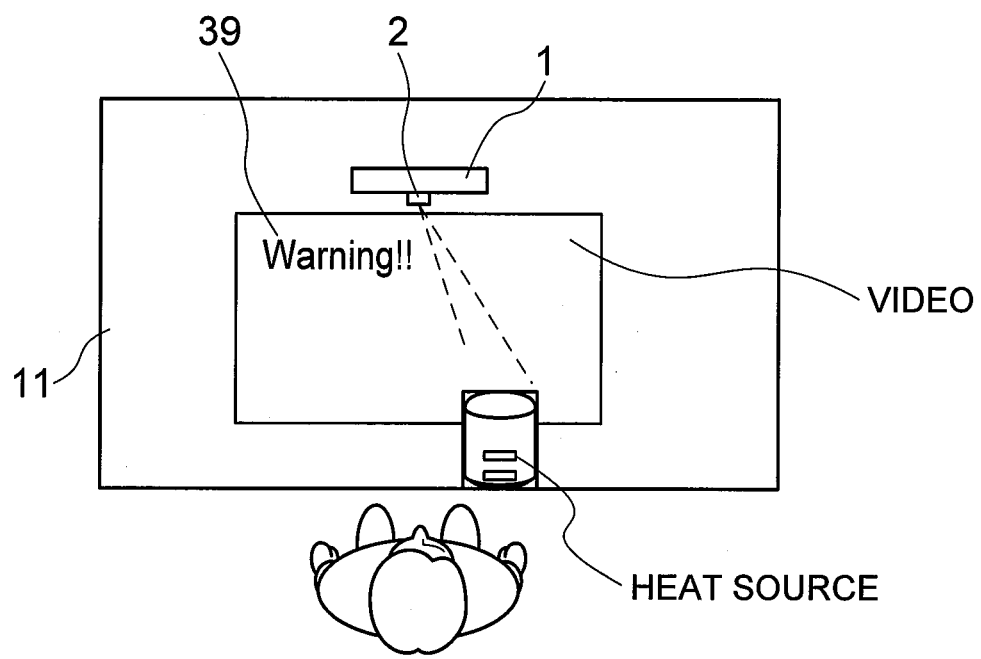
FIG. 39 is a diagram showing an example of a warning display when part of thermopiles failed.

When saturation of the output voltage from the amplifier 262 is detected since part of the plural thermopiles are in failure or a heat source exists near part of the plural thermopiles, a warning message 39 may be displayed in combination with the displayed image, for example, as shown in FIG. 39. The warning message 39 notifies the operator of the situation in which it is not possible to normally detect a gesture. The error indication 39 may be conducted on other than the displayed image. For example, the error indication 39 may be carried out by blinking an LED (such as the error display light source 15 shown in FIG. 25B) or by use of an error tone from a speaker. For this purpose, any method may be employed only if the operator can recognize the error.

Figure 40:
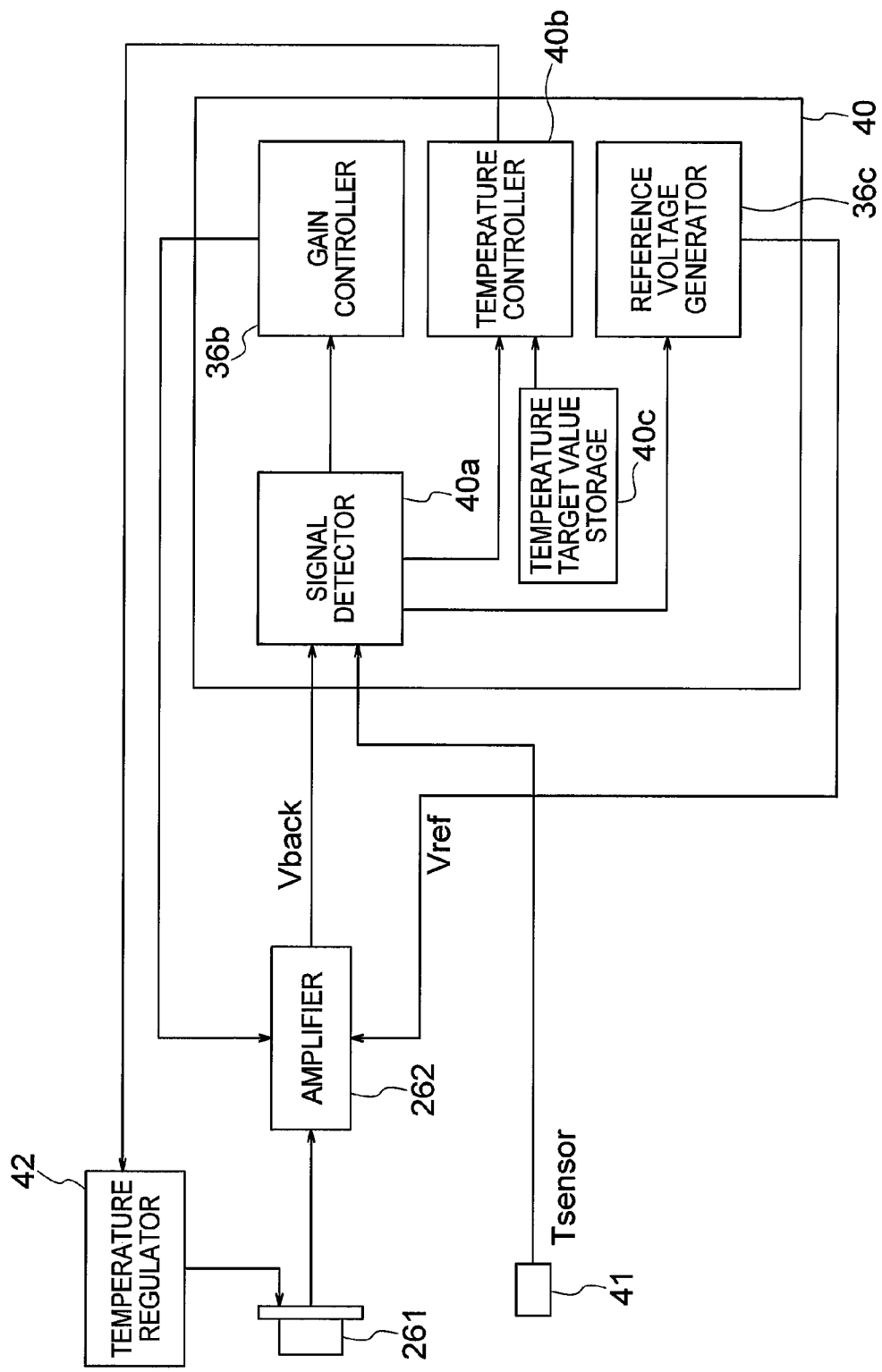
FIG. 40 is a block diagram showing an example of the circuit configuration of the sensor element 2 of the third embodiment, including another circuit configuration to control the sensor temperature.

Next, description will be given of a configuration in which the saturated state is avoided and the gesture can be detected by controlling the thermopile temperature. In the present embodiment, control is performed such that the thermopile temperature is almost equal to the hand temperature, and the gain and the reference voltage of the amplifier 262 are regulated such that even a small signal can be detected. FIG. 40 shows another concrete example of the sensor element 2 according to the present embodiment. The sensor element 2 includes, in addition to the thermopile (sensor) 261 and the amplifier 262, an amplifier/temperature controller 40, a temperature detector 41, and a temperature regulator 42. The amplifier/temperature controller 40 includes a signal detector 40a, a gain controller 36a, a temperature controller 40b, a temperature target storage 40c, and a reference voltage generator 36c.

Description will now be given of operation of constituent components of FIG. 40. A signal sent via the amplifier 262 from the sensor 261 and an output signal from the temperature detector 41 are inputted to the signal detector 40a of the amplifier/temperature controller 40. Based on the signal from the amplifier 262, the signal detector 40a executes processing similar to the processing described in conjunction with FIG. 37, to output a control signal to the reference voltage generator 36c and the gain controller 36b. The reference voltage generator 36c and the gain controller 36b executes processing similar to the processing described in conjunction with FIG. 37, to control the reference voltage Vref and the gain of the amplifier 262. Since the processing and control are similar to those described in conjunction with FIG. 37, detailed description thereof will be omitted.

Of the signals inputted to the signal detector 40a, the signal from the temperature detector 41 is further inputted to the temperature controller 40b. The temperature controller 40b controls the temperature regulator 42 such that the temperature of the sensor 261 detected by the temperature detector 41 becomes the target temperature stored in the temperature target storage 40c. The temperature regulator 42 controls the temperature of the sensor 261 by heating or cooling the sensor 261, and there may be employed a Peltier element or a heater including a coil. By controlling current to be supplied to the Peltier element or the coil, the temperature of the sensor 261 is regulated. The target temperature stored in the temperature target storage 40c is set to a temperature near the temperature of the human hand, for example, about 36° C.

Figure 41A:
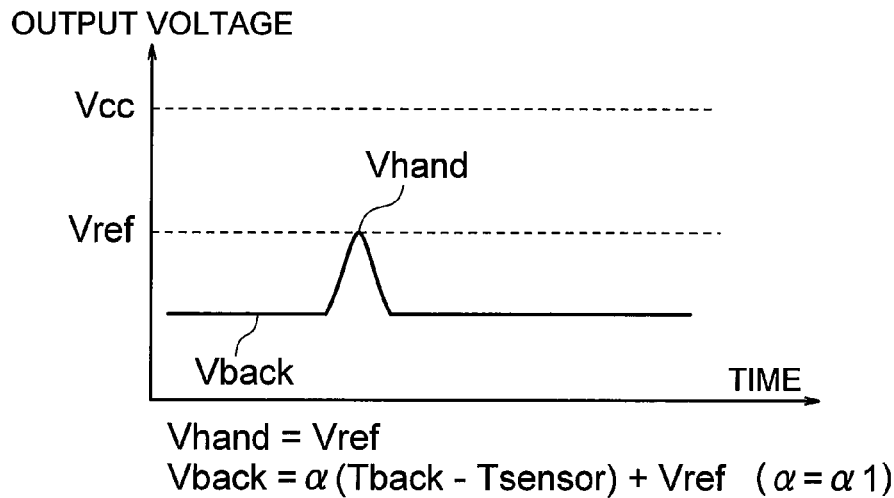
FIG. 41A is a graphic diagram showing a behavior of the output voltage from the amplifier 262 when the sensor temperature is controlled.

FIG. 41A graphically shows the output voltage from the amplifier 262 when the thermopile temperature is controlled to be equal to the temperature of the human hand (about the temperature of the human body, i.e., 36° C.). As can be seen from FIG. 41A, since the thermopile is equal in temperature to the hand, Vhand and Vback are represented as below according to Expression (4).

$$V\text{hand} = V\text{ref} \quad (5)$$

$$V\text{back} = \alpha(T\text{back} - T s) + V\text{ref}(\alpha = \alpha 1) \quad (6)$$

wherein, α of Expression (6) indicates the gain (amplification factor) of the amplifier 262 and is α1 in this situation.

The hand temperature is higher than the temperature of the human body covered with clothes in many cases, and Vback is ordinarily lower than Vhand. Hence, by controlling the temperature to equalize the thermopile temperature to the hand temperature, Vhand=Vref results as shown in FIG. 41A and Expression (5), and Vback can be lower than reference voltage Vref. Hence, it is possible to detect a gesture while avoiding the saturated state of the output voltage from the amplifier 262.

Figure 41B:
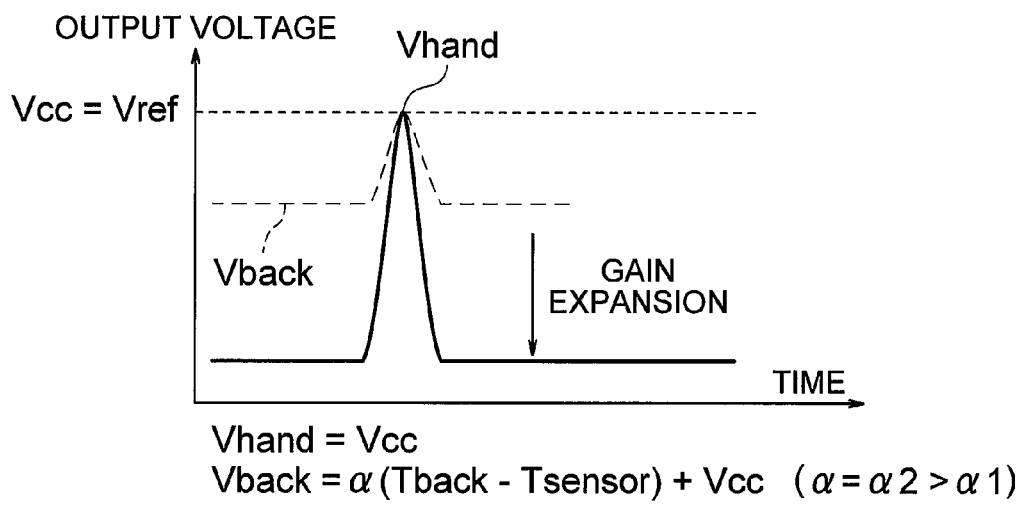
FIG. 41B is a graphic diagram showing a behavior of the output voltage from the amplifier 262 when the sensor temperature is controlled.

In the operation to detect a gesture, the value of Vhand−Vback remarkably affects precision in the gesture detection. As Vhand−Vback becomes larger, the gesture can be more easily detected. Hence, by combining the thermopile temperature control with the control of the gain and the reference voltage of the amplifier 262 described in conjunction with FIG. 37, the gesture detection sensitivity is efficiently increased. FIG. 41B graphically shows the thermopile temperature control. In the example of FIG. 41B, the reference voltage Vref is regulated to Vcc and the gain α is set to α2 larger than α1 used in FIG. 41A. As a result, the value of Vhand−Vback becomes larger. As above, by additionally employing the control of the gain and the reference voltage of the amplifier 262 to the sensor temperature control, it is possible to increase the gesture detection sensitivity.

When it is desired to set the target temperature to the hand temperature, the target temperature may be prepared as below. The temperature of the operator's hand is first measured, for example, by the sensor element 2, and then the measured hand temperature is stored as the target temperature in the temperature target storage 40c. In this situation, for example, a predetermined temperature detection period may be set before the user starts operation by gesture, and when the user places the hand in front of the sensor element 2, the hand temperature is measured.

Figure 42:
FIG. 42 is a diagram showing an example of a control sequence to be executed by the sensor element in the circuit configuration shown in FIG. 37.

FIG. 42 shows a control sequence of control operations including sensor temperature control. The control sequence includes sensor temperature control, reference voltage control, and gain control. That is, in the control sequence of the present embodiment, the sensor temperature control is performed before the reference voltage control and the gain control. The reference voltage control and the gain control are the same as those described above; hence, description thereof will be avoided. Only the sensor temperature control will be described.

In the sensor temperature control, the hand temperature is measured and the thermopile temperature is controlled during a predetermined period of time. The hand temperature is measured, for example, as below. The temperature of the sensor element 2 is changed by the temperature controller 40b in a predetermined range, for example, from 28° C. to 37° C., to thereby detect the temperature, which is corresponding to the reference voltage Vref, as the temperature of the user hand. The detected temperature is stored as the target temperature in the temperature target storage 40c. The detection mechanism of the temperature may be used for a clinical thermometer. For the hand temperature detection, the user may set the hand temperature from a menu screen. At changeover of the gesture on/off described above, a screen to urge the user to measure the hand temperature may be automatically displayed. After the detected hand temperature is stored as the target temperature in the temperature target storage 40c, the thermopile temperature is controlled in a method similar to that described in conjunction with FIG. 40. After the sensor temperature control is performed, the reference voltage and the gain of the amplifier 262 are controlled.

According to the present embodiment, by regulating the temperature of the sensor 261 to be equal to, for example, the hand temperature, it is possible to avoid or suppress the saturation of the output voltage from the amplifier 262. By combining this control with the control of the reference voltage and/or the gain of the amplifier 262, the gesture detection sensitivity can be increased while avoiding or suppressing the saturation of the output voltage from the amplifier 262.

The sensor temperature control may be conducted by use of a heat source in the projection device 1. For example, the periphery of a driver to drive the light source is at quite a high temperature during the operation, and the driver may be employed as the heat source. Hence, there may be disposed a structure which transmits heat from the driver as the heat source to the sensor element 2. Specifically, there is disposed a mobile heat insulating body or a mobile heat conducting body such that according to the setting temperature, the heat insulating or conducting body is moved to control the flow rate of heat to be imparted from the periphery of the driver to the sensor. Naturally, any appropriate structure other than this may be employed.

[Fourth Embodiment]

Next, description will be given of a fourth embodiment. In the description of the embodiment, the sensor element 2 includes, for example, four sensors such as thermopiles (CH1 to CH4). However, the present invention is not restricted by this embodiment.

Figure 43:
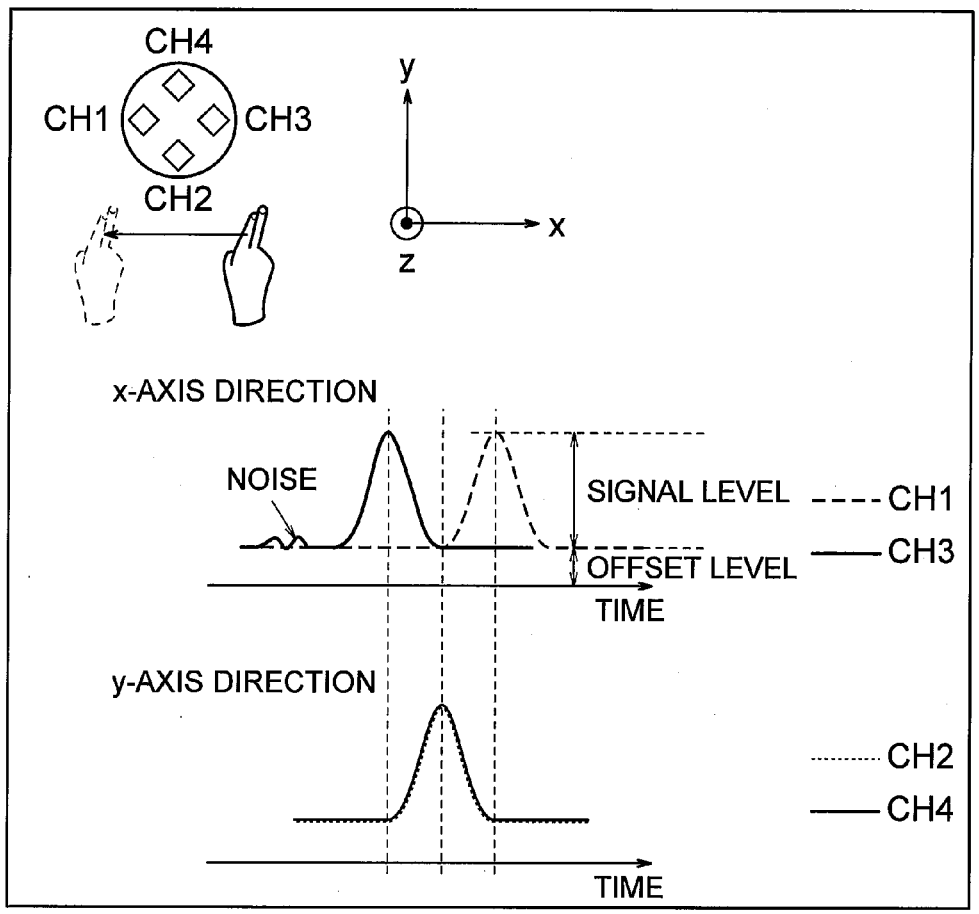
FIG. 43 is a diagram to explain a fourth embodiment, graphically showing a signal output from each CH when the operator swings a hand in a direction from CH 3 to CH 1.

FIG. 43 shows signal outputs when the operator swings a hand in a direction from CH 3 to CH 1. As can be seen from FIG. 43, the sensor element 2 detects the gesture in the x-axis direction and the y-axis direction. Description will now be given of a method to easily separate the signal produced based on the gesture into the x-axis and y-axis components. In the example of FIG. 43, a detection signal is first outputted from CH3 and detection signals are outputted from CH2 and CH4, and finally, a detection signal is outputted from CH1. Each detection signal includes an offset corresponding to background temperature Tback and a gesture signal level corresponding to hand temperature Thand. To reduce the erroneous detection by judging the axial direction associated with the gesture, the differences between the detection signals from the respective sensors CH are obtained for each axial direction. Description will be given of an example of the operation by referring to FIG. 44.

Figure 44:
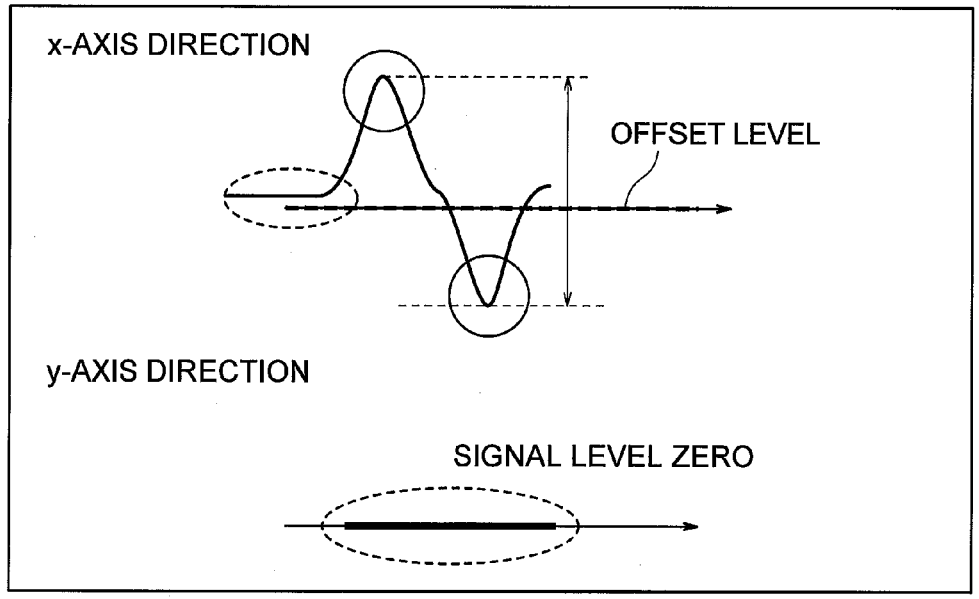
FIG. 44 is a diagram graphically showing an example of signals representing differences between detection signals from two CH for each axis.

FIG. 44 graphically shows signals of differences between the sensor output signals in the x-axis and y-axis directions. In FIG. 44, the upper-half section shows the difference in the y-axis direction and the lower-half section shows that in the x-axis direction. That is, the upper-half section shows the difference between the detection signals from CH1 and CH3 and the lower-half section shows that between the detection signals from CH2 and CH4. As can be seen from FIG. 44, by obtaining the differences between sensor output signals of the respective axes, it is possible to lower noises, to increase the gesture signal level, and to extract a feature of the signal representing the gesture. Due to the reduction in noises and the increase in the gesture signal level, the gesture detection is possible even for a weaker signal. Due to the extraction of the feature, the erroneous detection in the axial direction can be lowered. Since the waveform of the signal in the x-axis direction is symmetrically obtained with respect to the offset level for the upper-half and lower-half of the waveform, the signal can be easily separated from the signal in the y-axis direction. To utilize the symmetric feature of the waveform, it is required to detect the offset level which varies according to the background temperature and the gesture signal level which varies in association with the hand movement.

Figure 45:
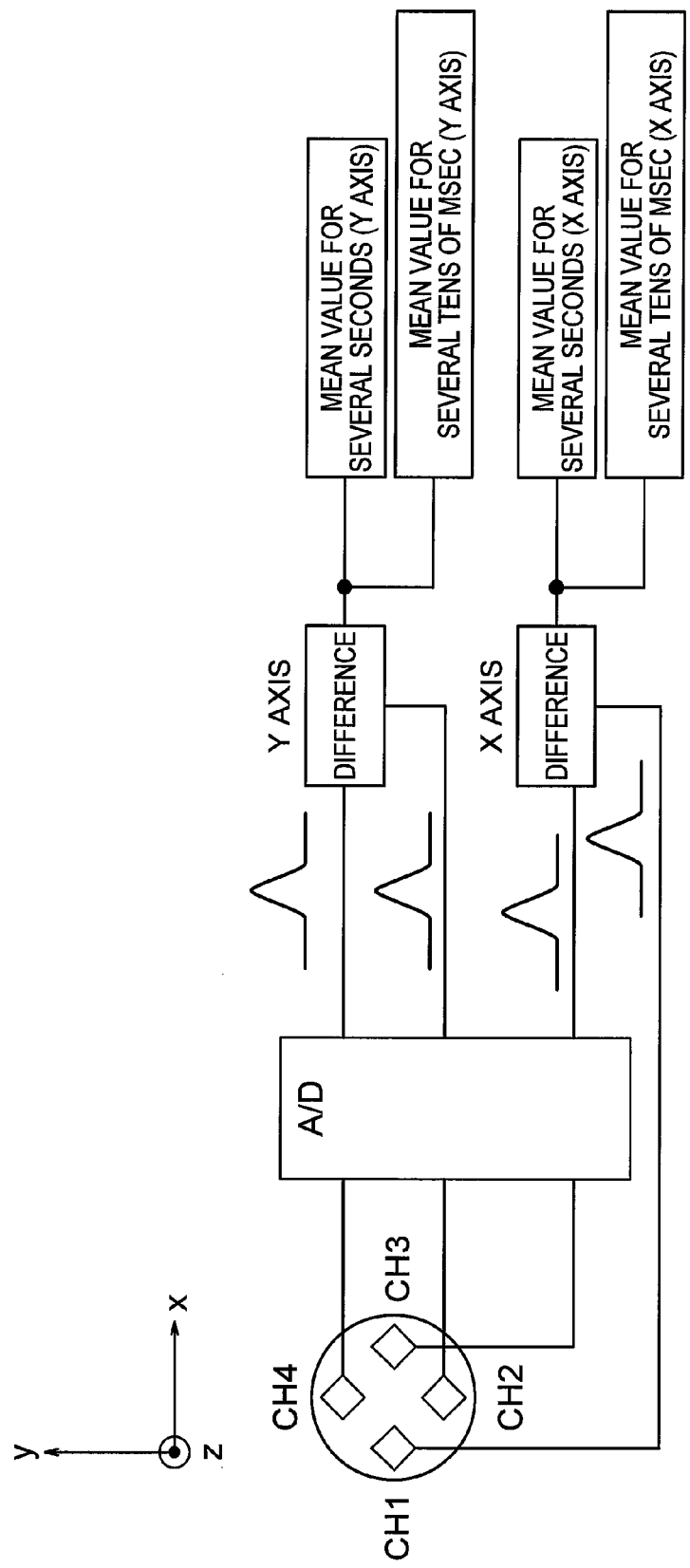
FIG. 45 is a diagram showing an example of the configuration to detect a gesture signal level and an offset level.

FIG. 45 shows an example of the configuration to detect the gesture signal level and the offset level. As described above, the detection signals of the respective CH are analog-to-digital converted and then the differences therebetween are calculated respectively for the x-axis and y-axis directions. For example, in the calculation for the x-axis direction, the difference between the detection signals of CH1 and CH3 is calculated. In the calculation for the y-axis direction, the difference between the detection signals of CH2 and CH4 is calculated. For the differences in the respective axes thus calculated, mean values are calculated with respect to time. This is conducted in two methods, i.e., a method to calculate the mean value for several seconds and a method to calculate the mean value for several tens of seconds. The former is used to obtain the offset level and the latter is employed to obtain the gesture signal level. For the gesture signal level, the time to obtain the mean value may be shortened in consideration of the noise level. For the offset level, since the offset level follows the varying signal, the time to obtain the mean value may be shortened. Further, the calculation time to obtain the mean value may be changed depending on the environment of the projection device.

For the offset level and the gesture signal, the mean values are calculated with respect to time as above, to judge the symmetry of the waveform using the offset level as a reference level. The judging operation may be conducted based on the differences of the maximum and minimum values of the signal level from the offset level. For example, if (maximum value−offset level)<multiplex(offset level−minimum value) holds, the symmetry is assumed and it is judged that the associated axis is determined as the axis along which the gesture is inputted. If the condition is not satisfied, it is judged that the associated axis is other than the axis along which the gesture is inputted.

As above, when there exists a gesture in the x-axis direction, it is possible to easily separate the signal component of the y-axis direction from the detection signals of the respective CH. Although description has been given of an example of a gesture in the x-axis direction, the symmetry of the waveform is also obtained for a gesture in the y-axis direction, so that the signal component of the x-axis direction can be extracted from the detection signals by similarly using the method described above.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image projection device to control or operate a projected image by gesture, comprising:
    a sensor element to detect a gesture; and
    a control section configured to generate an operation signal to operate a projected image projected according to a gesture detected by the sensor element,
    wherein the control section generates, in response to the sensor element detecting a gesture in a first direction, an operation signal to operate the projected image, and in response to the sensor element detecting a gesture in a second direction, other than the first direction, the control section suspends the generating of the operation signal for a gesture in the first direction that is subsequent to the gesture detected in the second direction.

2. An image projection device according to claim 1, wherein:
    the first direction is a direction parallel to a projection surface onto which the image projection device projects an image; and
    the second direction is a direction perpendicular to the projection surface.

3. An image projection device according to claim 2, wherein:
    the first direction is a direction parallel to a projection surface onto which the image projection device projects an image and is a horizontal direction of the projected image.

4. An image projection device according to claim 2, wherein:
    in response to the sensor element detecting gestures which are consecutively made in mutually opposite directions along the second direction, the control unit suspends generation of the operation signal.

5. An image projection device to control or operate a protected image by gesture, comprising:
    a sensor element to detect a gesture; and
    a control section to generate an operation signal to control or operate a projected image projected according to a gesture detected by the sensor element, wherein:
    the control section generates, when the sensor element detects a gesture in a first direction, an operation signal to control or operate the projected image, and when the sensor element detects a gesture in a second direction other than the first direction, the control section suspends generation of the operation signal; and wherein:
    after the sensor element detects a gesture in one direction along the first direction, the control section invalidates detecting a gesture in a reverse direction opposite to the one direction if detected within a predetermined period of time.

6. An image projection device according to claim 1, wherein the sensor element detects an action of a hand made at a speed equal to or more than a predetermined speed as a gesture.

7. An image projection device according to claim 2, wherein:
    after the sensor element detects a gesture in one direction along the second direction, in response to the sensor element detecting a gesture in a reverse direction opposite to the one direction made within a predetermined period of time after the detection of the gesture in the one direction, the control unit suspends generation of the operation signal.

8. An image projection device according to claim 1, wherein:
    the control units combines a message or an icon with an image to be projected to notify whether or not the image projection device is in a state in which generation of the operation signal is suspended.

9. An image projection device according to claim 1, further comprising a light source to notify whether or not the image projection device is in a state in which generation of the operation signal is suspended.

10. An image projection device according to claim 1, further comprising a function to rotate an image by gesture.

11. An image projection device according to claim 10, wherein the image is rotated by a gesture which rotates over a projected image.

12. An image projection device according to claim 1, wherein in response to the sensor element detecting a gesture in a direction perpendicular to the first and the second directions, power of the image projection device is turned on or off.

13. An image projection device according to claim 1, wherein the sensor element comprises a plurality of sensors, the sensors being different in sensitivity from each other.

14. An image projection device according to claim 13, wherein:
    when an operator makes a gesture using a right hand, it is possible to set sensitivity of sensors on the right-hand side viewed from the operator to a value lower than that of sensitivity of sensors on the left-hand side viewed from the operator; and
    when the operator makes a gesture using a left hand, it is possible to set sensitivity of sensors on the left-hand side to a value lower than that of sensitivity of sensors on the right-hand side.

15. An image projection device to project light including image information onto a desk top to thereby display an image, comprising:

a light source section to emit light;

a light control section to generate an optical image based on the image information by use of the light emitted from the light source section,;

a projection section comprising a projection optical section to project the light generated by the light control section;

a sensor element comprising at least one temperature sensor to detect a gesture of an operator of the image projection device;

an amplifier to amplify a detection signal from each temperature sensor included in the sensor element; and a control section to generate an operation signal to operate an image signal associated with the image information, based on the detection signal of the gesture which is detected by the sensor element and amplified by the amplifier, wherein the control section is capable of controlling a reference voltage and/or gain of the amplifier which are/is used by the amplifier to amplify the detection signal.

16. An image projection device according to claim 15, wherein the control section controls the reference voltage and/or the gain of the amplifier when the detection signal of the sensor element is equal to or more than a first threshold value or is equal to or less than a second threshold value less than the first threshold value.

17. An image projection device according to claim 15, wherein the control section controls the reference voltage when the detection signal of the sensor element is equal to or more than a first threshold value or is equal to or less than a second threshold value less than the first threshold value for a predetermined period of time, and thereafter, when the detection signal of the sensor element is equal to or more than a first threshold value or is equal to or less than a second threshold value less than the first threshold value for a predetermined period of time, the control section controls the gain of the amplifier.

18. An image projection device according to claim 15, wherein the control section combines a warning message with the image to display the warning message together with the image when part of the output signals from the amplifier are in a saturated state.

19. An image projection device to project light comprising image information onto a desk top to thereby display an image, comprising:

a light source to emit light;

an optical system configured to generate, by use of the light emitted from the light source, an optical image based on the image information;

a projection section comprising a projection optical section to project the light generated by the light control section;

a sensor element comprising at least one temperature sensor to detect a gesture of an operator of the image projection device;

an amplifier to amplify a detection signal of the sensor element;

a control section to generate an operation signal to operate an image signal associated with the image information based on the detection signal of the gesture which is detected by the sensor element and amplified by the amplifier;

a temperature detection section to detect a temperature of the sensor element; and a temperature control section to control the temperature of the sensor element based on the temperature of the sensor element detected by the temperature detection section.

20. An image projection device according to claim 19, wherein the temperature control section controls so as to regulate the temperature of the sensor element to become substantially equal to human temperature.

* * * * *